United States Patent

Hojo

(10) Patent No.: US 6,744,762 B1
(45) Date of Patent: Jun. 1, 2004

(54) NODE DEVICE, COMMUNICATION NETWORK HAVING A PLURALITY OF NODE DEVICES, AND CONTROL METHOD THEREFOR

(75) Inventor: Kazuhiko Hojo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/386,223

(22) Filed: Aug. 31, 1999

(30) Foreign Application Priority Data

Sep. 1, 1998 (JP) .......................................... 10-247081
Sep. 9, 1998 (JP) .......................................... 10-255138
Sep. 30, 1998 (JP) .......................................... 10-277654

(51) Int. Cl.⁷ ............................................. H04L 12/56
(52) U.S. Cl. ..................... 370/392; 370/395.3; 370/400; 370/424
(58) Field of Search ..................... 370/395.4–395.43, 370/394, 428–429, 395.3–395.31

(56) References Cited

U.S. PATENT DOCUMENTS

| | | | | |
|---|---|---|---|---|
| 5,450,410 A | * | 9/1995 | Hluchyj et al. | 370/394 |
| 5,461,614 A | * | 10/1995 | Lindholm | 370/394 |
| 5,740,373 A | * | 4/1998 | Isaka | 709/237 |
| 5,848,059 A | * | 12/1998 | Yamamoto | 370/258 |
| 5,859,718 A | * | 1/1999 | Yamamoto et al. | 359/128 |
| 6,044,076 A | * | 3/2000 | Yamamoto | 370/392 |
| 6,392,991 B1 | * | 5/2002 | Yamamoto et al. | 370/222 |

* cited by examiner

Primary Examiner—Chi Pham
Assistant Examiner—Thai Hoang
(74) Attorney, Agent, or Firm—Fitzpatrick, Cella, Harper & Scinto

(57) ABSTRACT

In the node device of a network of performing communication while changing the communication channel, a plurality of packets are transmitted to a terminal device in a different order from the reception order of a plurality of received packets without rearranging the packets in the terminal device. In addition, the packets are transmitted to the terminal device with traffic characteristics based on traffic characteristics used to transmit a plurality of packets.

17 Claims, 36 Drawing Sheets

FIG. 3

T4 TIME PERIOD

| Mem Adr | USE Conn | Seq. No. | Conn No. |
|---|---|---|---|
| 01H | 1 | 1 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T6 TIME PERIOD

| Mem Adr | USE Conn | Seq. No. | Conn No. |
|---|---|---|---|
| 01H | 1 | 2 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T7 TIME PERIOD

| Mem Adr | USE Conn | Seq. No. | Conn No. |
|---|---|---|---|
| 01H | 1 | 3 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T12 TIME PERIOD

| Mem Adr | USE Conn | Seq. No. | Conn No. |
|---|---|---|---|
| 01H | 1 | 4 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T13 TIME PERIOD

| Mem Adr | USE Conn | Seq. No. | Conn No. |
|---|---|---|---|
| 01H | 1 | 5 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T14 TIME PERIOD

| Mem Adr | USE Conn | Seq. No. | Conn No. |
|---|---|---|---|
| 01H | 1 | 6 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

| INPUT TERMINAL \ CONTROL ADDRESS | A1 | A2 | A3 | A4 | A5 | A6 | A7 | A8 |
|---|---|---|---|---|---|---|---|---|
| IN1 | OUT1 | OUT2 | OUT3 | OUT4 | OUT5 | OUT6 | OUT7 | OUT8 |
| IN2 | OUT2 | OUT3 | OUT4 | OUT5 | OUT6 | OUT7 | OUT8 | OUT1 |
| IN3 | OUT3 | OUT4 | OUT5 | OUT6 | OUT7 | OUT8 | OUT1 | OUT2 |
| IN4 | OUT4 | OUT5 | OUT6 | OUT7 | OUT8 | OUT1 | OUT2 | OUT3 |
| IN5 | OUT5 | OUT6 | OUT7 | OUT8 | OUT1 | OUT2 | OUT3 | OUT4 |
| IN6 | OUT6 | OUT7 | OUT8 | OUT1 | OUT2 | OUT3 | OUT4 | OUT5 |
| IN7 | OUT7 | OUT8 | OUT1 | OUT2 | OUT3 | OUT4 | OUT5 | OUT6 |
| IN8 | OUT8 | OUT1 | OUT2 | OUT3 | OUT4 | OUT5 | OUT6 | OUT7 |

FIG. 6

| INPUT CHANNEL \ LAPSED TIME | T1 | T2 | T3 | T4 | T5 | T6 | T7 | T8 |
|---|---|---|---|---|---|---|---|---|
| 1 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 |
| 2 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 |
| 3 | OUTPUT CHANNEL1 PACKET1 | OUTPUT CHANNEL2 PACKET2 | OUTPUT CHANNEL3 PACKET3 | OUTPUT CHANNEL4 PACKET4 | OUTPUT CHANNEL5 | OUTPUT CHANNEL6 | OUTPUT CHANNEL7 | OUTPUT CHANNEL8 |
| 4 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 |
| 5 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 |
| 6 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 |
| 7 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 |
| 8 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 |

FIG. 7

| LAPSED TIME / INPUT CHANNEL | T1 | T2 | T3 | T4 | T5 | T6 | T7 | T8 | T9 | T10 | T11 |
|---|---|---|---|---|---|---|---|---|---|---|---|
| 1 | OUTPUT CHANNEL6 | OUTPUT CHANNEL7 PACKET1 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 |
| 2 | OUTPUT CHANNEL7 | OUTPUT CHANNEL8 | OUTPUT CHANNEL1 PACKET2 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 |
| 3 | OUTPUT CHANNEL8 | OUTPUT CHANNEL1 | OUTPUT CHANNEL2 | OUTPUT CHANNEL3 PACKET3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 |
| 4 | OUTPUT CHANNEL1 | OUTPUT CHANNEL2 | OUTPUT CHANNEL3 | OUTPUT CHANNEL4 | OUTPUT CHANNEL5 PACKET4 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 |
| 5 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 |
| 6 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 |
| 7 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 |
| 8 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 |

FIG. 18

T4 TIME PERIOD

| USE Conn | Seq. No. | Conn No. |
|---|---|---|
| 1 | 0 | 1 |
| | | 2 |
| | | 3 |
| | | 4 |
| | | 5 |
| | | 6 |
| | | 7 |
| | | 8 |
| | | 9 |
| | | 10 |

T6 TIME PERIOD

| USE Conn | Seq. No. | Conn No. |
|---|---|---|
| 1 | 1 | 1 |
| | | 2 |
| | | 3 |
| | | 4 |
| | | 5 |
| | | 6 |
| | | 7 |
| | | 8 |
| | | 9 |
| | | 10 |

T7 TIME PERIOD

| USE Conn | Seq. No. | Conn No. |
|---|---|---|
| 1 | 2 | 1 |
| | | 2 |
| | | 3 |
| | | 4 |
| | | 5 |
| | | 6 |
| | | 7 |
| | | 8 |
| | | 9 |
| | | 10 |

T12 TIME PERIOD

| USE Conn | Seq. No. | Conn No. |
|---|---|---|
| 1 | 3 | 1 |
| | | 2 |
| | | 3 |
| | | 4 |
| | | 5 |
| | | 6 |
| | | 7 |
| | | 8 |
| | | 9 |
| | | 10 |

T13 TIME PERIOD

| USE Conn | Seq. No. | Conn No. |
|---|---|---|
| 1 | 4 | 1 |
| | | 2 |
| | | 3 |
| | | 4 |
| | | 5 |
| | | 6 |
| | | 7 |
| | | 8 |
| | | 9 |
| | | 10 |

T14 TIME PERIOD

| USE Conn | Seq. No. | Conn No. |
|---|---|---|
| 1 | 5 | 1 |
| | | 2 |
| | | 3 |
| | | 4 |
| | | 5 |
| | | 6 |
| | | 7 |
| | | 8 |
| | | 9 |
| | | 10 |

T4 TIME PERIOD

| Mem Adr | USE Conn | Seq. No. | Conn No. |
|---|---|---|---|
| 01H | 1 | 1 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T6 TIME PERIOD

| Mem Adr | USE Conn | Seq. No. | Conn No. |
|---|---|---|---|
| 01H | 1 | 2 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T7 TIME PERIOD

| Mem Adr | USE Conn | Seq. No. | Conn No. |
|---|---|---|---|
| 01H | 1 | 3 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T12 TIME PERIOD

| Mem Adr | USE Conn | Seq. No. | Conn No. |
|---|---|---|---|
| 01H | | 4 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T13 TIME PERIOD

| Mem Adr | USE Conn | Seq. No. | Conn No. |
|---|---|---|---|
| 01H | 1 | 5 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

T14 TIME PERIOD

| Mem Adr | USE Conn | Seq. No. | Conn No. |
|---|---|---|---|
| 01H | 1 | 6 | 1 |
| 02H | | | 2 |
| 03H | | | 3 |
| 04H | | | 4 |
| 05H | | | 5 |
| 06H | | | 6 |
| 07H | | | 7 |
| 08H | | | 8 |
| 09H | | | 9 |
| 10H | | | 10 |

| INPUT CHANNEL \ LAPSED TIME | T1 | T2 | T3 | T4 | T5 | T6 | T7 | T8 |
|---|---|---|---|---|---|---|---|---|
| 1 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 |
| 2 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 |
| 3 | OUTPUT CHANNEL1 PACKET1 | OUTPUT CHANNEL2 PACKET2 | OUTPUT CHANNEL3 PACKET3 | OUTPUT CHANNEL4 PACKET4 | OUTPUT CHANNEL5 | OUTPUT CHANNEL6 | OUTPUT CHANNEL7 | OUTPUT CHANNEL8 |
| 4 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 |
| 5 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 |
| 6 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 |
| 7 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 |
| 8 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 |

F I G. 32

| INPUT CHANNEL \ LAPSED TIME | T1 | T2 | T3 | T4 | T5 | T6 | T7 | T8 | T9 | T10 | T11 |
|---|---|---|---|---|---|---|---|---|---|---|---|
| 1 | OUTPUT CHANNEL6 | OUTPUT CHANNEL7 PACKET1 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 |
| 2 | OUTPUT CHANNEL7 | OUTPUT CHANNEL8 | OUTPUT CHANNEL1 PACKET2 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 |
| 3 | OUTPUT CHANNEL8 | OUTPUT CHANNEL1 | OUTPUT CHANNEL2 | OUTPUT CHANNEL3 PACKET3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 |
| 4 | OUTPUT CHANNEL1 | OUTPUT CHANNEL2 | OUTPUT CHANNEL3 | OUTPUT CHANNEL4 | OUTPUT CHANNEL5 PACKET4 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 |
| 5 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 |
| 6 | OUTPUT CHANNEL3 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 |
| 7 | OUTPUT CHANNEL4 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 |
| 8 | OUTPUT CHANNEL5 | OUTPUT CHANNEL6 | OUTPUT CHANNEL7 | OUTPUT CHANNEL8 | OUTPUT CHANNEL1 | OUTPUT CHANNEL2 | OUTPUT CHANNEL3 | OUTPUT CHANNEL4 | OUTPUT CHANNEL5 | OUTPUT CHANNEL6 | OUTPUT CHANNEL7 |

FIG. 35

| | Mem Ad | Store Flag |
|---|---|---|
| CONNECTION No.1 | 00H | 1 |
| | 01H | 1 |
| | 02H | 1 |
| | | |
| | | |
| | | |
| | FDH | 0 |
| | FEH | 0 |
| | FFH | 0 |
| CONNECTION No.2 | 100H | 1 |
| | 101H | 0 |
| | | |
| | | |
| | 1FEH | 0 |
| | 1FFH | 0 |
| ⋮ | ⋮ | ⋮ |
| | ⋮ | ⋮ |
| | ⋮ | ⋮ |
| | ⋮ | ⋮ |
| CONNECTION No.10 | A00H | 1 |
| | A01H | 0 |
| | | |
| | | |
| | AFEH | 0 |
| | AFFH | 0 |

NODE DEVICE, COMMUNICATION NETWORK HAVING A PLURALITY OF NODE DEVICES, AND CONTROL METHOD THEREFOR

BACKGROUND OF THE INVENTION

1. Field of the Invention

The present invention relates to a node device, communication network system having a plurality of node devices, and control method therefor.

2. Description of the Related Art

In recent years, networks having node devices connected by multiplex transmission paths have been so examined as to cope with high-speed, large-capacity networks for connecting terminal devices along with an increase in information amount.

Some of these networks transmit packets while changing the communication channel in a node device.

An example of this network will be described.

FIG. 11 is a block diagram showing the arrangement of a node device in this network that is connected to terminals 1151 to 1158 via sub-transmission paths.

Reference numerals 1101 to 1108 denote separation/insertion units having a function of detecting the addresses of packets input via parallel multiplex transmission paths, separating the packets into packets to be transmitted to terminals via sub-transmission paths and packets to be input to buffers, and inserting packets transmitted from terminals into packet flows input via the parallel multiplex transmission paths.

Reference numerals 1111 to 1118 denote buffers having a function of temporarily storing packets output from the separation/insertion units in storage areas corresponding to the output terminals of a switch 1141.

Reference numerals 1121 to 1128 and 1131 to 1138 denote parallel multiplex transmission paths for connecting nodes on which a plurality of transmission paths (communication channels) are multiplexed. For example, the parallel multiplex transmission paths 1121 to 1128 and 1131 to 1138 are a plurality of spatially separated optical fiber transmission paths, or wavelength multiplex transmission paths wavelength-divided and multiplexed on one optical fiber.

Reference numeral 1141 denotes a switch controlled by a switch controller 1142 to connect packets input to input terminals IN1 to IN8 to arbitrary output terminals OUT1 to OUT8. The switch 1141 is switched using a space switch or the like when a plurality of optical fiber transmission paths are used for the parallel multiplex transmission paths. When the wavelength multiplex transmission paths are used, transmitters made up of a plurality of tunable laser diodes and multiplexer are connected to the wavelength multiplex transmission paths, and respective wavelengths are demultiplexed by a demultiplexer at the receivers of the wavelength multiplex transmission paths, thereby constituting the switch between nodes, although not shown in FIG. 11. The switch is switched by setting the transmission wavelength of the tunable laser diode to an arbitrary one of wavelengths λ1 to λ8.

The switch controller 1142 controls the switch in accordance with, e.g., a control pattern in FIG. 5.

Reference numeral 1143 denotes a buffer controller for controlling to read out a packet stored in the buffer when the input terminal of the switch connected to each buffer is connected to a desired output terminal.

FIG. 5 shows a control pattern representing the connection relationship between the input and output of the switch 1141. The input/output connection relationship of the switch is changed by control addresses A1 to A8. The input terminals IN1 to IN8 correspond to the buffers 1111 to 1118, and the output terminals OUT1 to OUT8 (or transmission wavelengths λ1 to λ8) correspond to storage areas 1 to 8 of the buffers.

The communication principle of the network will be explained with reference to FIG. 13. For illustrative convenience, FIG. 13 shows node devices each having four terminals connected to parallel multiplex transmission paths made up of four transmission paths.

This network has a plurality of rings A, B, C, and D, and these rings are connected to each other by switches 1305 to 1308.

Each terminal is connected to one ring transmission path of the parallel transmission paths A, B, C, and D, and when communicating with a terminal connected to another ring, switched at least once to that ring by an arbitrary switch. The switching position is not specified. To facilitate communication control, the terminal is switched to a transmission path connected to a destination terminal at a node immediately preceding the destination node, and switched to an arbitrary transmission path at another node.

To simplify the node device in this network, the switches 1305 to 1308 change the input/output connection relationship in accordance with a specific cyclic pattern every predetermined period regardless of an input signal. Input signals are temporarily stored in buffers 1309 to 1312. When the input/output connection relationship of the switch attains a desired one, packets are read out from the buffers and switched.

For example, when a terminal 1322 communicates with a terminal 1332, a packet output from the terminal 1322 is stored in the buffer 1309 of a node 1301. When the input terminal IN2 of the switch 1305 is connected to, e.g., the output terminal OUT2, the packet is read out from the buffer and output to the transmission path B. When IN2 and OUT4 of the switch 1306 are connected, the packet input to the buffer 1310 of anode 1302 is readout from the buffer, output to the transmission path D, and transmitted to the terminal 1332.

In this way, communication is done by switching to an arbitrary ring transmission path at each node device.

In this network, when a plurality of packets transmitted by a given terminal reach a destination terminal, the packet transmission order of the transmitting terminal may be different from the packet reception order.

This will be described with reference to FIGS. 5, 6, 7, 11, and 12.

In the following description, the parallel multiplex transmission paths are a plurality of spatially separated optical fiber transmission paths, and the switch is a space switch. When the wavelength multiplex transmission paths are used, almost the same operation is done based on the above principle. An example of operation when a terminal 1213 communicates with a terminal 1232 will be explained.

Data transmitted from the terminal 1213 is segmented into fixed-length packets 1, 2, 3, and 4, and each packet is output with a destination address described at its header. Output packets 1, 2, 3, and 4 are input to a node device 1201 via a sub-transmission path, inserted in a packet flow from the parallel multiplex transmission path by the separation/insertion unit 1103, and transmitted to the buffer 1113. Since the destination address of the input packet does not coincide with the address of an adjacent downstream node device, the buffer 1113 stores the packet in an arbitrary storage area. In this case, packets 1, 2, 3, and 4 are respectively stored in storage areas 1, 2, 3, and 4.

The buffer controller 1143 waits for reading out packet 1 until the input terminal IN3 of the switch 1141 is connected to the output terminal OUT1. When the input terminal IN3 is connected to the output terminal OUT1, buffer controller 1143 reads out packet 1. The buffer controller 1143 similarly reads out packets 2, 3, and 4. The switch controller 1142 sequentially supplies control addresses A1, A2, A3, A4, A5, A6, A7, and A8 in accordance with a table shown in FIG. 5 to change the connection relationship of the switch 1141. Further, the switch controller 1142 supplies the control addresses every 1-packet period to control to repeat the same pattern every 8-packet period. The switch controller 1142 informs the buffer controller 1143 of this information, thereby controlling the buffer read timing.

In this example, when the input terminal IN3 of the switch 1141 is connected to the output terminal OUT1, packet 1 is read out from storage area 1 of the buffer 1113, and output to the transmission path 1131 via the output terminal OUT1 of the switch 1141. Similarly, when the input terminal IN3 of the switch 1141 is connected to the output terminal OUT2, packet 2 is read out from storage area 2 of the buffer 1113. When the input terminal IN3 of the switch 1141 is connected to the output terminal OUT3, packet 3 is read out from storage area 3 of the buffer 1113. When the input terminal IN3 of the switch 1141 is connected to the output terminal OUT4, packet 4 is read out from storage area 4 of the buffer 1113. These packets are respectively output to the transmission paths 1132, 1133, and 1134.

FIG. 6 shows this state. Note that the timing relationship in FIGS. 5 and 6 is as follows. The switch controller 1142 outputs to the switch 1141 the control address A7 of the table shown in FIG. 5 in the time period T1, the control address A8 in the time period T2, the control address A1 in the time period T3, and the control address A2 in the time period T4.

Packets 1, 2, 3, and 4 having passed through the transmission paths 1121, 1122, 1123, and 1124, respectively, are input to a node device 1202. Packets 1, 2, 3, and 4 pass through the separation/insertion units 1101, 1102, 1103, and 1104, and are input to the buffers 1111, 1112, 1113, and 1114 in the time periods T2, T3, T4, and T5, respectively (see FIG. 7).

FIG. 7 shows the specific time periods and input channels of packets 1, 2, 3, and 4, and the connection relationship between the input and output channels in each time period. The connection relationship between the input and output channels is changed by changing connection between the input terminal IN and output terminal OUT of the switch 1141, as described above. For example, input channel 1 and output channel 5 are connected by connecting IN1 and OUT5 of the switch 1141.

The buffers 1111, 1112, 1113, and 1114 of the node device 1202 detect the headers to find that each destination address coincides with the address of an adjacent down stream node device. Thus, the buffers 1111, 1112, 1113, and 1114 designate storage areas corresponding to a transmission path connected to the destination terminal. In this example, since the destination terminal is connected to the transmission path 1132, packets 1, 2, 3, and 4 are respectively stored in storage areas 2 of the buffers 1111, 1112, 1113, and 1114.

A read of packets 1, 2, 3, and 4 from the respective buffers in the node device 1202 will be explained. Assume that the output timing of the control address from the switch controller 1142 in the node devices 1201 and 1202 is as follows. When the switch controller 1142 of the node device 1201 outputs the control address A7 in the time period T1, the switch controller 1142 of the node device 1202 outputs the control address A6. That is, the output timing of the control address in the node device 1202 is delayed by the time period T from the output timing of the control address in the node device 1201.

As is apparent from FIG. 7, the connection timings of input channels 1, 2, 3, and 4 to output channel 2 are respectively in the time periods T5, T4, T11, and T10. Therefore, packets 1, 2, 3, and 4 are respectively output from output channel 2 in the time periods T5, T4, T11, and T10, and pass through the transmission path 1132.

That is, packets 1, 2, 3, and 4 are output to a node device 1203 in the order of packets 2, 1, 4, and 3. Since each destination address designates a terminal connected to the separation/insertion unit 1102, packets 2, 1, 4, and 3 input to the separation/insertion unit 1102 of the node device 1203 are separated from the transmission path and output toward the terminal. The packets output from the separation/insertion unit 1102 toward the terminal are received by the terminal 1232 via a sub-transmission path.

As described above, a plurality of packets output from the transmitting terminal may reach a destination terminal in a different order from the transmission order.

SUMMARY OF THE INVENTION

It is an object of the present invention to perform communication at high efficiency even in the above network.

It is another object of the present invention to rearrange the order of received packets in a network of performing communication while changing the communication channel.

It is still another object of the present invention to rearrange packets in the packet transmission order, and then transmit them to a destination terminal in a network of performing communication while changing the communication channel.

It is still another object of the present invention to receive packets by a destination terminal with traffic characteristics based on the transmission traffic characteristics of the packet in a network including a communication device for performing communication while changing the communication channel.

It is still another object of the present invention to make the transmission traffic characteristics of the packet equal to reception traffic characteristics at a destination terminal in the network including a communication device for performing communication while changing the communication channel.

It is still another object of the present invention to guarantee QoS (Quality of Service) of ATM, and particularly, CDV (Cell Delay Variation) of QoS in a communication device for performing communication while changing the communication channel.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a table showing information of a sequential memory in each time period;

FIG. 4 is a table showing information of a store flag memory in each time period;

FIG. 5 is a table showing connection control information of a switch;

FIG. 6 is a table showing the connection relationship of each channel in each time period and the transmission timing of a transmitted packet;

FIG. 7 is a table showing the connection relationship of each channel in each time period and the input timing of a transmitted packet to each channel;

FIG. 18 is a table showing information in the sequential register according to the fifth embodiment of the present invention;

FIG. 19 is a table showing information in the store flag memory according to the fifth embodiment of the present invention;

FIG. 28 is a table showing information of the sequential memory in each time period according to the seventh embodiment of the present invention;

FIG. 29 is a table showing information of the store flag memory in each time period according to the seventh embodiment of the present invention;

FIG. 31 is a table showing the connection relationship of each channel in each time period and the transmission timing of a transmitted packet in the node device used in the seventh embodiment of the present invention;

FIG. 32 is a table showing the connection relationship of each channel in each time period and the transmission timing of a transmitted packet in the node device used in the seventh embodiment of the present invention;

FIG. 35 is a table showing the arrangement of the store flag memory in the traffic setting unit used in the eighth embodiment of the present invention.

DETAILED DESCRIPTION OF THE PREFERRED EMBODIMENTS

First Embodiment

The first embodiment of the present invention will be described.

Figure 1:
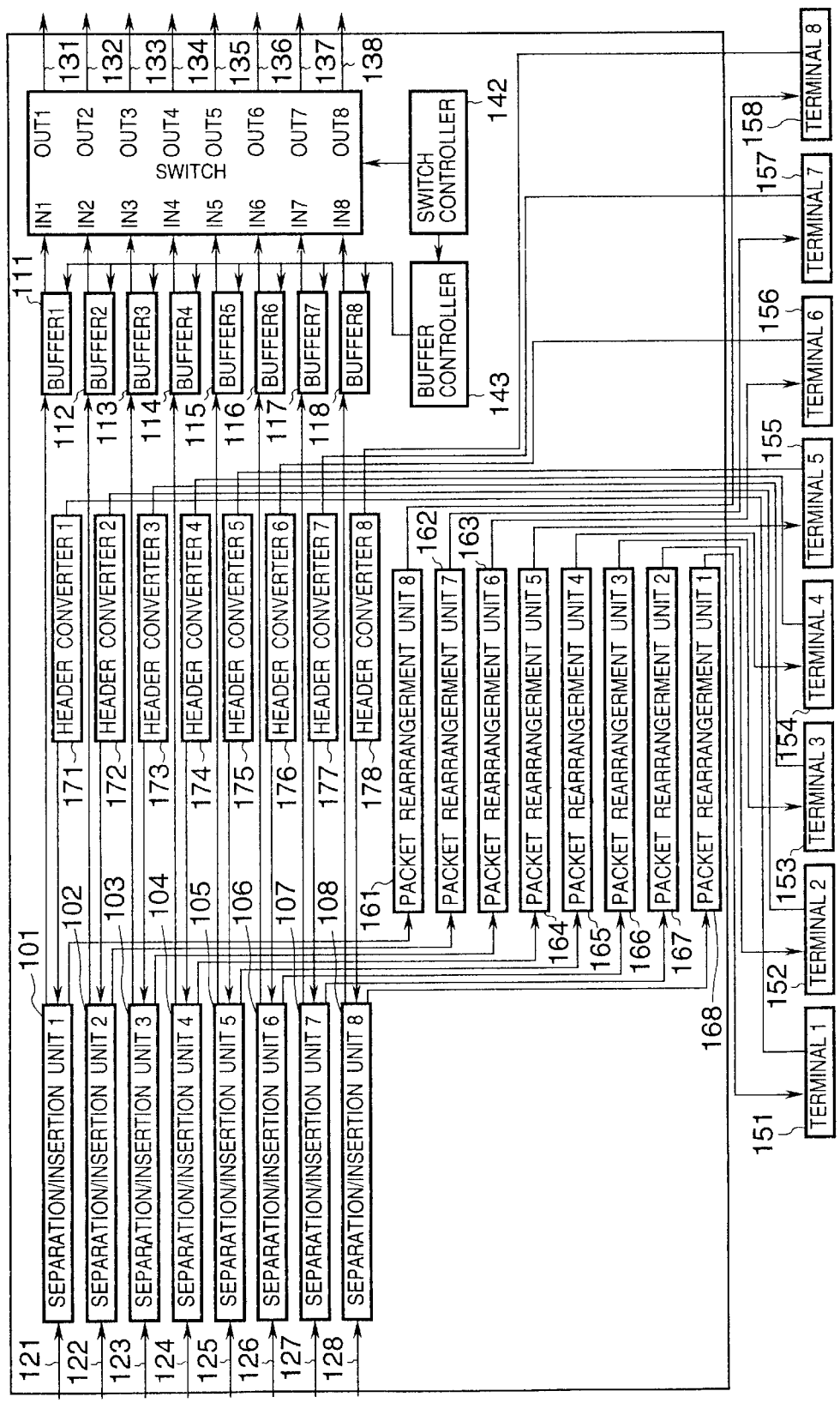
FIG. 1 is a block diagram showing the arrangement of a node device according to the first embodiment of the present invention.
Figure 11:
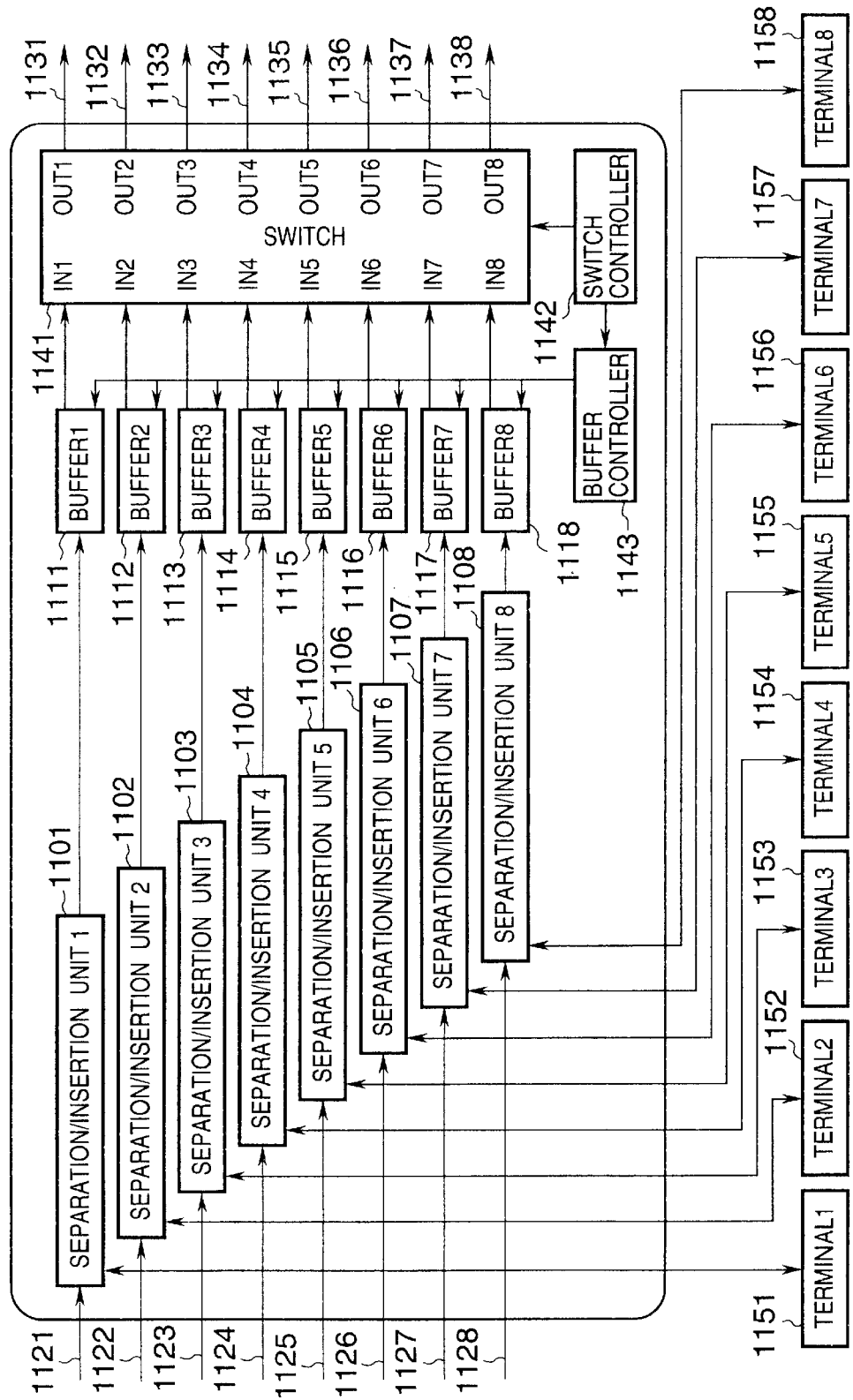
FIG. 11 is a block diagram showing the arrangement of a conventional node device.

FIG. 1 is a block diagram showing the arrangement of a node device used in a network according to the first embodiment. This node device is different from the conventional node device (FIG. 11) by a header converter for rewriting header information of a packet transmitted from a terminal, and a packet rearrangement unit for rearranging packets separated in each separation/insertion unit.

Reference numerals 171 to 178 denote header converters having a function of adding a connection number corresponding to the reception connection of a destination terminal and a sequential number representing the transmission order to header information of a packet transmitted from the terminal together with the address of the node device and the address of the destination terminal. In the first embodiment, the number of connections is 10, and the sequential number ranges from 1 to 256.

Reference numerals 161 to 168 denote packet rearrangement units having a function of rearranging packets separated by the insertion/separation unit in the transmission order on the basis of the connection number and sequential number as header information every connection.

Figure 2:
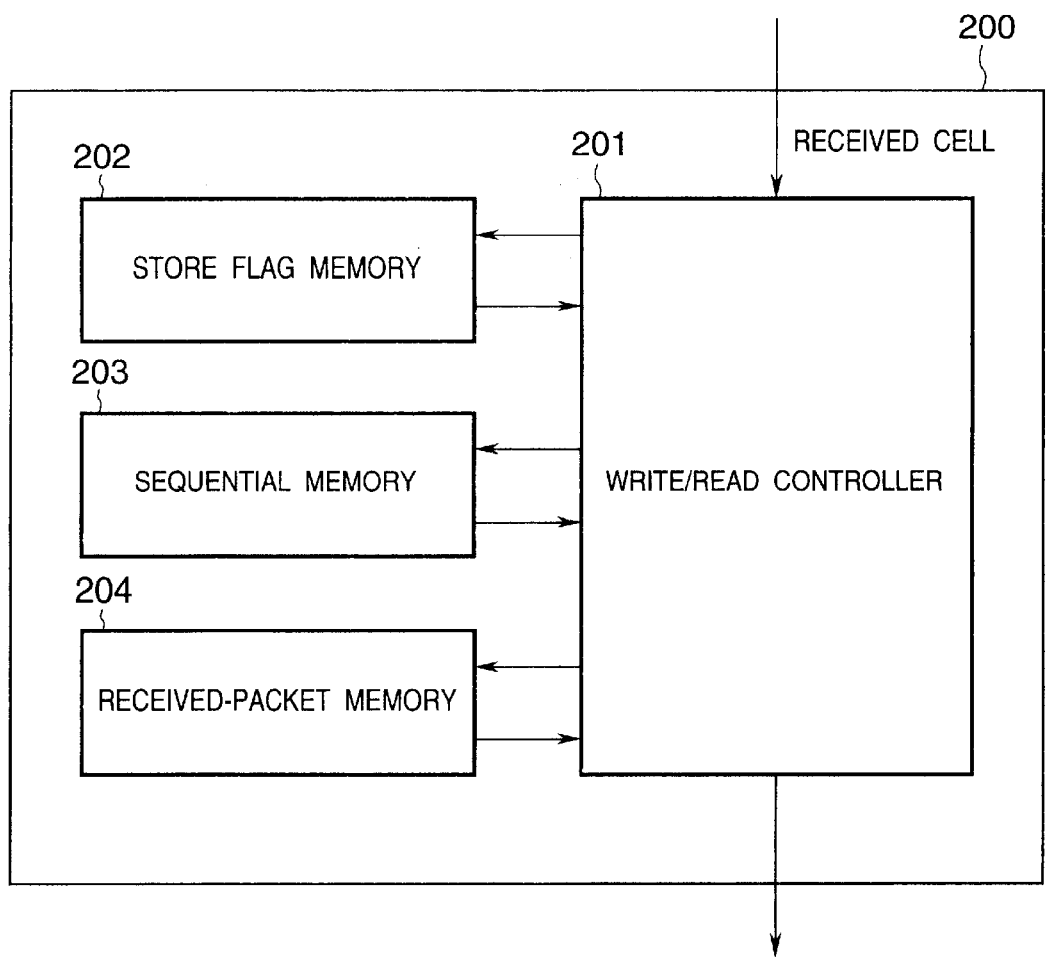
FIG. 2 is a block diagram showing the arrangement of a packet rearrangement unit according to the first embodiment of the present invention.

FIG. 2 is a block diagram showing the arrangement of the packet rearrangement unit in the node device according to the first embodiment.

Reference numeral 201 denotes a write/read controller for writing an input packet in the storage area of a received-packet memory 204 corresponding to the connection number and sequential number described in packet header information. The write/read controller 201 has a function of reading out received packets from the received-packet memory 204 in the transmission order on the basis of information in a store flag memory 202 and sequential memory 203 (to be described below). The packet rearrangement function will be described later in detail.

Reference numeral 202 denotes a store flag memory for storing information representing the sequential number of a packet written in the received-packet memory 204 every connection.

Reference numeral 203 denotes a sequential memory for storing the sequential number of a packet to be read out next in each connection.

FIG. 3 is a table showing information in the sequential memory 203 in each time period.

Information stored in the sequential memory 203 includes information representing whether a given connection is used, i.e., a packet having the connection number has already been written in the received-packet memory 204, and information representing a sequential number subjected to the next read in this connection. Note that "Mem Adr" represents the address of the sequential memory 203 and corresponds to the connection number. "Conn No." represents the connection number for descriptive convenience, and such storage area need not exist in an actual sequential memory. "USE Conn" represents a storage area indicating whether a packet is stored in the received-packet memory 204 corresponding to the connection. A value "1" in USE Conn means that a packet is stored in the received-packet memory 204 corresponding to the connection. "Seq. No." represents the sequential number of a packet to be read out next in the received-packet memory 204 corresponding to the connection. When a packet is written in and readout from the received-packet memory 204, write and read addresses are generated based on the connection number and sequential number as packet header information.

Figure 4:
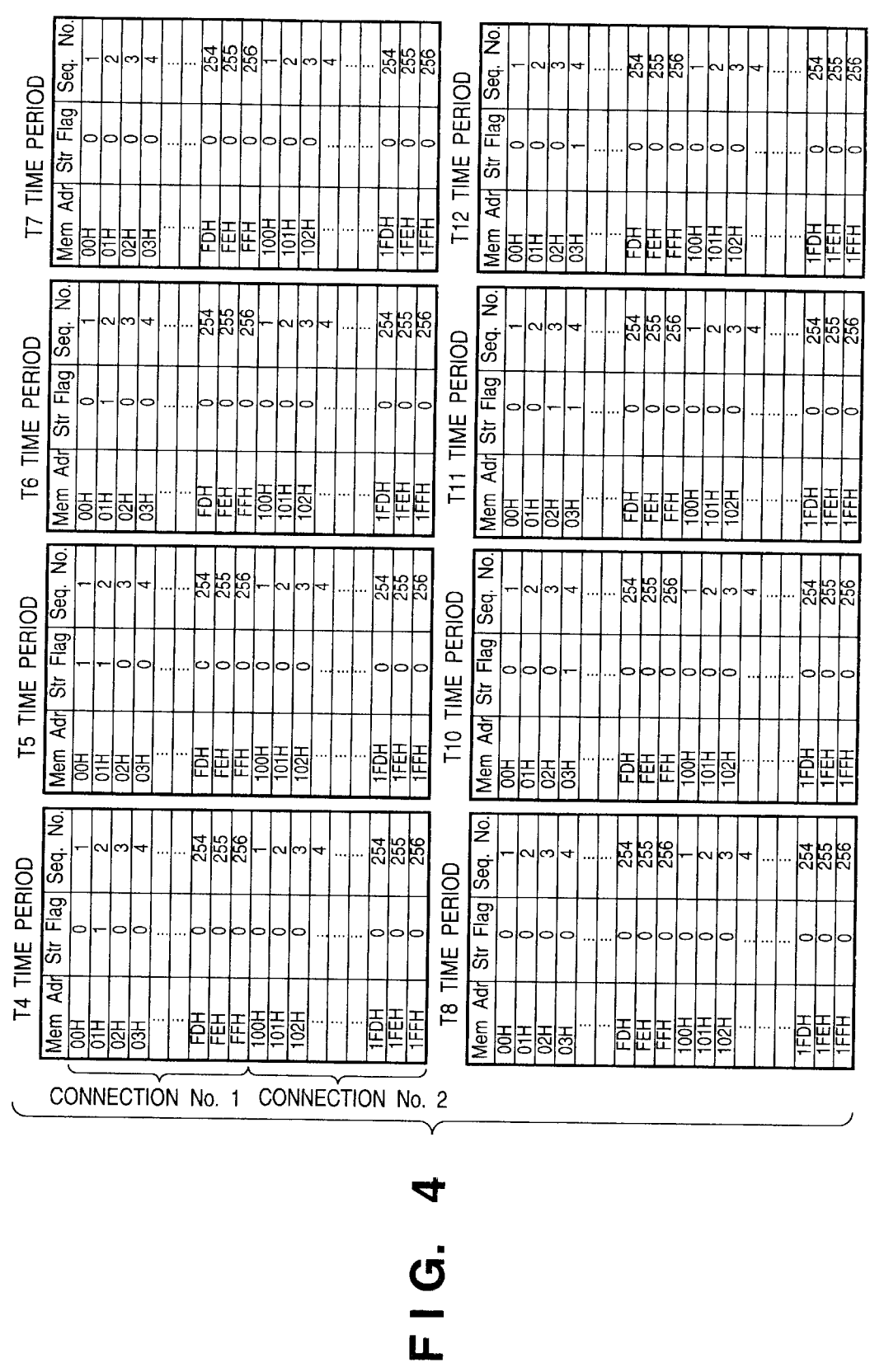

FIG. 4 is a table showing information in the store flag memory 202 in each time period. "Mem Adr" represents the address of the store flag memory 202. "Seq. No." represents the sequential number of each connection for descriptive convenience, and such storage area need not exist in an actual store flag memory. "Str Flag" represents a flag indicating whether a packet having the sequential number (:Seq. No.) in a corresponding connection number is stored in the received-packet memory 204. A value "1" in Str Flag means that a packet is stored. Note that information in the store flag memory 202 in FIG. 4 is limited to information about connection 1 and connection 2 for descriptive convenience. A storage area having Mem Adr from 00H to FFH corresponds to a connection number of 1, and a storage area having Mem Adr from 100H to 1FFH corresponds to a connection number of 2. The write/read controller 201 recognizes the address space of the storage area of the store flag memory 202 corresponding to each connection.

Figure 12:
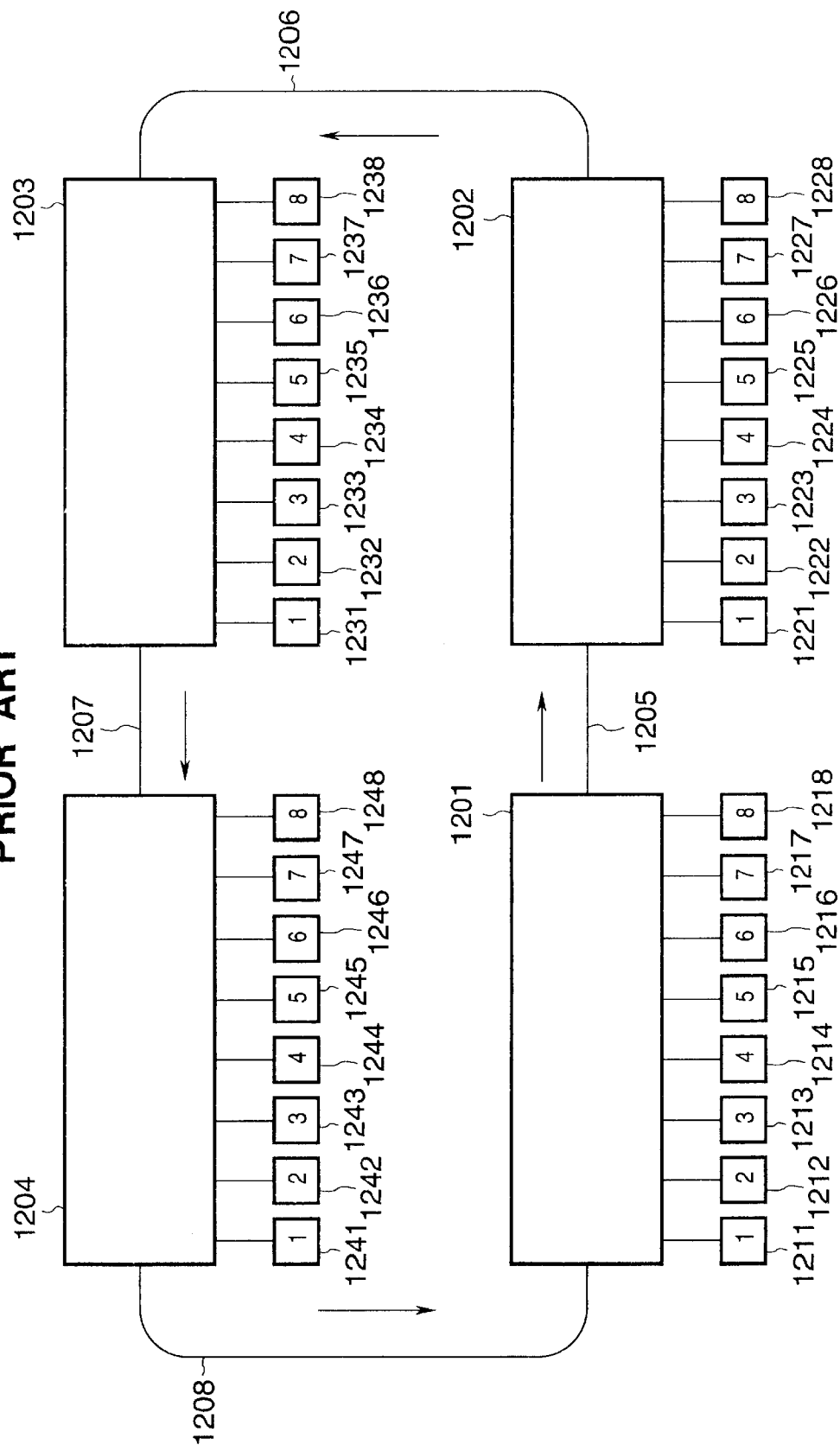
FIG. 12 is a block diagram showing the arrangement of a network.
Figure 13:
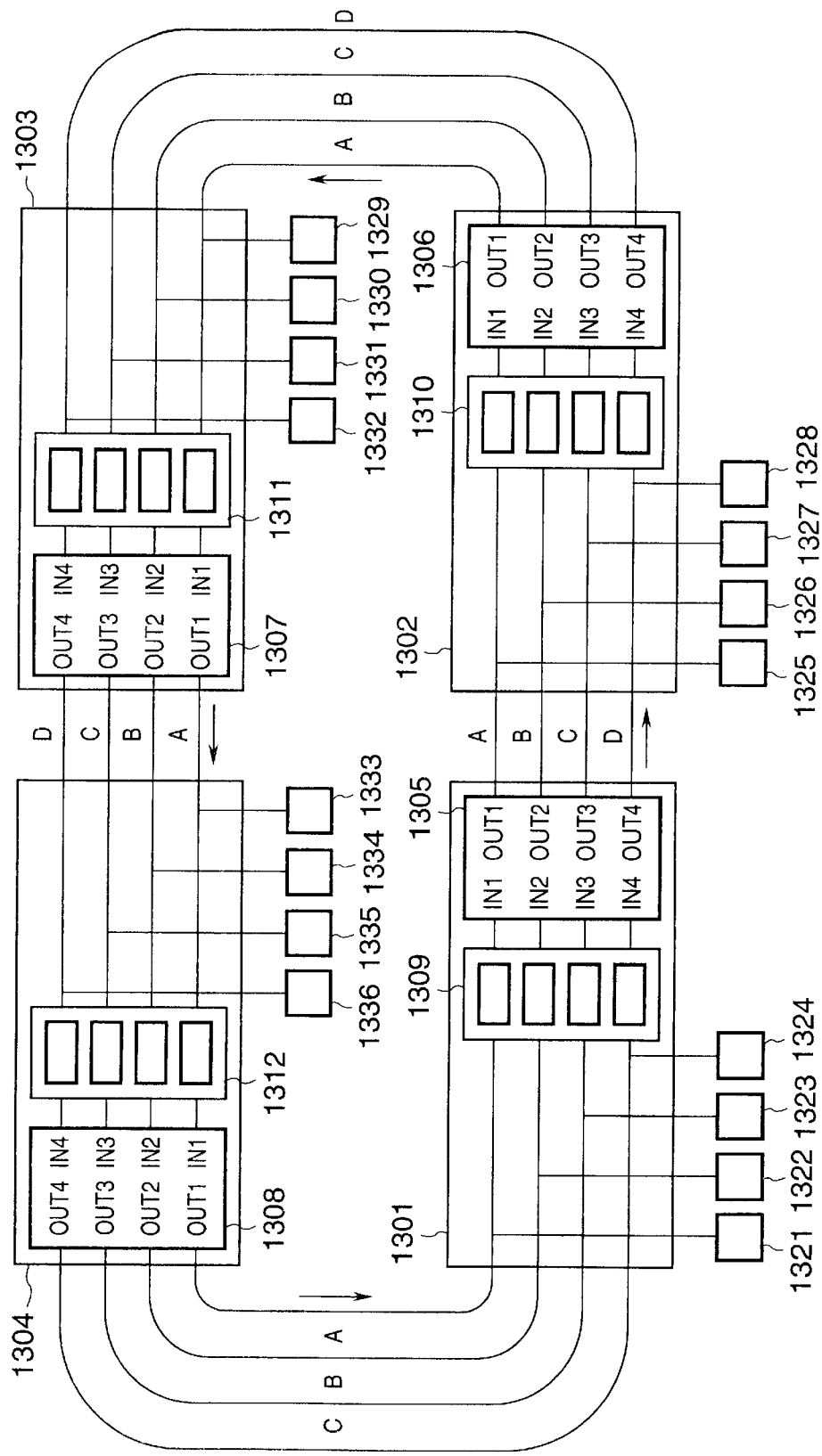
FIG. 13 is a block diagram showing the communication principle of a conventional network.

In the first embodiment, packet communication between node devices is the same as the prior art, and only operation of rearranging packets in the transmission order will be explained in detail. The input order of packets separated by the separation/insertion unit and input to the packet rearrangement unit in a different order from the transmission order will be explained with reference to the example described in the prior art. More specifically, assume that packets 1, 2, 3, and 4 are output from output channel 2 of anode device 1202 in FIG. 12 in the time periods T5, T4, T11, and T10, respectively. Assume also that in the separation/insertion unit 102 of a node device 1203, packets 2, 1, 4, and 3 are input to the packet rearrangement unit 162 in the time periods T4, T5, T10, and T11, respectively. The headers of packets 1, 2, 3, and 4 are transmitted with a connection number of 1 representing connection 1, and 1, 2, 3, and 4 as the sequential numbers of packets 1, 2, 3, and 4 in the header converter 173 of a node device 1201.

That is, a terminal 153 connected to the node device 1201 segments transmitted data into fixed-length packets 1, 2, 3, and 4, adds to the header of each packet a destination address for transmitting the packet to a terminal 152 connected to the node device 1203, and transmits the packet to the header converter 173.

The header converter 173 adds a connection number of 1 to the headers of packets 1, 2, 3, and 4, adds sequential numbers of 1, 2, 3, and 4 to packets 1, 2, 3, and 4, and outputs packets 1, 2, 3, and 4 to a separation/insertion unit 123. Packets 1, 2, 3, and 4 input to the separation/insertion unit 123 are output to a buffer 113 and communicated to the node device 1203 similarly to the prior art.

Operation of the packet rearrangement unit 162 of the node device 1203 which receives packets 1, 2, 3, and 4 will be described.

In the time period T4, header information of packet 2 contains a connection number of 1 and sequential number of 2. Thus, the write/read controller 201 in the packet rearrangement unit 162 writes packet 2 in a storage area corresponding to a connection number of 1 and sequential number of 2 in the received-packet memory 204. The write/read controller 201 generates a write address for the received-packet memory 204 on the basis of the connection number and sequential number.

Also in reading out a received packet from the received-packet memory 204, the write/read controller 201 generates a read address from the connection number and sequential number. At the same time as a packet write, the write/read controller 201 writes "1" in a storage area Str Flag corresponding to a connection number of 1 and sequential number of 2 in the store flag memory 202. The store flag memory 202 further writes "1" in a storage area USE Conn and storage area Seq. No. corresponding to a connection number of 1 in the sequential memory 203. In this write, "Use Conn" represents that the packet is stored in the storage area of the received-packet memory 204 corresponding to the connection number, and "Seq. No." represents a sequential number subjected to the next read in this connection. "Seq. No." in the store flag memory 202 represents the sequential number, and "Str Flag" represents whether a packet having the sequential number added to the header is written in the received-packet memory 204.

Note that "1" in Str Flag represents that the packet is written in the received-packet memory 204.

Hence, the store flag memory 202 represents that the received packet is written in a storage area corresponding to a connection number of 1 and sequential number of 2 in the received-packet memory 204. The sequential memory 203 represents that the connection having a connection number of 1 is used, and the sequential number of a packet to be read out next is 1. This state is shown by the store flag memory in the time period T4 in FIG. 4 and the sequential memory in the time period T4 in FIG. 3.

In the time period T5, since packet 1 is input, the write/read controller 201 in the packet rearrangement unit 162 writes packet 1 in a storage area corresponding to a connection number of 1 and sequential number of 1 in the received-packet memory 204 on the basis of a connection number of 1 and sequential number of 1 as header information of packet 1. At the same time as a write of packet 1, the write/read controller 201 writes "1" in a storage area Str Flag corresponding to a connection number of 1 and sequential number of 1 in the store flag memory 202. This state is shown by the store flag memory in the time period T5 in FIG. 4.

Read control of a packet from the received-packet memory 204 will be explained. The write/read controller 201 recognizes a connection used (:USE Conn=1) and the sequential number (:Seq. No.) of a packet to be read out next in the connection used on the basis of readout data from the sequential memory 203. The write/read controller 201 reads out the Str Flag value of the store flag memory 202 corresponding to the connection and the sequential number subjected to the next read. When the Str Flag value is 1 (:representing that the packet is stored in the received-packet memory 204), the write/read controller 201 generates a read address from the sequential number of the connection, and reads out the packet from the received-packet memory 204.

The write/read controller 201 accesses the sequential memory 203 in the connection number order, and reads out the USE Conn value and Seq. No. value. Since the USE Conn value and Seq. No. value on the sequential memory 203 are 1 each in the time period T4, the write/read controller 201 searches for the Str Flag value for Seq. No. 1 of Connection No. 1 in the store flag memory 202.

As is apparent from the store flag memory in the time period T4 in FIG. 4, no packet having an Str Flag value of 0, a connection number (:USE Conn) of 1, and a sequential number (:Seq No.) of 1 subjected to the next read is written in the received-packet memory 204. Thus, the write/read controller 201 reads out the USE Conn value and Seq. No. value of the next connection in the sequential memory 203. Since the USE Conn value and Seq. No. value of the sequential memory 203 are 1 each in the time period T5, the write/read controller 201 searches for the Str Flag value for Seq. No. 1 of Connection No. 1 in the store flag memory 202.

As is apparent from the store flag memory in the time period T5 in FIG. 4, a packet having an Str Flag value of 1, a connection number (:USE Conn) of 1, and a sequential number (:Seq No.) of 1 subjected to the next read is written in the received-packet memory 204. In the time period T6, the write/read controller 201 generates a read address from the connection number and sequential number, reads out packet 1 having a connection number of 1 and a sequential number of 1 from the received-packet memory 204, outputs packet 1 to the terminal 152, and sets "0" in Str Flag for a connection number of 1 and Seq. No. 1 in the store flag memory 202.

The write/read controller 201 writes "2" as a sequential number subjected to the next read in Seq. No. of Conn No. 1 in the sequential memory 203.

The write/read controller 201 searches again for the Str Flag value for Seq. No. 2 of Connection No. 1 in the store flag memory 202.

As is apparent from the store flag memory 202 in the time period T6 in FIG. 4, the Str Flag value for a sequential number (:Seq. No.) of 2 corresponding to a connection number of 1 is 1. In the time period T7, the write/read controller 201 generates a read address from the connection number and sequential number, reads out packet 2 having a connection number of 1 and sequential number of 2 from the received-packet memory 204, outputs packet 2 to the terminal, and sets "0" in Str Flag for Seq. No. 2 of Connection No. 1 in the store flag memory 202.

The write/read controller 201 writes "3" as a sequential number subjected to the next read in Seq. No. of Conn No. 1 in the sequential memory 203.

The write/read controller 201 searches for the Str Flag value for Seq. No. 3 corresponding to a connection number of 1 in the store flag memory 202.

As is apparent from the store flag memory 202 in the time period T8 in FIG. 4, the Str Flag value for a sequential number (:Seq. No.) of 3 corresponding to a connection number of 1 is 0. No packet having a connection number of 1 and sequential number of 3 is stored in the received-packet memory 204, and the write/read controller 201 does not read out any packet from the received-packet memory 204. As for a consecutive read of packets corresponding to a give connection number in the received-packet memory 204, the write/read controller 201 can be set to read out all packets having consecutive sequential numbers in the connection. Alternatively, the write/read controller 201 can be set to shift to a read of packets in the next connection after reading out a predetermined number of packets among packets having consecutive sequential numbers.

The write/read controller 201 reads out and circulates the USE Conn value for Conn No. 2, the USE Conn value for Conn No. 3, the USE Conn value for Conn No. 4, . . . , the USE Conn value for Conn No. 10 in the sequential memory 203.

Packets 3 and 4 are also written and read out as follows under the same control.

In the time periods T6, T7, T8, and T9, no packet is input to the packet rearrangement unit 162.

In the time period T10, packet 4 is input. Then, the write/read controller 201 in the packet rearrangement unit 162 writes packet 4 in a storage area corresponding to a connection number of 1 and sequential number of 4 in the received-packet memory 204 from the connection number of 1 and sequential number of 4 as header information of packet 4.

At the same time as a write of packet 4, the write/read controller 201 writes "1" in a storage area Str Flag corresponding to the connection number of 1 and sequential number of 4 in the store flag memory 202. This state is shown by the store flag memory in the time period T10 in FIG. 4.

In the time period T11, packet 3 is input. Then, the write/read controller 201 in the packet rearrangement unit 162 writes packet 3 in a storage area corresponding to a connection number of 1 and sequential number of 3 in the received-packet memory 204 from the connection number of 1 and sequential number of 3 as header information of packet 3. At the same time, the write/read controller 201 writes "1" in a storage area Str Flag corresponding to a connection number of 1 and sequential number of 2 in the store flag memory 202. This state is shown by the store flag memory in the time period T11 in FIG. 4.

In the time period T11, the sequential memory 203 stores a USE Conn value of 1 and Seq. No. 3 (see the sequential memory in the time period T7 in FIG. 3. Since no packet is read out from the time period T7 to the time period T11, sequential memory information in the time period T11 is kept identical to sequential memory information in the time period T7.) The write/read controller 201 searches for the Str Flag value for Seq. No. 3 corresponding to a connection number of 1 in the store flag memory 202.

As is apparent from the store flag memory in the time period T11, the Str Flag value corresponding to a connection number of 1 and sequential number of 3 is 1, and a packet having the connection number (:USE Conn) of land sequential number (:Seq. No.) of 3 for a packet to be read out next is written in the received-packet memory 204. In the time period T12, the write/read controller 201 generates a read address from the connection number and sequential number, reads out packet 3 from the received-packet memory 204, outputs packet 3 to the terminal, and sets "0" in Str Flag of Seq. No. 3 corresponding to a connection number of 1 in the store flag memory 202.

The write/read controller 201 writes "4" as a sequential number subjected to the next read in Seq. No. of Conn No. 1 in the sequential memory 203 (see the sequential memory in the time period T12 in FIG. 3). The write/read controller 201 searches for the Str Flag value for Seq. No. 4 corresponding to a connection number of 1 in the store flag memory 202. As is apparent from the store flag memory 202 in the time period T12 in FIG. 4, the Str Flag value for a sequential number (:Seq. No.) corresponding to the connection number of 1 is 1. In the time period T13, the write/read controller 201 generates a read address from the connection number and sequential number, reads out packet 4 from the received-packet memory 204, outputs packet 4 to the terminal, and sets "0" in Str Flag for Seq. No. 4 corresponding to the connection number of 1 in the store flag memory 202. The write/read controller 201 writes "5" as a sequential number subjected to the next read in Seq. No. of Conn No. 1 in the sequential memory 203.

In this manner, packets 2, 1, 4, and 3 are input to the packet rearrangement unit 162 in the time periods T4, T5, T10, and T11, respectively. The packet rearrangement unit 162 reads out packets 1, 2, 3, and 4 in the time periods T6, T7, T12, and T13, respectively, rearranges them in the transmission order, and transmit them to the terminal 152.

Figure 8:
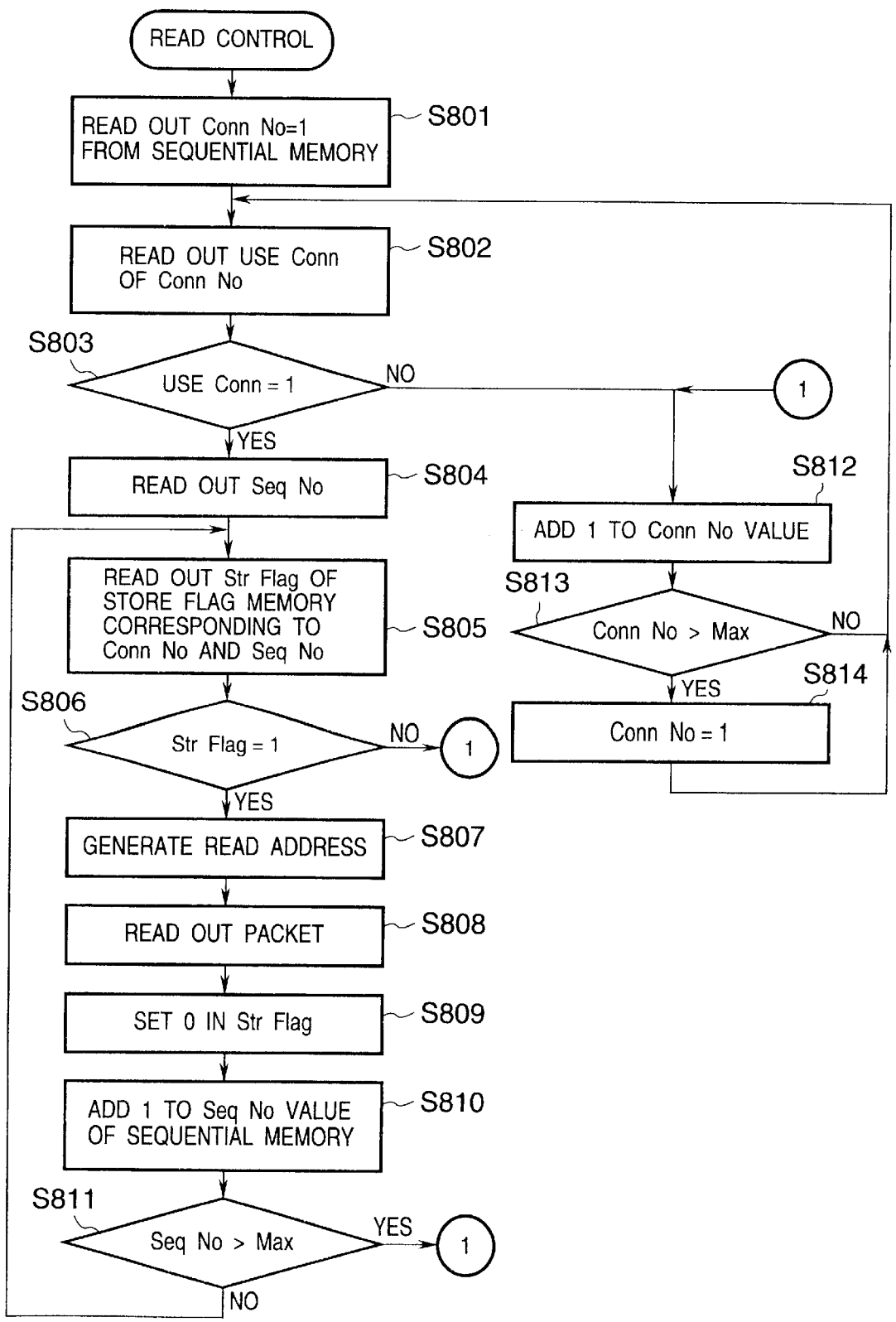
FIG. 8 is a flow chart showing a read control algorithm in the packet rearrangement unit.
Figure 9:
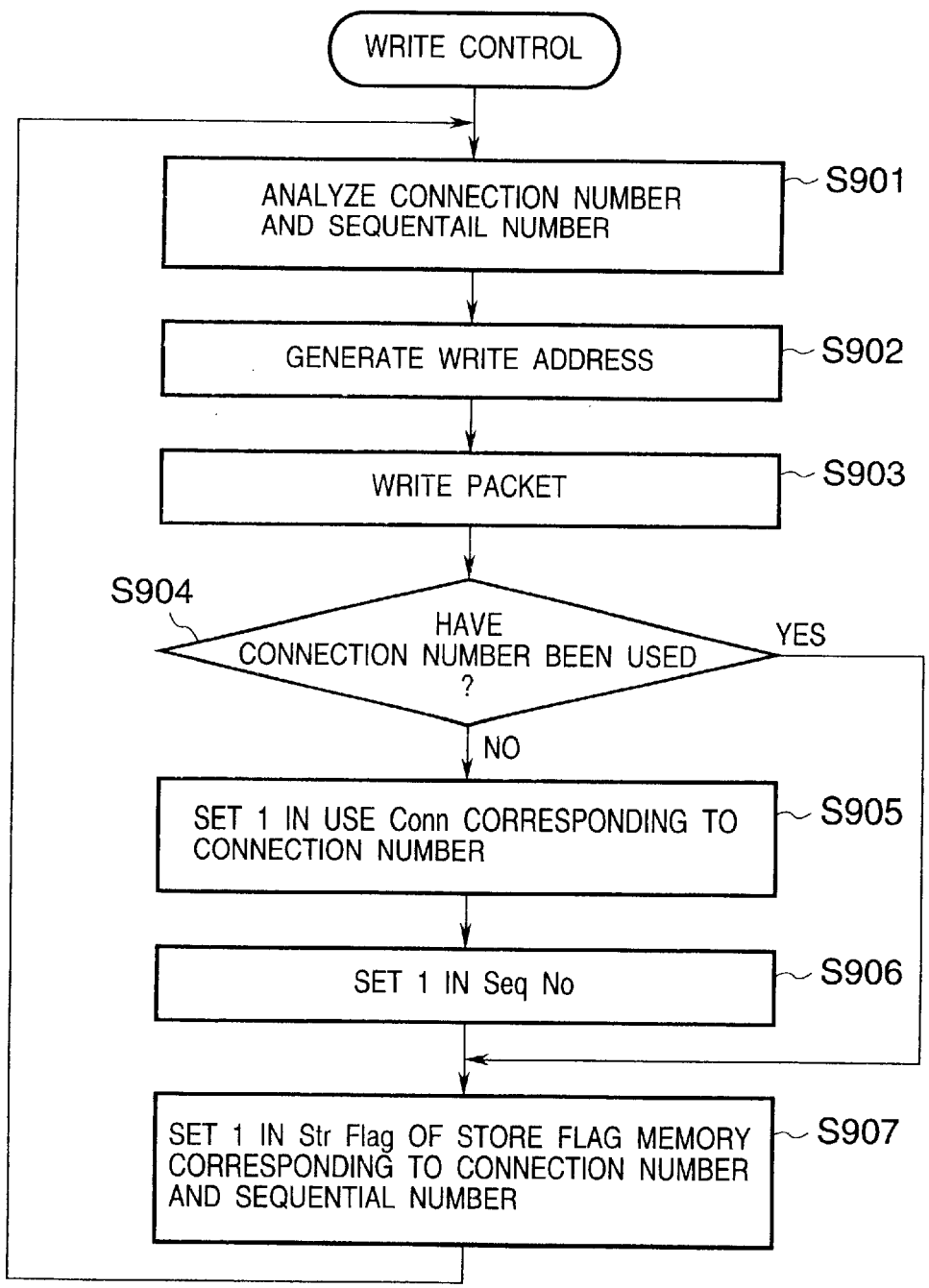
FIG. 9 is a flow chart showing a write control algorithm in the packet rearrangement unit.

FIGS. 8 and 9 show the packet rearrangement algorithm of the write/read controller 201.

FIG. 8 shows the read algorithm of the write/read controller 201, and FIG. 9 shows the write algorithm of the write/read controller 201.

The read and write algorithms will be explained in short with reference to FIGS. 8 and 9.

In FIG. 8, the write/read controller 201 reads out Conn No=1 from the sequential memory (S801).

The write/read controller 201 reads out USE Conn for the readout Conn No=1 (S802), and checks whether the USE Conn value is 1 (S803). If YES in S803, the write/read controller 201 reads out Seq No for Conn No=1 (S804).

The write/read controller 201 reads out Str Flag in the store flag memory 202 corresponding to Seq No. for the readout Conn No=1 (S805), and checks whether the Str Flag value is 1 (S806). If YES in S806, the write/read controller 201 generates a read address based on Conn No and Seq No (S807), and reads out a packet from the received-packet memory 204 (S808). The write/read controller 201 sets "0" in Str Flag in the store flag memory 202 corresponding to the packet read out from the received-packet memory 204 (S809), and adds, "1" to the Seq No value of the sequential memory 203 (S810). If the sum of the Seq No value and "1" does not exceed the maximum value (NO in S811), the write/read controller 201 returns to S805 to read out the Str Flag value corresponding to the updated Seq No value.

If NO in S803, no packet having the connection number of Conn No=1 is not stored in the received-packet memory 204, and the write/read controller 201 adds "1" to the Conn No value (S812). If the Conn No value does not exceed the maximum value (NO in S813), the write/read controller 201 returns to S802 to read out the USE Conn value for the Conn No value. If YES in S813, the write/read controller 201 changes the Conn No value to "1" and returns to S802 (S814).

If NO in S806, no packet corresponding to Conn No and Seq No is stored in the received-packet memory 204, and the write/read controller 201 advances to S812 to set the next Conn No.

If YES in S811, a read of packets stored in the received-packet memory 204 corresponding to Conn No is completed, and the write/read controller 201 reads out packets corresponding to the next Conn No in S812.

By repeating this processing, packets stored in the received-packet memory 204 can be rearranged in the packet transmission order of the transmitting terminal and then transmitted to the receiving terminal.

In FIG. 9, the write/read controller 201 reads out and analyzes the connection number and sequential number from header information of a received packet (S901). The write/read controller 201 generates a write address in the received-packet memory 204 based on the connection number and sequential number (S902), and writes the received packet in the received-packet memory 204 (S903).

The write/read controller 201 checks whether the analyzed connection number is one having been used (S904). If NO in S904, the write/read controller 201 sets "1" in Use Con of the sequential memory 203 corresponding to the connection number (S905), and sets "1" in Seq No (S906).

The write/read controller 201 sets "1" in Str Flag of the store flag memory 202 corresponding to the connection number and sequential number analyzed in S901 (S907), and returns to S901.

If YES in S904, the write/read controller 201 advances to S907.

By this processing, the received packet is written in the received-packet memory 204.

Note that the write/read controller 201 is constituted by a CPU, ROM, RAM, and the like. The above operation can be realized by reading out a program stored in the ROM by the CPU.

When the received-packet memory 204, sequential memory 203, and store flag memory 202 are dual port memories, the read and write algorithms are independently executed. When the received-packet memory 204, sequential memory 203, and store flag memory 202 are memories such as SRAMs, the read and write algorithms are independently executed, but a memory read and write are alternately executed.

Second Embodiment

The second embodiment of the present invention will be described below.

Figure 10:
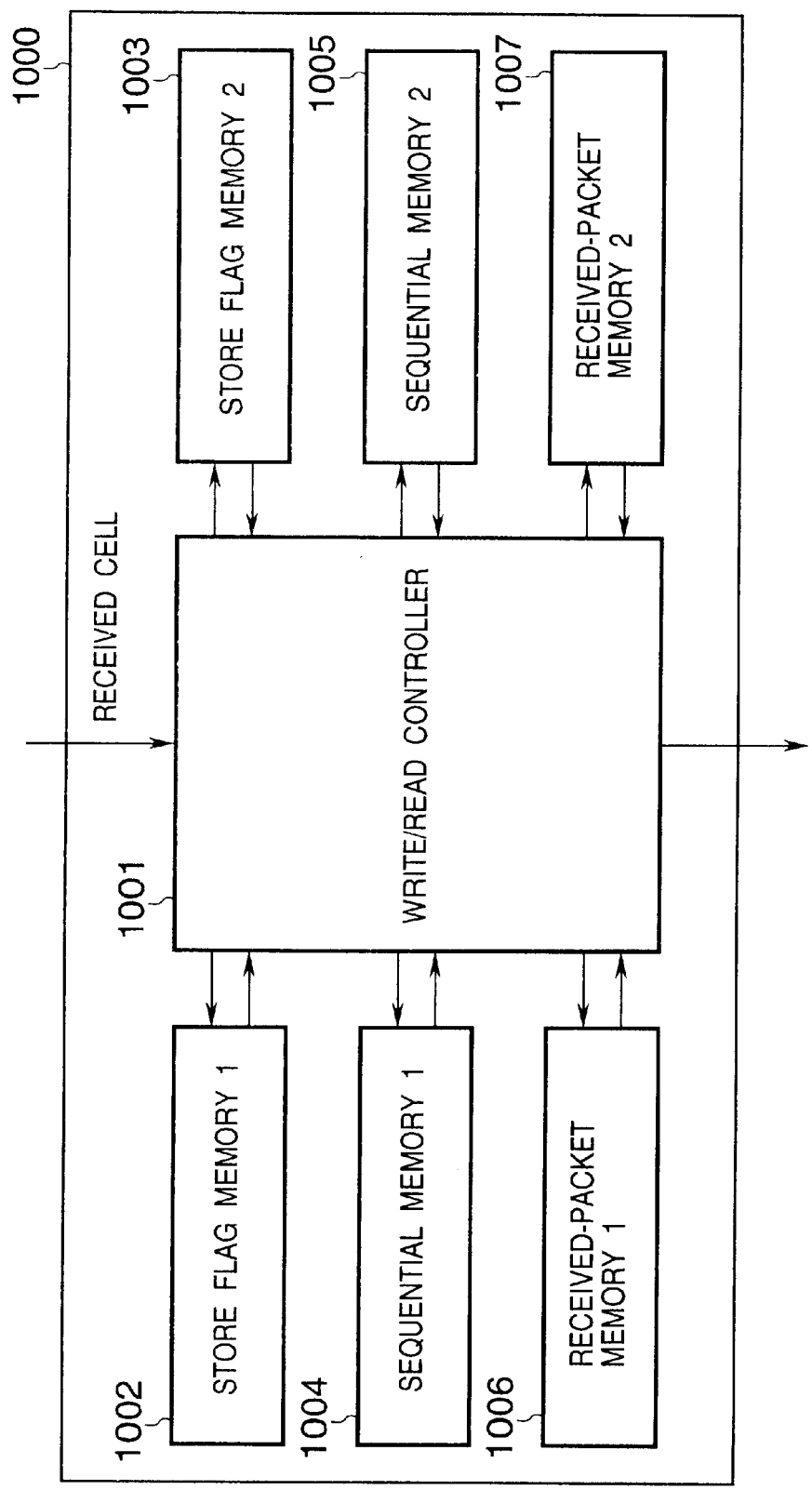
FIG. 10 is a block diagram showing the arrangement of a packet rearrangement unit according to the second embodiment of the present invention.

FIG. 10 is a block diagram showing the arrangement of a packet rearrangement unit in a node device according to the second embodiment. This packet rearrangement unit is different from that described in the first embodiment in that each memory is divided into two.

Reference numeral 1002 denotes store flag memory 1 for storing information representing the sequential number of a packet in each odd connection that is written in received-packet memory 1; 1003, store flag memory 2 for storing information representing the sequential number of a packet in each even connection that is written in received-packet memory 2; 1004, sequential memory 1 for storing the use/non-use of each odd connection and the sequential number of a packet to be read out next in this connection; 1005, sequential memory 2 for storing the use/non-use of each even connection and the sequential number of a packet to be read out next in this connection; 1006, received-packet memory 1 for storing a packet having an odd connection number; and 1007, received-packet memory 2 for storing a packet having an even connection number.

Packet write/read control in the packet rearrangement unit will be described.

A write/read controller 1001 extracts the connection number and sequential number from the header of a received packet, and writes a packet having an odd connection number in the received-packet memory (1) 1006 and a packet having an even connection number in the received-packet memory (2) 1007. Information written in the sequential memory (1) 1004 is about a packet having an odd connection number, and information written in the sequential memory (2) 1005 is about a packet having an even connection number. As for the store flag memory, information about a packet having an odd connection number is written in the store flag memory (1) 1002, and information about a packet having an even connection number is written in the store flag memory (2) 1003. That is, a write in each memory is done under the same control as described in the first embodiment.

Packet read control by the write/read controller 1001 is as follows.

The write/read controller 1001 comprises two controllers each for performing processing in accordance with the read algorithm (FIG. 8) and write algorithm (FIG. 9) described in the first embodiment. One write/read controller performs read/write control for a packet having an odd connection number, and the other performs read/write control for a packet having an even number. In this arrangement, no problem arises when the write/read controller 1001 write a received packet in the received-packet memory (1) 1006 or received-packet memory (2) 1007.

However, when the write/read controller 1001 reads out two received packets from the received-packet memory (1) 1006 and received-packet memory (2) 1007 at the same timing, the two packets collide against each other at the received-packet output terminal of the write/read controller 1001. This problem can be solved by two measures, which will be described below.

First, the write/read controller 1001 incorporates two FIFOs each for storing a packet read out from each received-packet memory, and a processor for controlling to alternately read out packets from the two FIFOs when packets are stored in the two FIFOs.

Second, when the received-packet memories 1006 and 1007, sequential memories 1004 and 1005, and store flag memories 1002 and 1003 are constituted by memories such as SRAMs, a memory write and read must be alternately controlled. A packet is written in the received-packet memory (2) 1007 at the packet read timing for the received-packet memory (1) 1006, and a packet is written in the received-packet memory (1) 1006 at the packet read timing for the received-packet memory (2) 1007. Under this control, packets are not simultaneously read out from the received-packet memory (1) 1006 and received-packet memory (2) 1007.

As described above, the second embodiment can perform packet rearrangement at a higher speed than the first embodiment. Note that the second embodiment is characterized by two packet rearrangement mechanisms. However, the number of rearrangement mechanisms is not limited to two, and three or more rearrangement mechanisms may be adopted to increase the rearrangement speed. For example, when received packets are classified by the remainder of division of connection numbers by four, four rearrangement mechanisms can be adopted to independently rearrange the received packets classified into four.

Third Embodiment

The third embodiment of the present invention will be described below.

Similar to the above embodiments, the third embodiment employs storage area 1 (:Str Flag) in a store flag memory 202 corresponding to the connection number and sequential number described in a packet, storage area 2 (:USE Conn) in a sequential memory 203 corresponding to the connection number, and storage area 3 (:Seq. No.). Data written in storage areas 1 and 3 are different from those in the first and second embodiments.

Storage area 1 stores a write address in the received-packed memory for storing a packet having a connection number and sequential number corresponding to storage area 1. Storage area 3 stores the read address of the last packet read out from a received-packet memory corresponding to the connection number of storage area 3. Packet rearrangement in a write in the sequential memory and store flag memory will be explained below.

A write/read controller 201 in a packet rearrangement unit reads out information from storage areas 2 of the sequential memory 203 in the connection number order, and after reading out information from storage area 2 corresponding to the final connection number, reads out and circulates information from storage area 2 corresponding to a connection number of 1. When information read out from storage area 2 corresponding to a given connection number represents the use of a received-packet memory 204 corresponding to the connection, the write/read controller 201 reads out an address stored in storage area 3 corresponding to the connection, i.e., the read address of the last packet read out from the received-packet memory 204 corresponding to the connection number.

The write/read controller 201 generates address data 1 of a packet to be read out next to the read address, reads out address data in all storage areas 1 corresponding to the connection in the store flag memory 202, and searches for an address which coincides with address data 1. A write address in writing a packed having a given connection number in the received-packet memory 204 is generated from the connection number and sequential number. Thus, the write address of a packet in a given connection has a predetermined regularity, which is recognized by the write/read controller 201.

When coincident address 2 is found, the write/read controller 201 reads out a packet from address 2 of the received-packet memory 204, erases address 2 written in storage area 1 of the store flag memory 202, and writes address 2 in storage area 3 of the sequential memory 203 corresponding to the connection. The write/read controller 201 reads out address data in all storage areas 1 corresponding to the same connection in the store flag memory 202, and searches for an address which coincides with address 3 of a packet to be read out next to address data 2. If no coincident address is found, the write/read controller 201 reads out information from storage area 2 of the sequential memory 203 corresponding to the next connection number; if a coincident address is found, the write/read controller 201 repeats the above-described control to read out a packet from address 3 of the received-packet memory 204.

Fourth Embodiment

In the above description, a plurality of optical fibers are used as one communication channel, as shown in FIG. 1. Alternatively, communication can be done using one optical fiber, as shown in FIG. 14.

In this case, a plurality of wavelengths are multiplexed, each wavelength is used as one communication channel, and communication is performed by one optical fiber.

Figure 14:
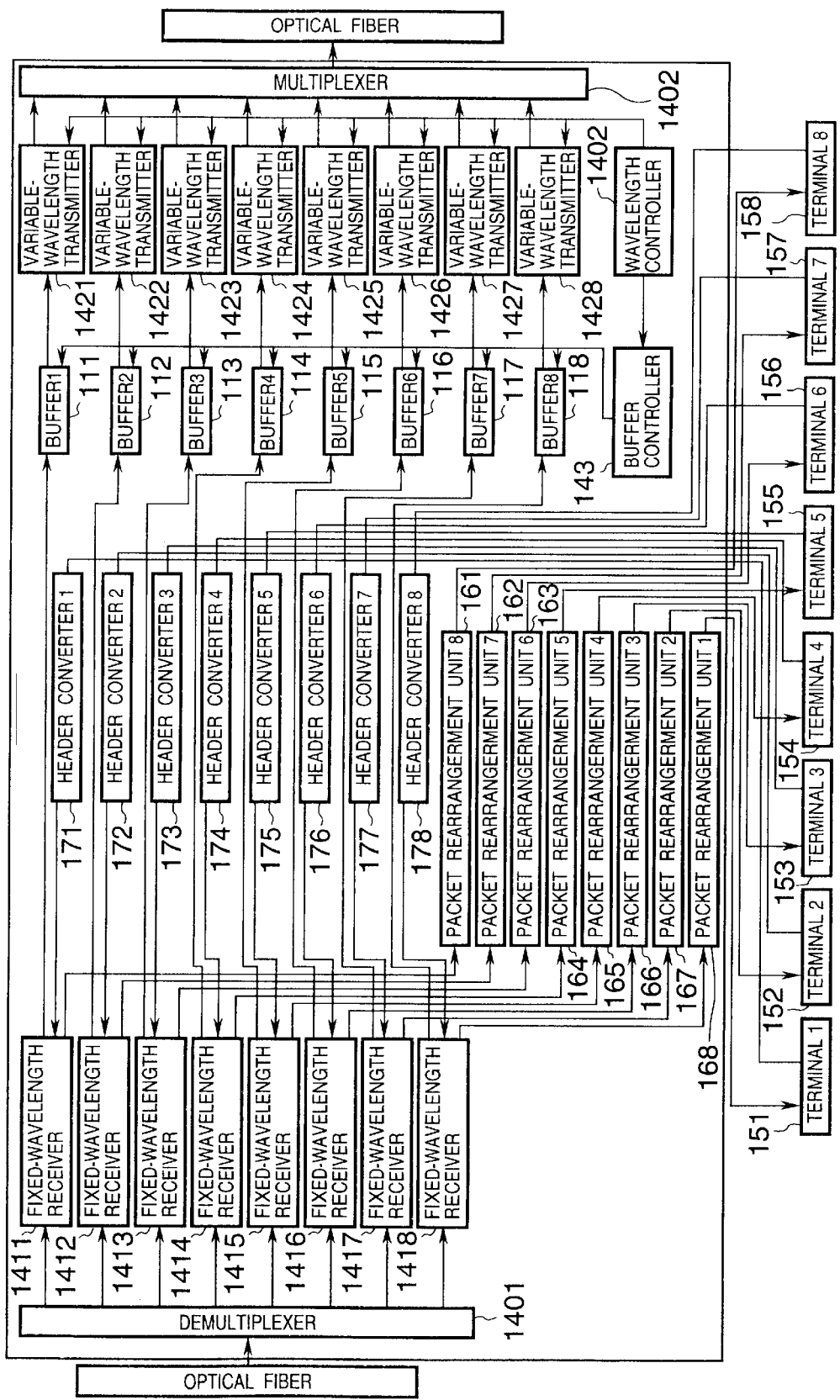
FIG. 14 is a block diagram showing the arrangement of a node device according to the fourth embodiment of the present invention.

In FIG. 14, reference numeral 1401 denotes a demultiplexer for demultiplexing a plurality of wavelengths received via the optical fiber.

Reference numerals 1411 to 1418 denote fixed-wavelength receivers which can receive different specific wavelengths, and receive wavelength signals demultiplexed by the demultiplexer 1401.

The fixed-wavelength receivers 1411 to 1418 convert the received wavelength signals into electrical signals, and output the electrical signals to buffers 111 to 118 or packet rearrangement units 161 to 168.

The fixed-wavelength receivers 1411 to 1418 also receive packets transmitted from terminals via header converters 171 to 178.

Reference numerals 1421 to 1428 denote variable wavelength transmitters for outputting packets output from the buffers 111 to 118 as different wavelength signals to a multiplexer 1402 under the control of a wavelength controller.

Reference numeral 1402 denotes a multiplexer for multiplexing different wavelength signals from the variable wavelength transmitters 1421 to 1428, and outputting the multiplexed signal to one optical fiber.

Reference numeral 1403 denotes a wavelength controller for controlling the variable wavelength transmitters 1421 to 1428 in accordance with a predetermined pattern so as not to simultaneously output identical wavelength signals from the variable wavelength transmitters 1421 to 1428.

The remaining arrangement is the same as in FIG. 1, and a description thereof will be omitted.

Even the node device having this arrangement can perform the same communication as in the first to third embodiments.

Fifth Embodiment

The fifth embodiment of the present invention will be described below.

Figure 15:
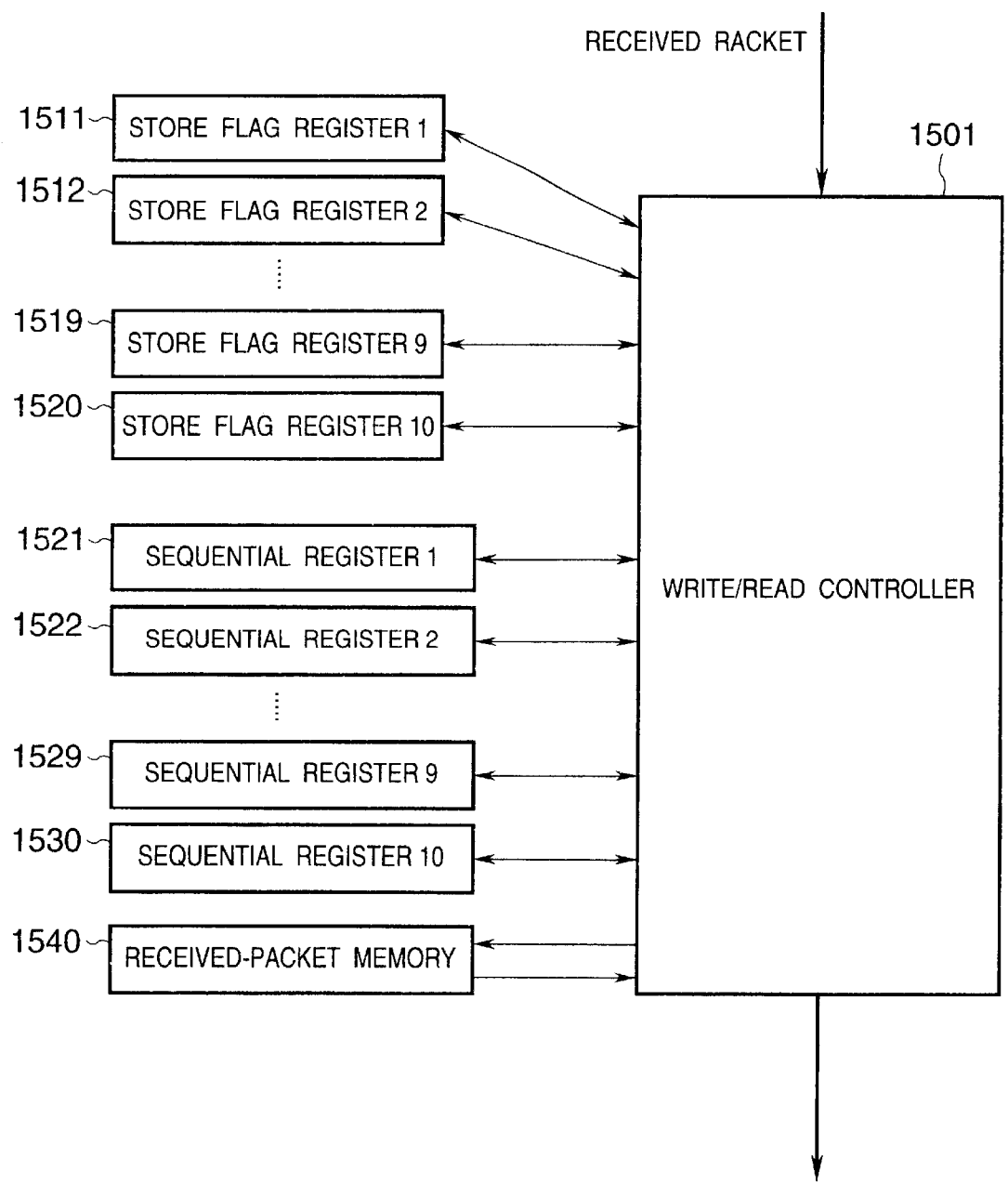
FIG. 15 is a block diagram showing the arrangement of a packet rearrangement unit according to the fifth embodiment of the present invention.

FIG. 15 is a block diagram showing the arrangement of a packet rearrangement unit in a node device shown in FIG. 1.

Reference numeral 1501 denotes a write/read controller having a function of writing an input packet in a storage area in a received-packet memory 1540 corresponding to the connection number and sequential number described at the packer header, and reading out received-packets from the received-packet memory 1540 in the reception order on the basis of store flag memory information and sequential memory information (to be described later). Note that the packet rearrangement function will be explained in detail later.

Reference numerals 1511 to 1520 denote store flag registers 1 to 10 which correspond to respective connection numbers, and latch bits representing whether packets having sequential numbers are written in the received-packet memory 1540. More specifically, the store flag register (1) 1511 corresponds to connection 1 and has a 256-bit input/output data bus width. When the 20th output pin counted from the LSB (Least Significant Bit: a bit at the last position when a certain numeral is expressed in binary notation.) is high (:1=a packet is written), a packet having a sequential number of 19 for a connection number of 1 is written (:stored) in the received-packet memory 1540.

Reference numerals 1521 to 1530 denote sequential registers which correspond to respective connections, and latch data having the sequential number of a packet to be read out next. In the fifth embodiment, since the sequential number ranges from 0 to 255, the input/output data bus width has 8 bits. That is, when all the output pins of the output data bus are high (:11111111), the sequential number is 255; when all the output pins are low (:00000000), the sequential number is 0.

Each of the sequential registers 1521 to 1530 has one input/output pin representing the use of each connection, in addition to the input/output data bus. When this input/output data pin is high, packet rearrangement is done for the connection.

Figure 16:
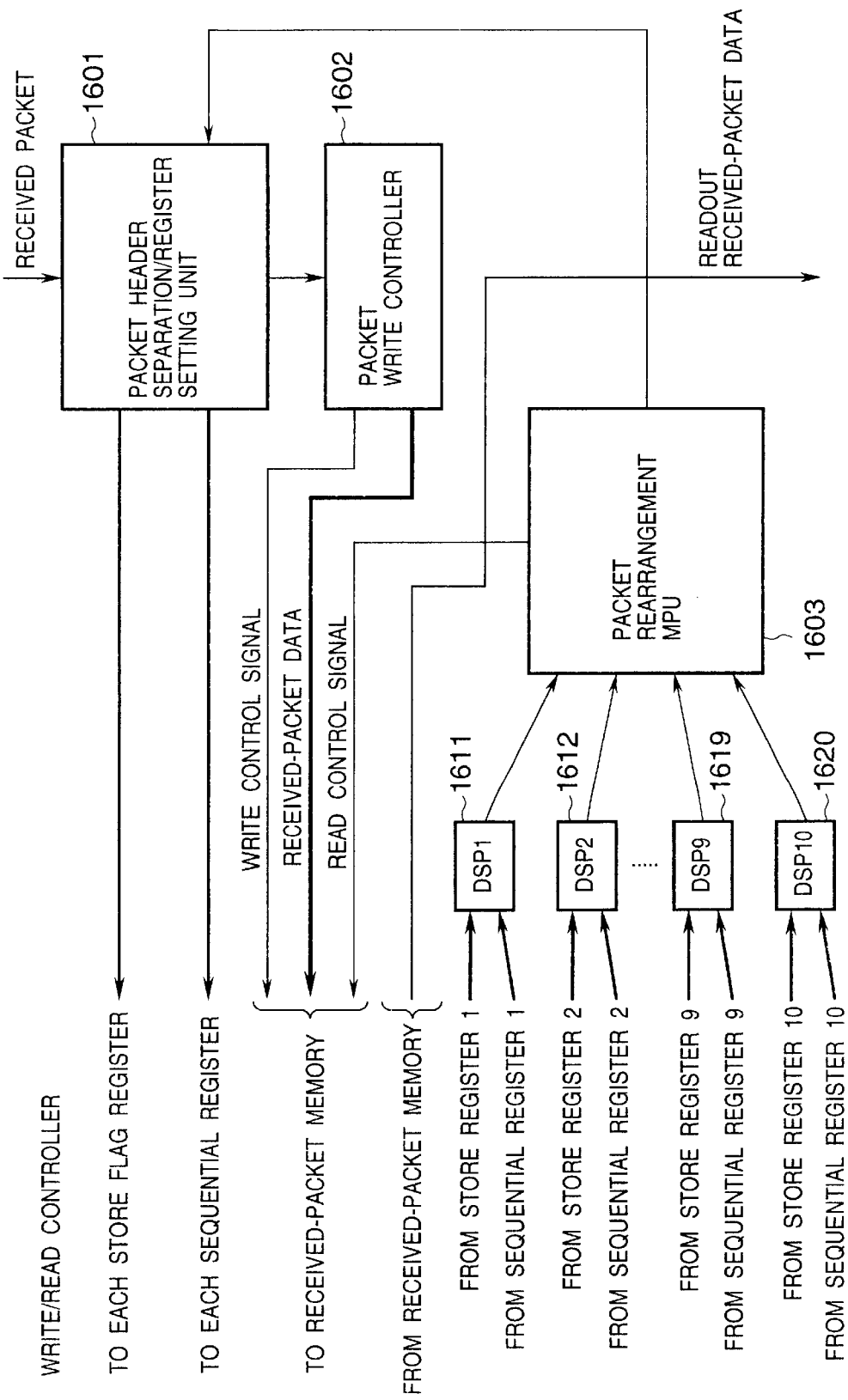
FIG. 16 is a block diagram showing the arrangement of a write/read controller according to the fifth embodiment of the present invention.

FIG. 16 is a block diagram showing the internal arrangement of the write/read controller.

Reference numeral 1601 denotes a packet header separation/register setting unit. The packet header separation/register setting unit 1601 extracts the connection number and sequential number from the header of a received packet, outputs "1" to an input data pin corresponding to the sequential number in a store flag register corresponding to the extracted connection number, and outputs "1" to input data pin 1 representing the use of the sequential register. Then, the received packet is stored in a predetermined storage area of the received-packet memory 1540 to represent communication of the connection.

The packet header separation/register setting unit 1601 outputs the extracted connection number, sequential number, and received-packet data to a packet write controller 1602. When a packet rearrangement MPU (MicroProcessing Unit) 1603 controls a read of the received packet, the packet header separation/register setting unit 1601 outputs "0" (:representing that no packet data is stored in the storage area of a received-packet memory corresponding to the connection number and sequential number) to the input data pin of the store flag register corresponding to the connection number and sequential number of the received packet. Further, the packet header separation/register setting unit 1601 outputs a sequential number (:sequential number of a packet to be read out next) next to the sequential number of the readout received packet to the input data bus of the sequential register corresponding to the connection number.

The packet write controller 1602 generates the write address of the received-packet data based on the connection number and sequential number output from the packet header separation/register setting unit 1601, and writes the received packet in a predetermined storage area of the received-packet memory 1540. The received packet is written at the write address in the received-packet memory 1540 that is generated based on the connection number and sequential number. In a packet read, the received packet can be read out so long as the connection number and sequential number of the received packet to be read out are recognized.

Reference numerals 1611 to 1620 denote digital signal processors (:DSP) for informing the packet rearrangement MPU 1603 based on output data from the store flag register and sequential register corresponding to the connection number, of the number of readable packets having consecutive sequential numbers from the received-packet memory 1540, the connection number, and the sequential number of the sequential register.

Reference numeral 1603 denotes a packet rearrangement MPU for determining the connection number of a packet to be read out from the received-packet memory 1540 in accordance with a predetermined algorithm based on the number of readable packets output from each DSP and the connection number, and outputting the determined connection number and a read control signal to the received-packet memory 1540 so as to read out a predetermined number of packets from the storage area of the received-packet memory 1540 corresponding to the sequential number output from the DSP corresponding to the connection.

The connection of a packet to be read out is generally determined to a connection in which the largest number of sequential numbers are consecutive, i.e., the largest number of packets can be read out. However, various algorithms can be adopted depending on the traffic characteristics of various data packets and data information properties.

Every time the received packet is read out, the packet rearrangement MPU 1603 informs the packet header separation/register setting unit 1601 of the sequential number and connection number of a packet to be read out next. Packet read operation of the DSPs 1611 to 1620 and packet rearrangement MPU 1603 will be explained in detail.

Figure 17:
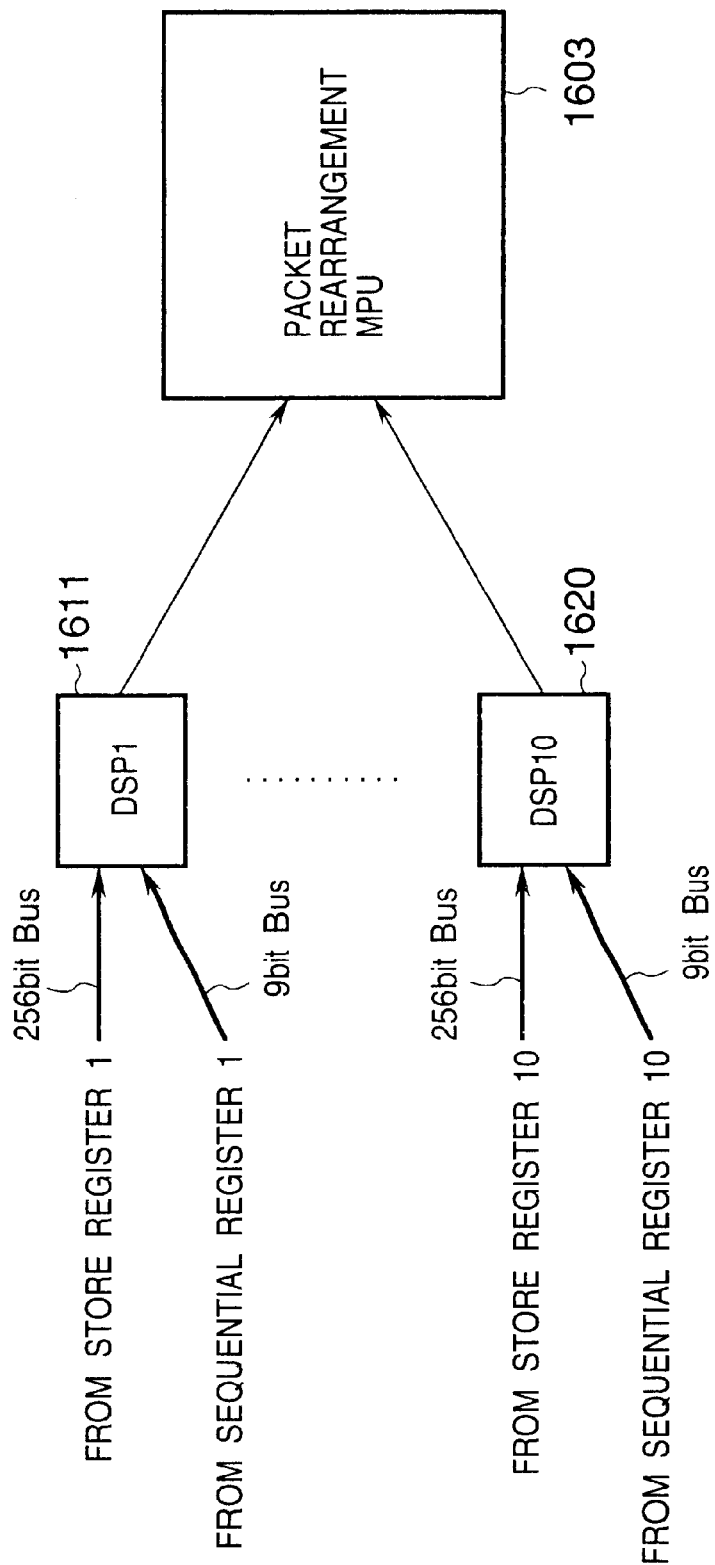
FIG. 17 is a block diagram showing the connection relationship between each register, DSP, and packet rearrangement MPU according to the fifth embodiment of the present invention.

FIG. 17 is a block diagram showing the connection relationship between each register, DSP, and packet rearrangement MPU 1603.

Assume that five packets corresponding to sequential numbers of 4, 5, 6, 7, and 8 in connection 1, and four packets corresponding to sequential numbers of 124, 125, 126, and 127 in connection 10 are stored in the received-packet memory 1540, the sequential number subjected to the next read in connection 1 is 4, and the sequential number subjected to the next read in connection 10 is 123.

In this case, in the output bus (:256-bit bus) of the store flag register (1) 1511 corresponding to connection 1, the fifth, sixth, seventh, eighth, and ninth output pins counted from the LSB are set high. In the store flag register (10) 1520 corresponding to connection 10, the 125th, 126th, 127th, and 128th output pins counted from the LSB are set high. In the output bus (:8-bit bus) of the sequential register (1) 1521 corresponding to connection 1, the first and second output pins counted from the LSB are set high (:00000100=a sequential number of 4 subjected to the next read). In the sequential register (10) 1530 corresponding to connection 10, the second, fourth, fifth, sixth, and seventh output pins counted from the LSB are set high (:01111011=a sequential number of 123 subjected to the next read). In addition, output data pins representing communication of connections 1 and 10 are set high.

Output signals from the store flag register (1) 1511 and sequential register (1) 1521 are output to the DSP (1) 1611. Output signals from the store flag register (10) 1520 and sequential register (10) 1530 are output to the DSP (10) 1620.

The DSP (1) 1611 checks whether packet rearrangement must be performed in the connection from the output data pin signal representing communication/non-communication of the connection number corresponding to the sequential register (1) 1521. When rearrangement must be performed, the DSP (1) 1611 recognizes from information of the output data bus (:8-bit bus) of the sequential register (1) 1521 that the sequential number of a packet to be read out next is 4. The DSP (1) 1611 recognizes from the output signal from the store flag register (1) 1511 that the five packets corresponding to sequential numbers of 4, 5, 6, 7, and 8 are stored in the received-packet memory 1540. The DSP (1) 1611 informs the packet rearrangement MPU 1603 that the five packets can be read out sequentially from a sequential number of 4.

Note that the packet rearrangement MPU 1603 recognizes via a connection bus line to each DSP which of connections corresponds to readout information.

Similarly, the DSP (10) 1620 recognizes from the output signal from the sequential register (10) 1530 that rearrangement must be performed in the connection, and the sequential number of a packet to be read out next is 123. Then, the DSP (10) 1620 recognizes from the output signal from the store flag register (10) 1520 that the four packets corresponding to sequential numbers of 124, 125, 126, and 127 are stored in the received-packet memory 1540.

From this recognition, the DSP (10) 1620 determines that a packet having a sequential number of 123 subjected to the next read is not stored in the received-packet memory 1540, and informs the packet rearrangement MPU 1603 of the absence of the readable packet.

The packet rearrangement MPU 1603 determines the connection from which the received packet is read out on the basis of DSP information corresponding to each connection. Assume that no readable packets exist in connections 2, 3, 4, 5, 6, 7, 8, and 9 other than connection 1. To read out the five consecutive packets sequentially from a sequential number of 4 in connection 1, the packet rearrangement MPU 1603 sequentially generates addresses based on a connection number of 1 and sequential number of 4, and reads out the packets having a connection number of 1 and sequential numbers of 4, 5, 6, 7, and 8 from the received-packet memory 1540.

FIG. 18 is a table showing information from sequential register 1 to sequential register 10 in each time period.

Information stored in the sequential register includes information (shown in the column "USE Conn") representing whether a given connection is used, i.e., a packet having the connection number is communicated, and a sequential number (shown in the column "Seq. No.") subjected to the next read in this connection. "Conn No." represents the connection number for descriptive convenience, and such storage area need not exist in an actual sequential register. A value "1" in USE Conn means that a packet is stored in the received-packet memory corresponding to the connection.

"Seq. No." represents the sequential number of a packet to be read out next in the received-packet memory corresponding to the connection. Note that data in Conn No. 1 indicates output data from sequential register 1, and data in Conn No. 10 indicates output data from sequential register 10.

Figure 19:
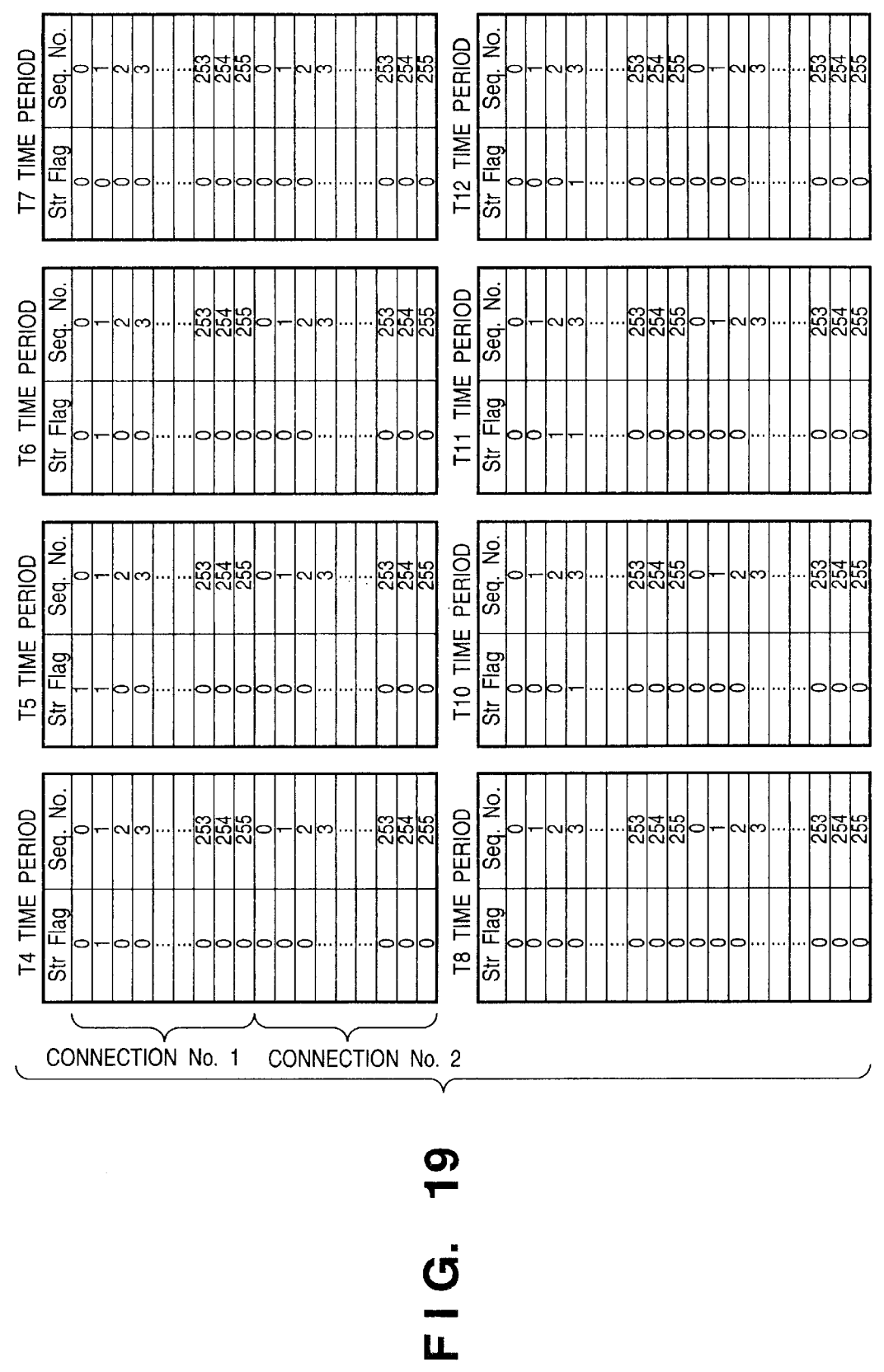

FIG. 19 is a table showing information in the store flag memory in each time period. "Seq. No." represents the sequential number of each connection for descriptive convenience, and such storage area need not exist in an actual store flag memory. "Str Flag" represents a flag indicating whether a packet having the sequential number (:Seq. No.) in a corresponding connection number is stored in the received-packet memory. A value "1" in Str Flag means that a packet is stored.

Note that information in the store flag register in FIG. 19 is limited to information about connection 1 and connection 2 for descriptive convenience. Data of Connection No. 1 represents output data from store flag register 1, and data of Connection No. 10 represents output data from store flag register 10.

Also in the fifth embodiment, packet communication between node devices is the same as the prior art, and only operation of rearranging packets separated by the insertion/separation unit in the transmission order will be explained in detail. The input order of packets separated by the separation/insertion unit and input to the packet rearrangement unit in a different order from the transmission order will be explained with reference to the example described in the prior art. More specifically, packets 1, 2, 3, and 4 are output from output channel 2 of a node device 1202 in FIG. 12 in the time periods T5, T4, T11, and T10, respectively. In a separation/insertion unit 102 of a node device 1203, packets 2, 1, 4, and 3 are input to a packet rearrangement unit 162 in the time periods T4, T5, T10, and T11, respectively. A connection number of 1 representing connection 1 is added to the headers of packets 1, 2, 3, and 4 in a header converter 173 of a node device 1201.

Operation of the packet rearrangement unit will be described.

The packet header separation/register setting unit 1601 in the write/read controller 1501 of the packet rearrangement unit 162 extracts a connection number of 1 and sequential number of 1 as header information of packet 2 input in the time period T4.

Since the packet having a connection number of 1 is first input, the packet header separation/register setting unit 1601 outputs "1" (:USE Conn value of Conn No. 1 in the time period T4 of FIG. 18) to the input data pin of the store flag register (1) 1511, and outputs a sequential number of 0 (:0000000) (:Seq. No. value of Conn No. 1 in the time period T4 of FIG. 18) for a packet to be read out next to the input data bus (:8-bit bus). The packet header separation/register setting unit 1601 outputs "1" (:Seq. No. 1 value in the time period T4 of FIG. 19) to the second input data pin counted from the LSB of the input data bus (:256-bit bus) of the store flag register (1) 1521.

The columns in FIGS. 18 and 19 have the following meanings. "Conn No." in FIG. 18 represents a sequential register corresponding to the connection number. For example, the value in the column "Conn No. 4" indicates output data from sequential register 4. "USE Conn" represents that a packet is stored in the storage area of the received-packet memory 1540 corresponding to the connection number. "Seq. No." represents a sequential number subjected to the next read in the connection. "Seq. No." in FIG. 19 represents the sequential number and the pin number of output data from the store flag register. "Str Flag" represents whether a packet having the sequential number added to the header is written in the received-packet memory. Note that a value "1" in Str Fag means that a packet is stored in the received-packet memory.

The store flag register (1) 1511 (:corresponding to Connection No. 1) in the time period T4 of FIG. 19 represents that a received packet is written in a storage area corresponding to a connection number of 1 and sequential number of 1 in the received-packet memory 1540. The sequential register (1) 1521 in the time period T4 of FIG. 18 represents that a connection having a connection number of 1 is used, and the sequential number of a packet to be read out next is 0.

The packet header separation/register setting unit 1601 outputs a connection number of 1 and sequential number of 1 extracted from header information of the received packet, and data of received packet 2 to the packet write controller 1602.

The packet write controller 1602 generates the data write address of received packet 2 from a connection number of 1 and sequential number of 1 output from the packet header separation/register setting unit 1601, and writes packet 2 in a predetermined storage area of the received-packet memory 1540. Even when the packet rearrangement MPU 1603 reads out the received packet from the received-packet memory 1540, a read address is generated from the connection number and sequential number.

The packet header separation/register setting unit 1601 in the packet rearrangement unit 162 extracts a connection number of 1 and sequential number of 0 as header information of packet 1 input in the time period T5. The packet header separation/register setting unit 1601 outputs "1" (:value of Seq. No. 0 in the time period T5) to the first input data pin counted from the LSB of the input data bus (:256-bit bus) of the sequential register (1) 1521, and outputs the connection number of 1 and sequential number of 0 extracted from header information of the received packet, and data of received packet 1 to the packet write controller 1602.

The packet write controller 1602 generates the data write address of received packet 1 on the basis of the connection number of 1 and sequential number of 0, and writes packet 1 in a predetermined storage area of the received-packet memory 1540.

Packet read control by the received-packet memory 1540 will be explained.

The output data pin signal (:USE Conn value of Conn No=1 in the time period T6 of FIG. 18) representing communication/non-communication of the connection in the sequential register (1) 1521 is 1. Thus, the DSP (1) 1611 in the write/read controller 1501 in the time period T6 determines that packet rearrangement must be done in this connection, and recognizes that the sequential number of a packet to be read out next in the connection is 0 from information of the output data bus (:8-bit but Seq. No.) of the sequential register (1) 1521.

The first and second output signals counted from the LSB of the output data bus of the store flag register (1) 1511 are leach (Str Flag values of Seq. Nos. 0 & 1 in FIG. 19). This indicates the presence of a packet having a sequential number of 0 subjected to the next read and a packet having a sequential number of 1 next to a sequential number of 0. Thus, the DSP (1) 1611 recognizes that the two readable packets are stored in the received-packet memory 1540.

The DSP (1) 1611 informs the packet rearrangement MPU 1603 that the two packets can be read out sequentially from the sequential number of 0. Note that DSP (2), . . . , DSP (9), and DSP (10) also perform parallel the same control as DSP (1).

The packet rearrangement MPU 1603 determines the connection from which a received packet is read out from information of a DSP corresponding to each connection.

In the fifth embodiment, no readable packets exist in connections 2, 3, 4, 5, 6, 7, 8, 9, and 10 other than connection 1. The packet rearrangement MPU 1603 determines to read out a packet corresponding to a connection number of 1, generates a read address based on the connection number of 1 and sequential number of 0, and reads out packet 1 from the received-packet memory 1540. At the same time as a read of packet 1, the packet rearrangement MPU 1603 informs the packet header separation/register setting unit

1601 of a read of the packet having the connection number of 1 and sequential number of 0. Since packet 1 is read out, the packet header separation/register setting unit 1601 inputs "0" (Str Flag value of Seq. No. 0 in the time period T6 of FIG. 19) to the first output data pin counted from the LSB of the input data bus of the store flag register (1) 1511, outputs a sequential number of 1 (:0000001) (:Seq. No. value of Conn No. 1 in the time period T6 of FIG. 18) for a packet to be read out next to the input data bus (:8-bit bus) of the sequential register (1) 1521. The packet header separation/register setting unit 1601 updates output signals to the output data buses of the store flag register (1) 1511 and sequential register (1) 1521.

In the time period T7, the packet rearrangement MPU 1603 generates a read address based on a connection number of 1 and sequential number of 1, reads out packet 2 from the received-packet memory 1540, and informs the packet header separation/register setting unit 1601 of a read of the packet having the connection number of 1 and sequential number of 1. Since packet 2 is read out, the packet header separation/register setting unit 1601 inputs "0" (Str Flag value of Seq. No. in the time period T7 of FIG. 19) to the second output data pin counted from the LSB of the input data bus of the store flag register (1), and outputs a sequential number of 2 (:0000002) (:Seq. No. value of Conn No. 1 in the time period T7 of FIG. 18) for a packet to be read out next to the input data bus (:8-bit bus) of the sequential register (1) 1521. The packet header separation/register setting unit 1601 updates output signals to the output data buses of the store flag register (1) 1511 and sequential register (1) 1521.

In the time period T10, the packet header separation/register setting unit 1601 in the packet rearrangement unit 162 extracts a connection number of 1 and sequential number of 3 as header information of input packet 4. The packet header separation/register setting unit 1601 outputs "1" (:value of Seq. No. 3 in the time period T10 of FIG. 19) to the fourth input data pin counted from the LSB of the input data bus (:256-bit bus) of the sequential register (1) 1521. Further, the packet header separation/register setting unit 1601 outputs the connection number of 1 and sequential number of 3 extracted from header information of the received packet, and data of received packet 4 to the packet write controller 1602.

The packet write controller 1602 generates the data write address of received packet 4 on the basis of a connection number of 1 and sequential number of 3 output from the packet header separation/register setting unit 1601, and writes packet 4 in a predetermined storage area of the received-packet memory 1540.

In the time period T11, the output data pin signal (:USE Conn value in the time period T7 of FIG. 18; Since no packet is read out from the time period T6 to the time period T11, the sequential register value in the time period T11 is kept identical to the sequential register value in the time period T7.) representing communication/non-communication of the connection in the sequential register (1) 1521 is 1. Thus, the DSP (1) 1611 in the write/read controller 1501 determines that packet rearrangement must be done in this connection, and recognizes that the sequential number of a packet to be read out next in the connection is 2 from information of the output data bus (:8-bit but=Seq. No.) of the sequential register (1) 1521.

The third output signal counted from the LSB of the output data bus of the store flag register (1) 1511 is 0 (Str Flag value of Seq. No. 2 in the time period T10 of FIG. 19). This indicates the absence of a packet having a sequential number of 2 subjected to the next read. Thus, the DSP (1) 1611 informs the packet rearrangement MPU 1603 of the absence of a readable packet in a connection number of 1.

In the time period T11, the packet header separation/register setting unit 1601 in the packet rearrangement unit 162 extracts a connection number of 1 and sequential number of 2 as header information of input packet 3. The packet header separation/register setting unit 1601 outputs "1" (:value of Seq. No. 2 in the time period T11 of FIG. 19) to the third input data pin counted from the LSB of the input data bus (:256-bit bus) of the sequential register (1) 1521. Further, the packet header separation/register setting unit 1601 outputs the extracted connection number of 1 and sequential number of 2, and data of received packet 3 to the packet write controller 1602.

The packet write controller 1602 generates the data write address of received packet 3 on the basis of a connection number of 1 and sequential number of 2 output from the packet header separation/register setting unit 1601, and writes packet 3 in a predetermined storage area of the received-packet memory 1540.

In the time period T12, the output data pin signal (:USE Conn value in the time period T7 of FIG. 18; Since no packet in connection 1 is read out from the time period T6 to the time period T11, the sequential register value is kept unchanged at the start of the time period T12.) is 1. Thus, the DSP (1) 1611 in the write/read controller 1501 determines that packet rearrangement must be done in the connection, and recognizes that the sequential number of a packet to be read out next in the connection is 2 from information (:0000010) of the output data bus (:8-bit but=Seq. No.) of the sequential register (1) 1521.

The third and fourth output signals counted from the LSB of the output data bus of the store flag register (1) 1511 are 1 each (Str Flag values of Seq. Nos. 2 & 3 in the time period T11 of FIG. 19). This indicates the presence of a packet having a sequential number of 2 subjected to the next read and a packet having a sequential number of 3 next to the sequential number of 2. Thus, the DSP (1) 1611 recognizes that the two readable packets are stored in the received-packet memory 1540. The DSP (1) 1611 informs the packet rearrangement MPU 1603 that the two packets can be read out sequentially from a sequential number of 2.

In the time period T12, the packet rearrangement MPU 1603 determines from information of the DSP (1) 1611 to read out a packet corresponding to a connection number of 1, generates a read address based on a connection number of 1 and sequential number of 2, and reads out packet 3 from the received-packet memory 1540. At the same time as a read of packet 3, the packet rearrangement MPU 1603 informs the packet header separation/register setting unit 1601 of a read of the packet having the connection number of 1 and sequential number of 2.

Since packet 3 is read out, the packet header separation/register setting unit 1601 inputs "0" (Str Flag value of Seq. No. 2 in the time period T12 of FIG. 19) to the third output data pin counted from the LSB of the input data bus of the store flag register (1) 1511, outputs a sequential number of 3 (:0000001) (:Seq. No. value of Conn No. 1 in the time period T12 of FIG. 18) for a packet to be read out next to the input data bus (:8-bit bus) of the sequential register (1) 1521. The packet header separation/register setting unit 1601 updates output signals to the output data buses of the store flag register (1) 1511 and sequential register (1) 1521.

In the time period T13, the packet rearrangement MPU 1603 generates a read address based on a connection number of 1 and sequential number of 3, reads out packet 4 from the received-packet memory 1540, and outputs packet 4 to the receiving terminal.

In this fashion, packets 2, 1, 4, and 3 are input to the packet rearrangement unit 162 in the time periods T4, T5, T10, and T11, respectively. The packet rearrangement unit 162 reads out packets 1, 2, 3, and 4 in the time periods T6, T7, T12, and T13, respectively, rearranges them in the transmission order, and transmits them to the terminal 152.

Note that output signals from DSP (1) to DSP (10) change every time the packet is input to the write/read controller 1501, so that the packet rearrangement MPU 1603 performs packet read control in accordance with a predetermined packet read algorithm every time.

For example, the packet rearrangement MPU 1603 receives information that four packets in connection 2 can be read out from the DSP (2) in the time period Tn. In this case, in the next time period [time period T(n+1)] after reading out one of packets to be read out in this connection, the packet rearrangement MPU 1603 receives information from the DSP (2) 1612 that three packets in connection 2 can be read out, and information from the DSP (4) 1613 that seven packets in connection 4 can be read out. In connection 4 corresponding to the DSP (4) 1613, a packet having a sequential number of 10 subjected to the next read is not input to the write/read controller 1501, but packets having sequential numbers of 11, 12, 13, 14, 15, and 16 are written in the received-packet memory 1540. While one of packets in connection 2 is read out, a packet having a sequential number of 10 in connection 4 is input. That is, since output signals from DSP (1) to DSP (10) change every time the packet is input to the write/read controller 1501, readable packets from the received-packet memory 1540 can be efficiently read out in a proper order.

However, the present invention is not limited to the control mechanism of executing packet read control by the packet rearrangement MPU 1603 every time an output signal from the DSP changes. The packet read control mechanism by the packet rearrangement MPU 1603 may be determined based on the data properties and traffic characteristics of the received packet.

Figure 20:
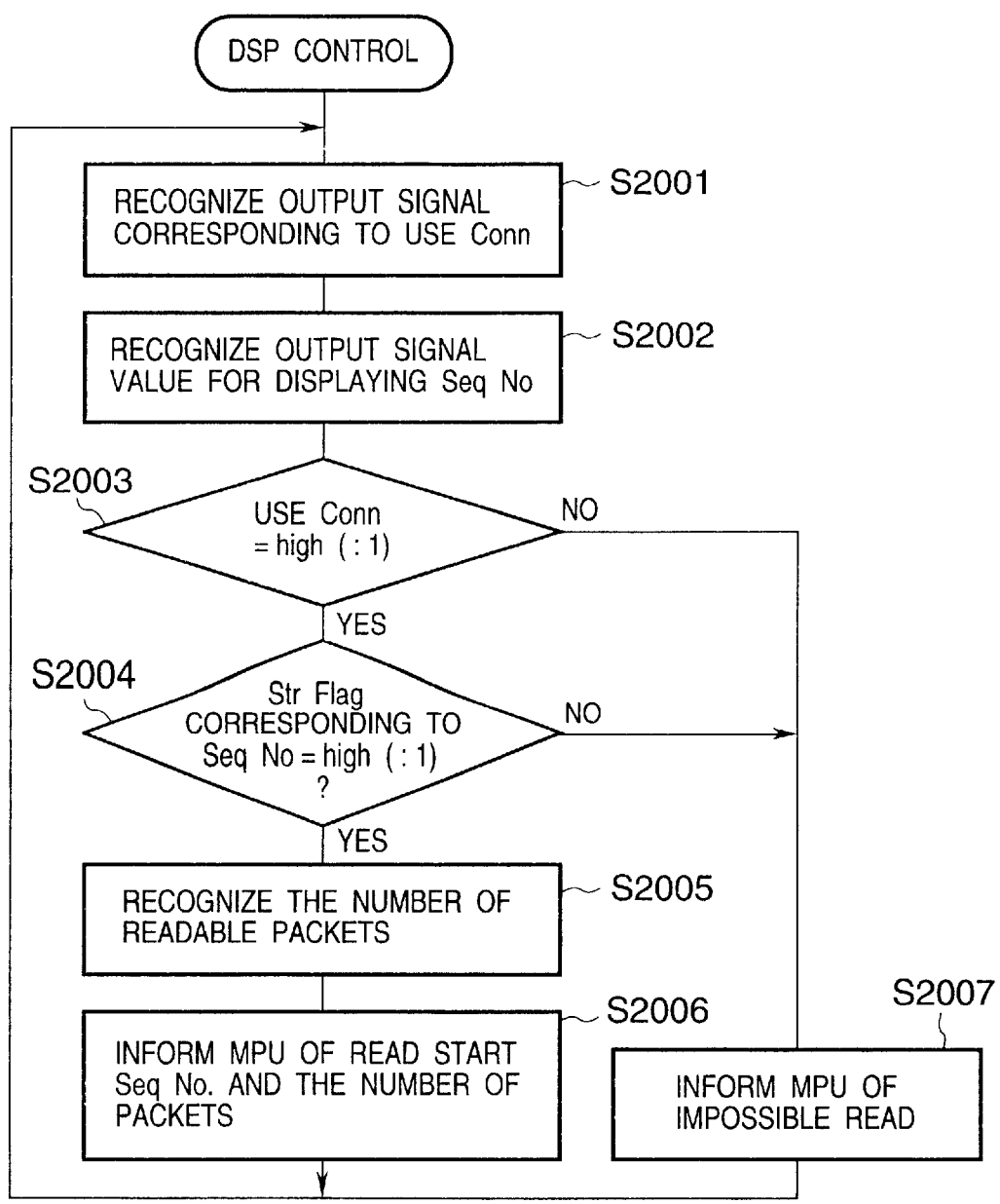
FIG. 20 is a flow chart showing the packet read control algorithm of each DSP according to the fifth embodiment of the present invention.
Figure 21:
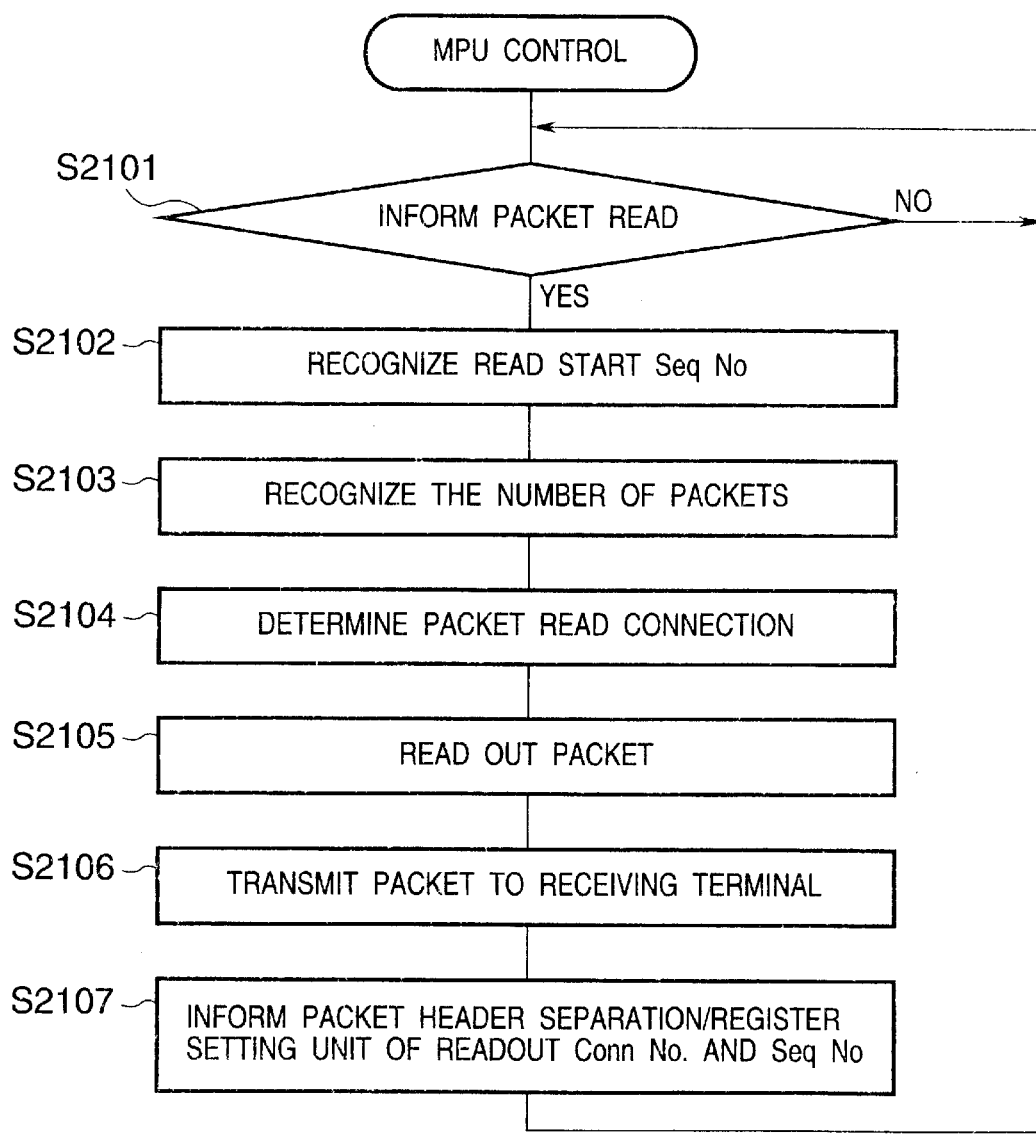
FIG. 21 is a flow chart showing the packet read control algorithm of the packet rearrangement MPU according to the fifth embodiment of the present invention.
Figure 22:
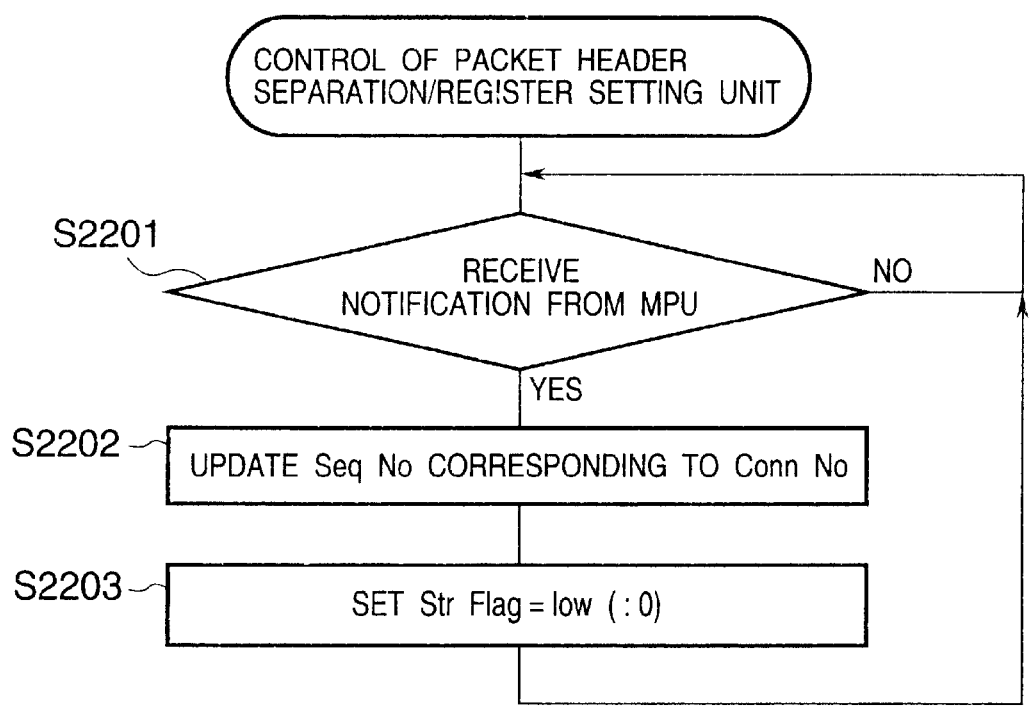
FIG. 22 is a flow chart showing the packet read control algorithm of a packet header separation/register setting unit according to the fifth embodiment of the present invention.

FIG. 20 is a flow chart showing the packet read control algorithm of each DSP. FIG. 21 is a flow chart showing the packet read control algorithm of the packet rearrangement MPU. FIG. 22 is a flow chart showing the packet read control algorithm of the packet header separation/register setting unit.

Figure 23:
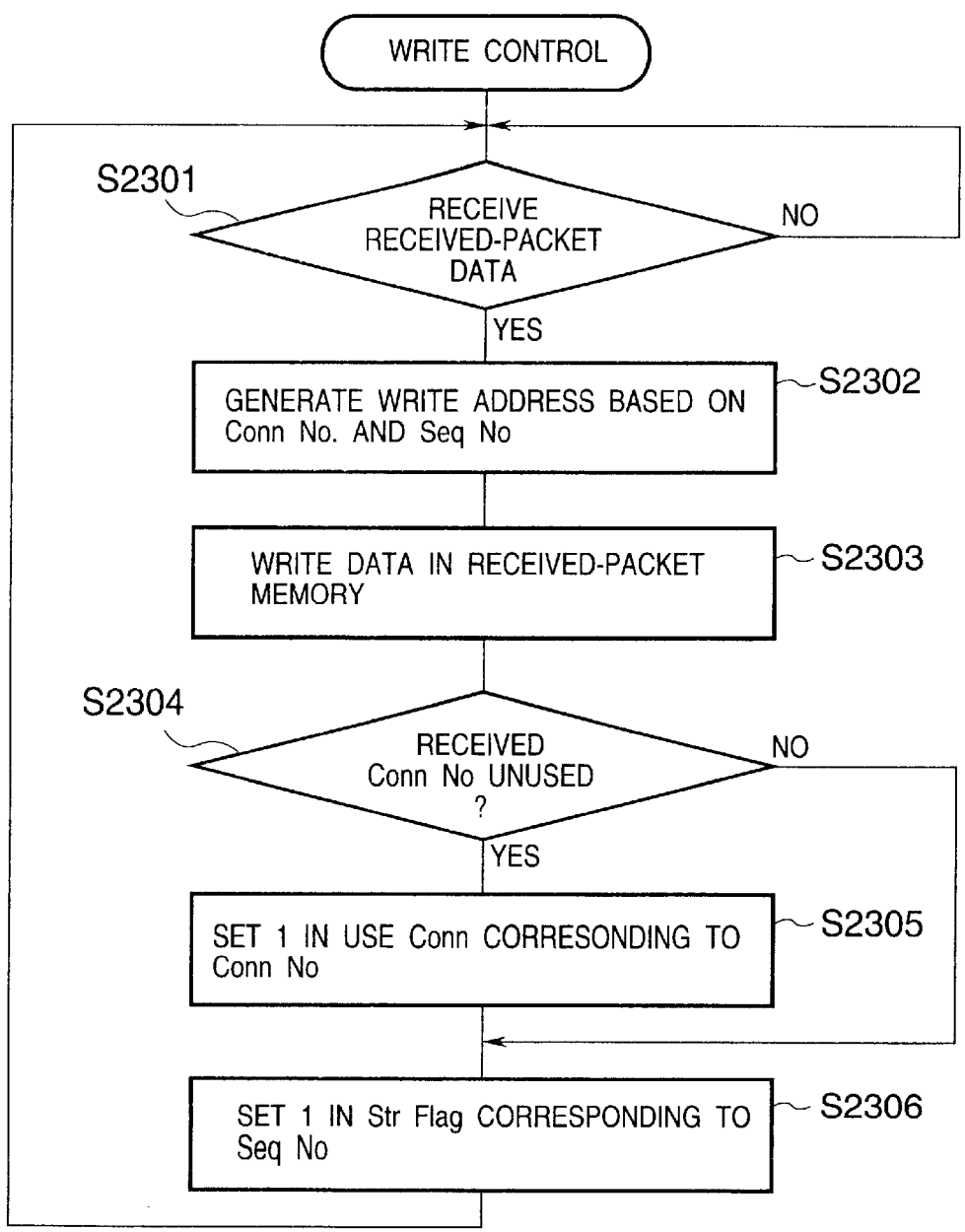
FIG. 23 is a flow chart showing a packet write by a packet write controller according to the fifth embodiment of the present invention.

FIG. 23 is a flow chart showing packet write control of the packet write controller.

In FIG. 20, each DSP recognizes an output data pin signal corresponding to USE Conn in the sequential register corresponding to the DSP, and an output data bus value for displaying Seq No (S2001 and S2002).

The DSP checks whether the signal corresponding to USE Conn is high (:1) (S2003).

If YES in S2003, the DSP checks whether the output data pin signal for Str Flag of the corresponding store flag register corresponding to Seq No that is recognized in S2002 is high (:1) (S2004).

If YES in S2004, the DSP recognizes the output data pin of Seq No equal to or larger than Seq No recognized in S2002, and obtains the number of readable packets from the number of consecutive output data pins of high level (S2005).

The DSP informs the packet rearrangement MPU 1603 of Seq No at which packets are read out from the received-packet memory 1540, and the readable number of packets (S2006).

If NO in S2003 or S2004, the DSP informs the packet rearrangement MPU 1603 that packets cannot be read out (S2007).

In FIG. 21, if the packet rearrangement MPU 1603 receives a packet read notification from each DSP (S2101), the MPU 1603 recognizes Seq No at which packets are read out from the received-packet memory 1540, and the readable number of packets (S2102 and S2103).

The packet rearrangement MPU 1603 determines to read out packets from a connection corresponding to a DSP which informs the packet rearrangement MPU 1603 of the largest number of readable packets among the numbers of readable packets informed from respective DSPs (S2104). The packet rearrangement MPU 1603 reads out one of packets from the storage area of the received-packet memory 1540 corresponding to the connection and Seq No (S2105), and transmits the packet to the receiving terminal (S2106).

The packet rearrangement MPU 1603 informs the packet header separation/register setting unit 1601 of the packet readout connection number (Conn No) and Seq No (S2107).

In FIG. 22, if the packet header separation/register setting unit 1601 receives the packet readout connection number (Conn No) and Seq No from the packet rearrangement MPU 1603 (S2201), the unit 1601 sets the next value in the output data bus (Seq No of a packet to be read out next) for displaying Seq No of a sequential register corresponding to the informed connection number (S2202).

The packet header separation/register setting unit 1601 sets the output data pin of a store flag register corresponding to the informed connection number and Seq no to Low (:0) (S2203).

Under the control of the DSP, packet rearrangement MPU, and packet header separation/register setting unit, received packets are rearranged in the transmission order of the transmitting terminal, and then transmitted to the receiving terminal.

In FIG. 23, the packet header separation/register setting unit 1601 extracts the connection number (Conn No) and sequential number (Seq No) from the header of the received packet, and outputs the connection number (Conn No), sequential number (Seq No), and received packet data to the packet write controller 1602 (S2301). Then, the packet write controller 1602 generates a write address for writing the packet in the received-packet memory 1540 on the basis of the informed connection number (Conn No) and sequential number (Seq No) (S2302), and writes the received packet data in the received-packet memory 1540 (S2303).

The packet header separation/register setting unit 1601 checks whether the connection number (Conn No) extracted from the header of the received packet has already been used (S2304). If YES in S2304, the packet header separation/register setting unit 1601 sets "1" in the input data pin (corresponding to USE Conn in FIG. 18) of a sequential register corresponding to the connection number (S2305).

The packet header separation/register setting unit 1601 writes "1" in an input pin corresponding to the sequential number (Seq No) in a store flag register corresponding to the connection number extracted from the header of the received packet (S2306).

Under the control of the packet header separation/register setting unit 1601 and packet write controller 1602, received packets are written in the received-packet memory 1540.

In the fifth embodiment, packet rearrangement is performed by not only hardware but also the DSP, packet rearrangement MPU, and the like. Hence, flexible high-speed rearrangement based on the data properties and traffic characteristics of the received packet can be realized.

Further, the rearrangement algorithm can be easily changed based on the data properties and traffic characteristics of the received packet.

Sixth Embodiment

The sixth embodiment of the present invention will be described below.

Figure 24:
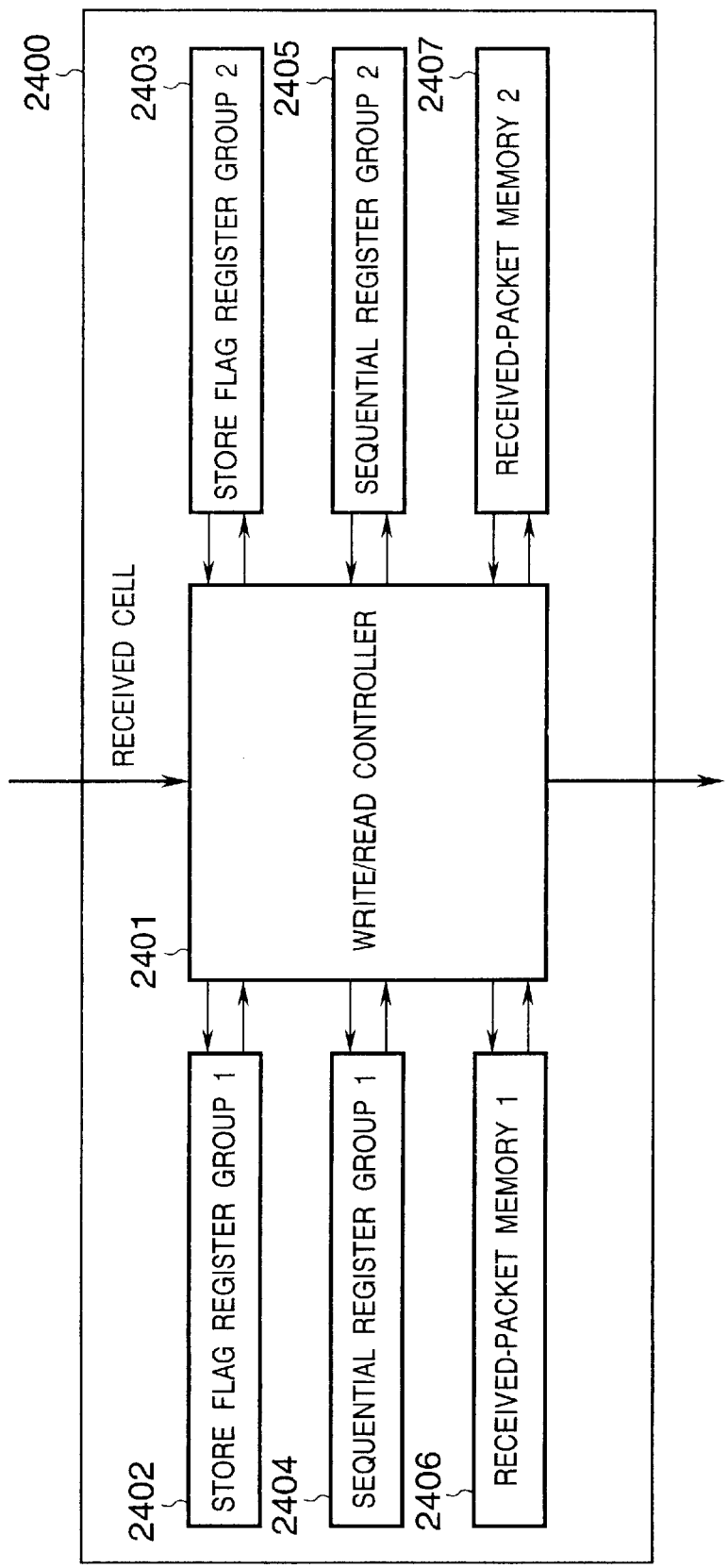
FIG. 24 is a block diagram showing the arrangement of a packet rearrangement unit according to the sixth embodiment of the present invention.

FIG. 24 is a block diagram showing the arrangement of a packet rearrangement unit in a node device according to the sixth embodiment. This packet rearrangement unit is different from the packet rearrangement unit described in the fifth embodiment in that each of the register group and the received-packet memory is divided into two. For descriptive convenience, the number of connections is 10.

Reference numeral 2402 denotes store flag register group 1 made up of store flag registers 1, 3, 5, 7, and 9 corresponding to odd connections. The store flag register corresponding to each odd connection latches data representing the sequential number of a packet in the connection that is written in received-packet memory 1, and outputs the latched data to a corresponding DSP.

Reference numeral 2403 denotes store flag register group 2 which latches, by a store flag register of a corresponding connection, data representing the sequential number of a packet in each even connection that is written in received-packet memory 2, and is made up of store flag registers corresponding to even connections.

Reference numeral 2404 denotes sequential register group 1 made up of sequential registers 1, 3, 5, 7, and 9 corresponding to odd connections.

The sequential register corresponding to each odd connection latches data representing the use/non-use of the corresponding connection and the sequential number of a packet to be read out next in the connection, and outputs the data to a corresponding DSP.

Reference numerals 2405 denotes sequential register group 2 which latches, by a sequential register of a corresponding connection, data representing the use/non-use of each even connection and the sequential number of a packet to be read out next in the connection, and is made up of sequential registers corresponding to even connections.

Packet write/read control in the packet rearrangement unit will be described.

A write/read controller 2401 extracts the connection number and sequential number from the header of a received packet, and writes a packet having an odd connection number in a received-packet memory (1) 2406 and a packet having an even connection number in a received-packet memory (2) 2407. Information written in the sequential register group (1) 2404 pertains to a packet having an odd connection number, and information written in the sequential register group (2) 2405 pertains to a packet having an even connection number.

As for the store flag register group, information about a packet having an odd connection number is written in the store flag register group (1) 2402, and information about a packet having an even connection number is written in the store flag register group (2) 2403.

Packet rearrangement control by the write/read controller 2401 is as follows. The write/read controller 2401 comprises two controllers each for performing processing in accordance with the read algorithm (FIGS. 20 to 22) and write algorithm (FIG. 23) described in the fifth embodiment. That is, a packet header separation/register setting unit, packet write controller, packet rearrangement MPU, and DSP for the odd connection are prepared. The controller corresponding to the even connection is also similarly equipped.

A write in each memory and register is done under the same write control as described in the fifth embodiment. One write/read controller performs write control for a packet having an odd connection number, and the other performs write control for a packet having an even number. In this arrangement, no problem arises when the write/read controller 2401 write a received packet in the received-packet memory (1) 2406 or received-packet memory (2) 2407.

However, when the write/read controller 2401 reads out two received packets from the received-packet memory (1) 2406 and received-packet memory (2) 2407 at the same timing, the two packets collide against each other at the received-packet output terminal of the write/read controller 2401. This problem can be solved by two measures, which will be described below.

First, the write/read controller 2401 incorporates two FIFOs (First-In First-Out) each for storing a packet read out from each received-packet memory, and a processor for controlling to alternately read out packets from the two FIFOs when packets are stored in the two FIFOs.

Second, read control of the packet rearrangement MPU for the odd connection and read control of the packet rearrangement MPU for the even connection are shifted from each other, and alternately done so as not to simultaneously read out packets from the received-packet memory (1) 2406 and received-packet memory (2) 2407.

The sixth embodiment can perform packet rearrangement at a higher speed than the fifth embodiment. Note that the sixth embodiment adopts two packet rearrangement mechanisms. However, in the present invention, the number of rearrangement mechanisms is not limited to two, and three or more rearrangement mechanisms may be adopted to increase the rearrangement speed. For example, when received packets are classified by the remainder of division of connection numbers by four, four rearrangement mechanisms can be adopted to independently rearrange the received packets classified into four.

The first to sixth embodiments have exemplified communication using an optical fiber. However, the present invention is not limited to communication using an optical fiber, and can be applied to communication using another communication medium.

The above-mentioned embodiments can rearrange the order of received packets in a network of performing communication while changing the communication channel.

Even if the order of packets changes during transmission in a network of performing communication while changing the communication channel, the packets can be rearranged in the packet transmission order and then transmitted to a destination terminal.

Even if the order of packets changes during transmission in a network of performing communication while changing the communication channel, the packets need not be rearranged at the receiving terminal.

Seventh Embodiment

The first to sixth embodiments have described the method of changing the order of packets received in a node device and transmitting the packets to a destination terminal.

The following embodiments will describe an example of changing the order of packets received in a node device similarly to the first to sixth embodiments, and transmitting the packets to a destination terminal with traffic characteristics based on packet transmission traffic characteristics.

In particular, the following embodiments will describe an example capable of guaranteeing QoS (Quality of Service) as one ATM (A synchronous Transfer Mode) standard, i.e., CDV (Cell Delay Variation), CLR (Cell Loss Rate), CTD (Cell Transmission Delay), and CER (Cell Error Rate).

Figure 25:
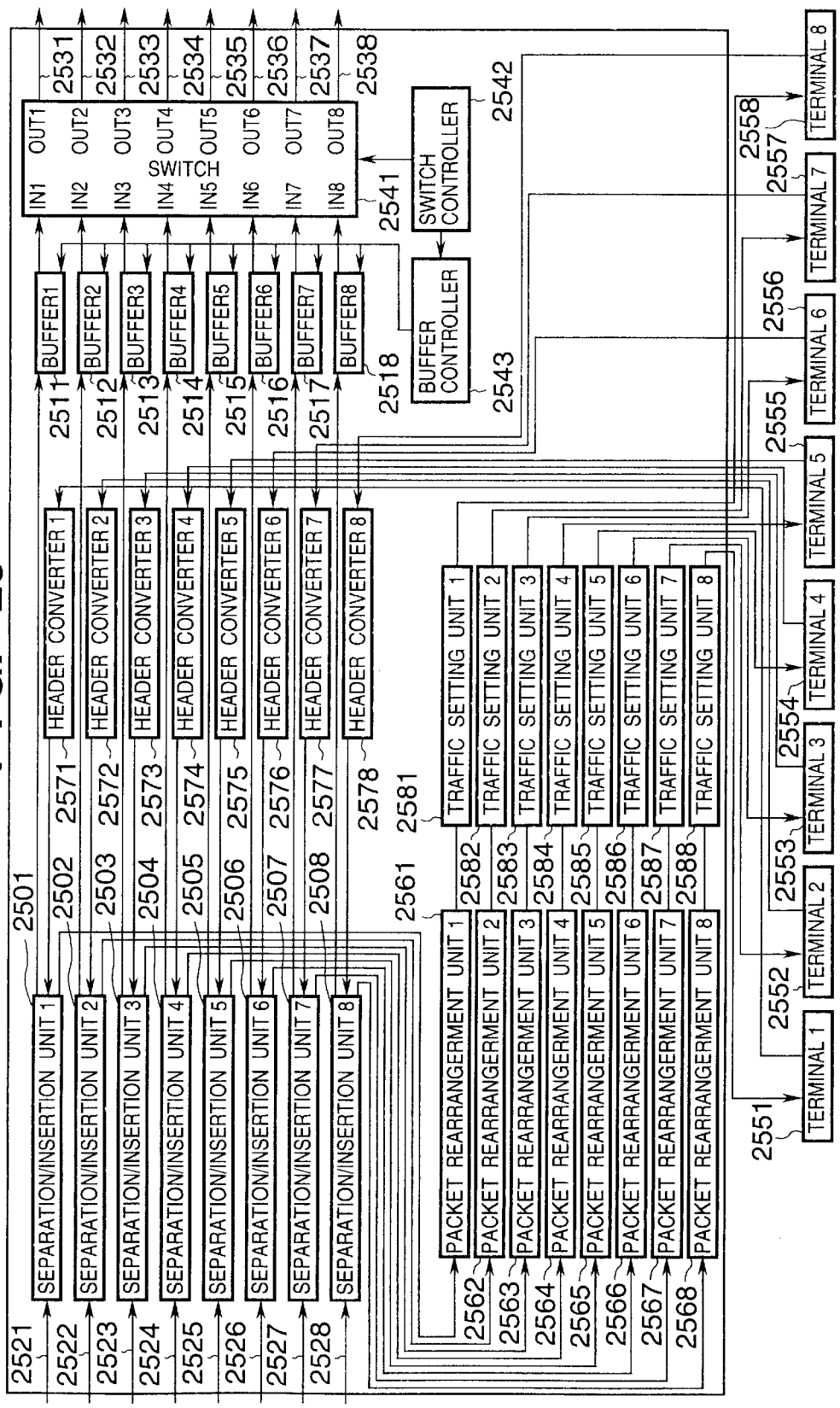
FIG. 25 is a block diagram showing the arrangement of a node device used in the seventh embodiment of the present invention.

FIG. 25 is a block diagram showing the arrangement of a node device used in a network according to the seventh embodiment.

In FIG. 25, reference numerals 2501 to 2508 denote separation/insertion units having a function of detecting the addresses of packets input via parallel multiplex transmission paths 2521 to 2528, separating the packets into packets to be transmitted to terminals via sub-transmission paths and packets to be input to buffers 2511 to 2518, and inserting packets output from header converters 2571 to 2578 (to be described later) into packet flows input via the parallel multiplex transmission paths 2521 to 2528.

The header converters 2571 to 2578 have a function of adding a connection number corresponding to the reception connection of a destination terminal and a sequential number representing the transmission order to header information of a packet transmitted from the terminal together with the address of the node device and the address of the destination terminal. In the seventh embodiment, the number of connections is 10, and the sequential number ranges from 1 to 256.

Reference numerals 2561 to 2568 denote packet rearrangement units having a function of rearranging packets separated by the insertion/separation units 2501 to 2508 in the transmission order on the basis of the connection number and sequential number as header information every connection.

Reference numerals 2581 to 2588 denote traffic setting units for outputting packets from the packet rearrangement units 2561 to 2568 to the receiving terminal so as to make traffic characteristics equal to the traffic characteristics of a packet output from the transmitting terminal.

Reference numerals 2511 to 2518 denote buffer shaving a function of temporarily storing packets output from the separation/insertion units 2501 to 2508 in storage areas corresponding to the output terminals of a switch 2541.

The parallel multiplex transmission paths 2521 to 2528 and parallel multiplex transmission paths 2531 to 2538 connect nodes such as a plurality of spatially separated optical fiber transmission paths, or wavelength multiplex transmission paths wavelength-divided and multiplexed on one optical fiber.

The switch 2541 is controlled by a switch controller 2542 to connect packets input to input terminals IN1 to IN8 to arbitrary output terminals OUT1 to OUT8. The switch 2541 is switched using a space switch or the like when a plurality of optical fiber transmission paths are used for the parallel multiplex transmission paths. When the wavelength multiplex transmission paths are used, transmitters made up of a plurality of tunable laser diodes and multiplexer are connected to the wavelength multiplex transmission paths, and respective wavelengths are demultiplexed by a demultiplexer at the receivers of the wavelength multiplex transmission path, thereby constituting the switch between nodes, although not shown in FIG. 25. The switch is switched by setting the transmission wavelength of the tunable laser diode to an arbitrary one of wavelengths $\lambda 1$ to $\lambda 8$.

The switch controller 2542 controls the switch in accordance with, e.g., a control pattern in FIG. 5.

Reference numeral 2543 denotes a buffer controller for controlling to read out a packet stored in the buffer when the input terminal of the switch connected to each buffer is connected to a desired output terminal.

Figure 26:
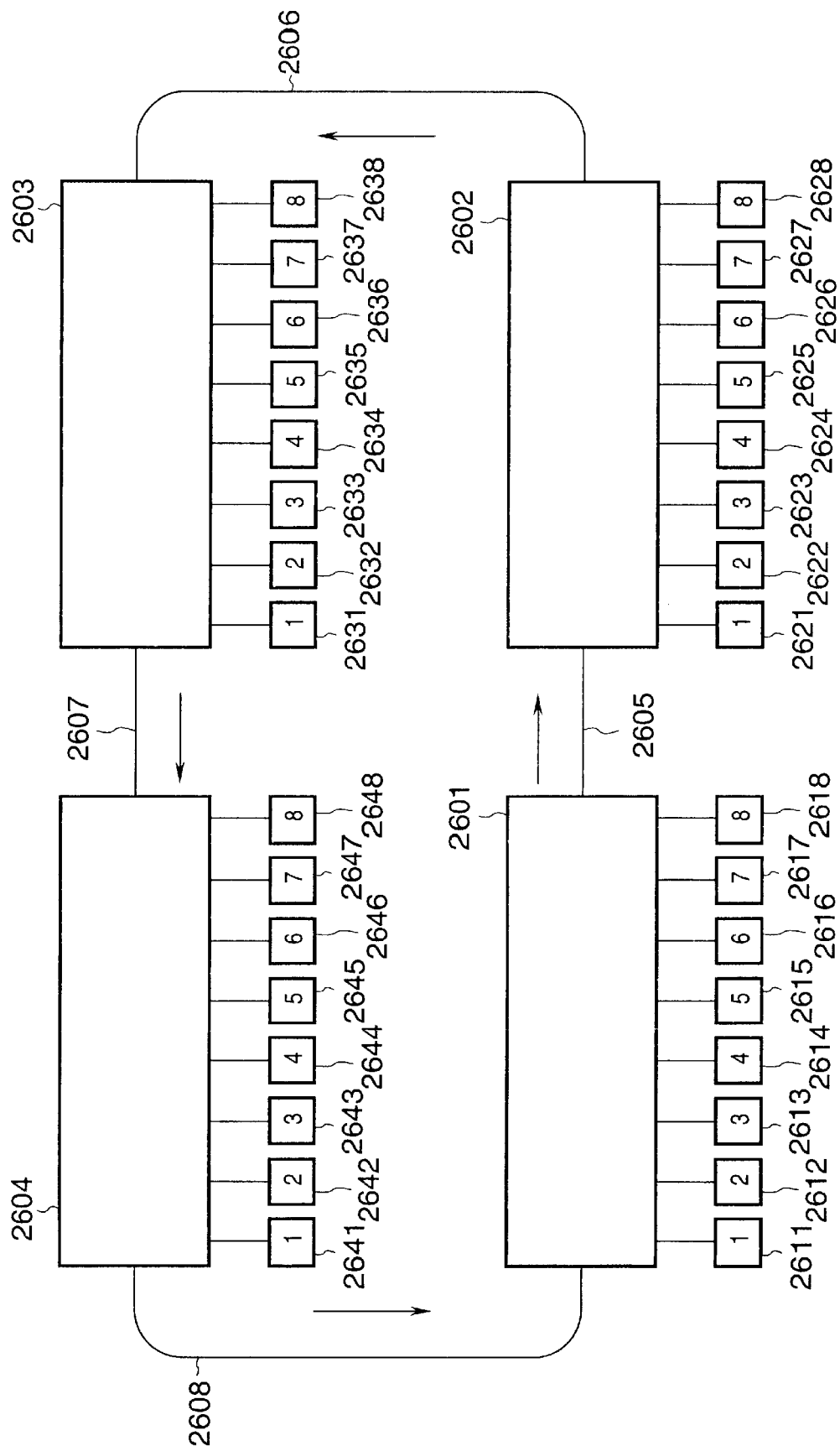
FIG. 26 is a block diagram showing the arrangement of a network used in the seventh embodiment of the present invention.

FIG. 26 is a block diagram showing an example of the arrangement of a network system using the node device shown in FIG. 25. Four node devices 2601 to 2604 are connected like a ring by parallel multiplex transmission paths 2605 to 2608, and each node device is connected to eight terminals via eight sub-transmission paths. Terminals 2611 to 2618 correspond to terminals 2551 to 2558 in FIG. 25. Similarly, terminals 2621 to 2628, 2631 to 2638, and 2641 to 2648 correspond to the terminals 2551 to 2558.

FIG. 5 shows a control pattern representing the connection relationship between the input and output of the switch 2541. The input/output connection relationship of the switch is changed by control addresses A1 to A8. The input terminals IN1 to IN8 correspond to the buffers 2511 to 2518, and the output terminals OUT1 to OUT8 (or transmission wavelengths $\lambda 1$ to $\lambda 8$) correspond to storage areas 1 to 8 of the buffers.

Figure 27:
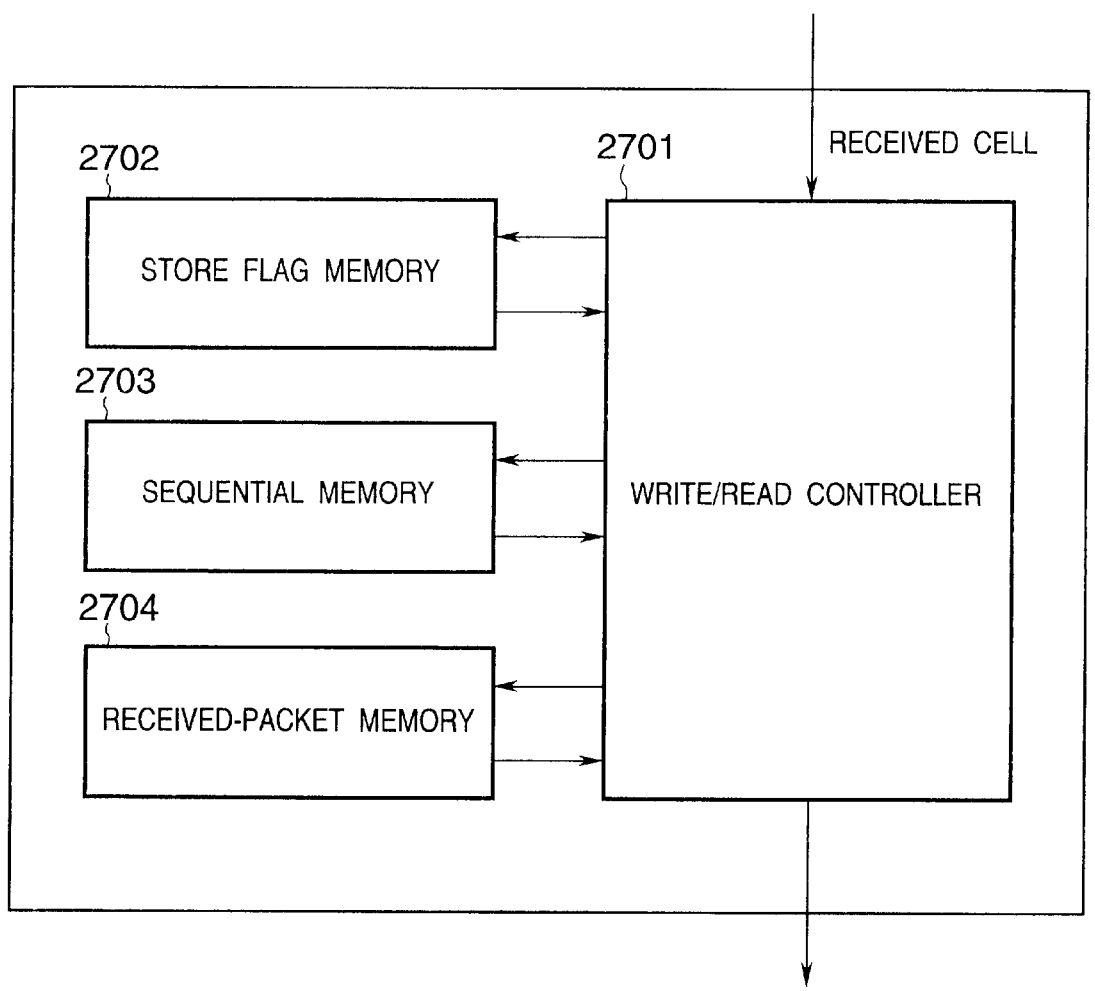
FIG. 27 is a block diagram showing the arrangement of a packet rearrangement unit used in the seventh embodiment of the present invention.

FIG. 27 is a block diagram showing the arrangement of the packet rearrangement unit in the node device. Reference numeral 2701 denotes a write/read controller having a function of writing an input packet in the storage area of a received-packet memory 2704 corresponding to the connection number and sequential number described in the packet header, and reading out received packets from the received-packet memory 2704 in the transmission order on the basis of information in a store flag memory 2702 and sequential memory 2703 (to be described below).

The packet rearrangement function will be described later in detail.

Reference numeral 2702 denotes a store flag memory for storing information representing the sequential number of a packet written in the received-packet memory every connection. Reference numeral 2703 denotes a sequential memory for storing the sequential number of a packet to be read out next in each connection.

FIG. 28 is a table showing information in the sequential memory 2703 in each time period. Information stored in the sequential memory 2703 includes information representing whether a given connection is used, i.e., a packet having the connection number has already been written in the received-packet memory 2704, and information representing a sequential number subjected to the next read in this connection.

Note that "Mem Adr" represents the address of the sequential memory 2703 and corresponds to the connection number. "Conn No." represents the connection number for descriptive convenience, and such storage area need not exist in an actual sequential memory. "USE Conn" represents a storage area indicating whether a packet is stored in the received-packet memory corresponding to the connection. A value "1" in USE Conn means that a packet is stored in the received-packet memory corresponding to the connection. "Seq. No." represents the sequential number of a packet to be read out next in the received-packet memory 2704 corresponding to the connection. When a packet is written in the received-packet memory 2704, write and read addresses are generated based on the connection number and sequential number as packet header information.

Figure 29:
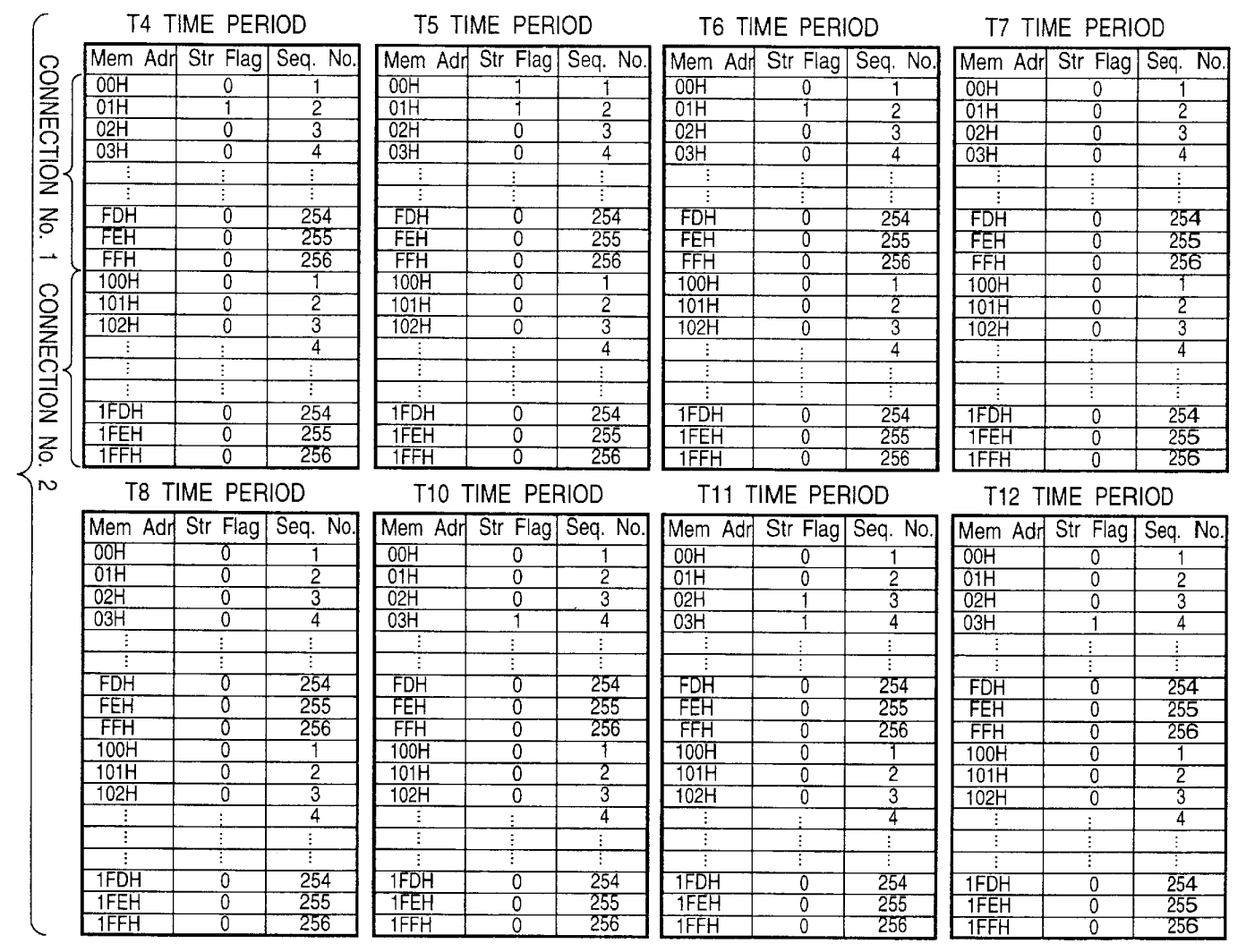

FIG. 29 is a table showing information in the store flag memory 2702 in each time period. "Mem Adr" represents the address of the store flag memory. "Seq. No." represents the sequential number of each connection for descriptive convenience, and such storage area need not exist in an actual store flag memory. "Str Flag" represents a flag indicating whether a packet having the sequential number (:Seq. No.) in a corresponding connection number is stored in the received-packet memory 2704. A value "1" in Str Flag means that a packet is stored. Note that information in the store flag memory in FIG. 29 is limited to information about connection 1 and connection 2 for descriptive convenience. A storage area having Mem Adr from 00H to FFH corresponds to a connection number of 1, and a storage area having Mem Adr from 100H to 1FFH corresponds to a connection number of 2. The write/read controller 2701 recognizes the address space of the storage area of the store flag memory corresponding to each connection.

Figure 30:
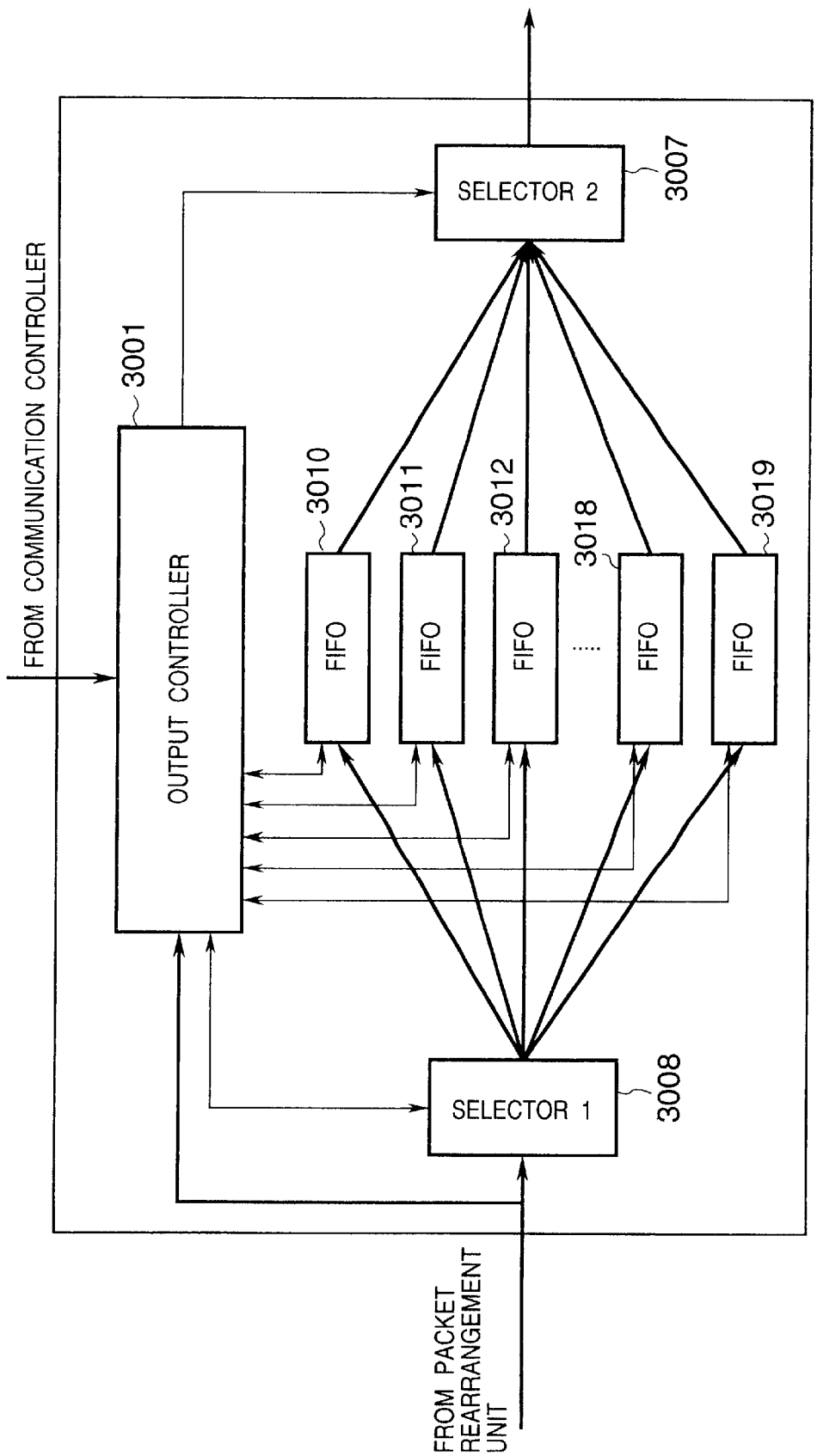
FIG. 30 is a block diagram showing the arrangement of a traffic setting unit used in the seventh embodiment of the present invention.

FIG. 30 is a block diagram showing the arrangement of the traffic setting unit in the node device according to the seventh embodiment.

Reference numeral 3001 denotes an output controller for controlling selector 1 so as to extract a connection number described at the header of an input packet, and output the packet to a FIFO (:First-In First-Out) corresponding to the connection number. The output controller 3001 stores a predetermined number of packets in a FIFO corresponding to each connection at the start of communication at the connection, and then reads out the packets from the FIFO so as to output them to the receiving terminal with the same characteristics as packet output characteristics at the transmitting terminal.

Reference numerals 3010 to 3019 denote FIFOs corresponding to respective connections. In the seventh embodiment, the number of reception connections per terminal is 10. The number of FIFOs in the traffic setting units 2581 to 2588 depends on the number of reception connections at the receiving terminal and is not particularly limited.

Reference numeral 3008 denotes a selector for switching a packet output from the packet rearrangement unit to a FIFO corresponding to a connection number described at the header of the packet under the control of the output controller 3001.

Reference numeral 3007 denotes a selector for selecting a packet output from a given FIFO and outputting the packet to the receiving terminal under the control of the output controller 3001.

The communication principle of the network according to the seventh embodiment will be described with reference to FIGS. 25 to 32. In the following description, the parallel multiplex transmission paths are a plurality of spatially separated optical fiber transmission paths, and the switch is a space switch. Also when the wavelength multiplex transmission paths are used, almost the same operation is done based on the above principle.

An example of operation when a terminal 2613 in FIG. 26 communicates with a terminal 2632 will be explained. The terminal 2613 as a transmitting terminal informs the node device 2603 connected to the terminal 2632 as a destination terminal of packet traffic characteristics at the terminal 2613. The informed traffic characteristics are informed to the output controller 3001 of the traffic setting unit 2582 connected to the destination terminal 2632. Note that the traffic characteristics are informed using a control packet. Data transmitted from the terminal 2613 is segmented into fixed-length packets 1, 2, 3, and 4, and each packet is output with a destination address and reception connection added to its header.

Output packets 1, 2, 3, and 4 are input to the node device 2601 via a sub-transmission path. The header converter 2573 adds a reception connection number and sequential number to the header of each packet, and the packet is output to the separation/insertion unit 2503.

These packets are inserted in a packet flow from the parallel multiplex transmission path by the separation/insertion unit 2503, and transmitted to the buffer 2513. Note that a reception connection number of 1 and sequential number of 1 are added to the header of packet 1, and a reception connection number of 1 and sequential number of 2 are added to the header of packet 2. Similarly, the headers of packets 3 and 4 are converted.

Since the destination address of the input packet does not coincide with the address of an adjacent downstream node device, the buffer 2513 stores the packet in an arbitrary storage area. In this case, assume that packets 1, 2, 3, and 4 are respectively stored in storage areas 1, 2, 3, and 4.

A read of a packet stored in each storage area of the buffer 2513 will be described by exemplifying read control of packet 1.

The buffer controller 2543 waits for reading out packet 1 until the input terminal IN3 of the switch 2541 is connected to the output terminal OUT1. When the input terminal IN3 is connected to the output terminal OUT1, the buffer controller 2543 reads out packet 1.

The buffer controller 2543 similarly reads out packets 2, 3, and 4 when the input terminal IN3 is connected to the output terminals OUT2, OUT3, and OUT4. The switch controller 2542 sequentially supplies control addresses A1, A2, A3, A4, A5, A6, A7, and A8 in accordance with a table shown in FIG. 5 to change the connection relationship of the switch 2541. Further, the switch controller 2542 supplies the control addresses every 1-packet period to control to repeat the same pattern every 8-packet period.

The switch controller 2542 informs the buffer controller 2543 of this information, thereby controlling the buffer read timing.

In this example, when the input terminal IN3 of the switch 2541 is connected to the output terminal OUT1, packet 1 is read out from storage area 1 of the buffer 2513, and output to the transmission path 2531 via the switch 2541. Similarly, when the input terminal IN3 of the switch 2541 is connected to the output terminal OUT2, packet 2 is read out from storage area 2 of the buffer 2513. When the input terminal IN3 of the switch 2541 is connected to the output terminal OUT3, packet 3 is read out from storage area 3 of the buffer 2513. When the input terminal IN3 of the switch 2541 is connected to the output terminal OUT4, packet 4 is read out from storage area 4 of the buffer 2513. Packets 2, 3, and 4 are respectively output to the transmission paths 2532, 2533, and 2534.

FIG. 31 shows this state. Note that the timing relationship in FIGS. 5 and 31 is as follows. The switch controller 2542 outputs to the switch 2541 the control address A7 of the table shown in FIG. 5 in the time period T1 of FIG. 31, the control address A8 in the time period T2, the control address A1 in the time period T3, and the control address A2 in the time period T4.

Packets 1, 2, 3, and 4 having passed through the transmission paths 2521, 2522, 2523, and 2524, respectively, are input to the node device 2602. Packets 1, 2, 3, and 4 pass through the separation/insertion units 2501, 2502, 2503, and 2504 of the node device 2602, and are input to the buffers 2511, 2512, 2513, and 2514 in the time periods T2, T3, T4, and T5, respectively.

FIG. 32 shows the specific time periods and input channels of packets 1, 2, 3, and 4 input to the node device 2602, and the connection relationship between the input and output channels in each time period. The connection relationship between the input and output channels is changed by changing connection between IN and OUT of the switch 2541, as described above. For example, input channel 1 and output channel 5 are connected by connecting IN1 and OUT5 of the switch 2541.

The buffers 2511, 2512, 2513, and 2514 detect the headers to find that each destination address coincides with the address of an adjacent downstream node device. Thus, the buffers 2511, 2512, 2513, and 2514 designate storage areas corresponding to a transmission path connected to the destination terminal. In this example, since the destination terminal is connected to the transmission path 2532, packets 1, 2, 3, and 4 are respectively stored in storage areas 2 of the buffers 2511, 2512, 2513, and 2514.

A read of packets 1, 2, 3, and 4 from the respective buffers in the node device 2602 will be explained. Assume that the output timing of the control address from the switch controller 2542 in the node devices 2601 and 2602 is as follows. When the switch controller 2542 of the node device 2601 outputs the control address A7 in the time period T1, the switch controller 2542 of the node device 2602 outputs the control address A6. That is, the output timing of the control address in the node device 2602 is delayed by the time period T from the output timing of the control address in the node device 2601.

Packets 1, 2, 3, and 4 stored in storage areas 2 of the buffers 2511, 2512, 2513, and 2514 are read out when the input terminals IN of the switch 2541 respectively connected to these buffers are connected to OUT2. Then, packets 1, 2, 3, and 4 are output to the parallel multiplex transmission path 2532 via the switch 2541.

The connection relationship between the input and output channels is changed by changing connection between IN and OUT of the switch 2541, as described above. As is apparent from FIG. 32, input channels 1, 2, 3, and 4 are connected to output channel 2 in the time periods T5, T4, T11, and T10, respectively.

Hence, packets 1, 2, 3, and 4 are respectively output from output channel 2 in the time periods T5, T4, T11, and T10, pass through the terminal 2532, and output from the separation/insertion unit 2502 of the node device 2603 to the packet rearrangement unit 2562.

As described in header conversion of the header converter, a connection number of 1 representing connection 1 is added to the headers of packets 1, 2, 3, and 4. Further, sequential numbers of 1, 2, 3, and 4 are respectively added to packets 1, 2, 3, and 4.

Operation of the packet rearrangement unit will be explained.

In the time period T4, header information of packet 2 first input to the packet rearrangement unit 2562 contains a connection number of 1 and sequential number of 2. Thus, the write/read controller 2701 in the packet rearrangement unit 2562 in the node device 2603 writes packet 2 in a storage area corresponding to a connection number of 1 and sequential number of 2 in the received-packet memory.

The write/read controller 2701 generates a write address for the received-packet memory 2704 on the basis of the connection number and sequential number. Also in reading out a received packet from the received-packet memory 2704, the write/read controller 2701 generates a read address from the connection number and sequential number.

At the same time as a packet write, the write/read controller 2701 writes "1" in a storage area Str Flag corresponding to a connection number of 1 and sequential number of 2 in the store flag memory 2702. The store flag memory 2702 further writes "1" in a storage area USE Conn and storage area Seq. No. corresponding to a connection number of 1 in the sequential memory 2703.

In this write, "Use Conn" represents that the packet is stored in the storage area of the received-packet memory 2704 corresponding to the connection number, and "Seq. No." represents a sequential number subjected to the next read in this connection.

"Seq. No." in the store flag memory 2702 represents the sequential number, and "Str Flag" represents whether a packet having the sequential number added to the header is written in the received-packet memory 2704. Note that "1" in Str Flag represents that the packet is written in the received-packet memory 2704.

Hence, the store flag memory 2702 represents that the received packet is written in a storage area corresponding to a connection number of 1 and sequential number of 2 in the received-packet memory 2704. The sequential memory 2703 represents that the connection having a connection number of 1 is used, and the sequential number of a packet to be read out next is 0.

This state is shown by the store flag memory in the time period T4 in FIG. 29 and the sequential memory in the time period T4 in FIG. 28.

Header information of packet 1 input in the time period T5 contains a connection number of 1 and sequential number of 1. Thus, the write/read controller 2701 in the packet rearrangement unit 2562 writes packet 1 in a storage area corresponding to a connection number of 1 and a sequential number of 1 in the received-packet memory 2704.

At the same time as a write of packet 1, the write/read controller 2701 writes "1" in a storage area Str Flag corresponding to a connection number of 1 and sequential number of 1 in the store flag memory. This state is shown by the store flag memory in the time period T5 in FIG. 29.

Similarly, packet 4 is input to the packet rearrangement unit 2562 in the time period T10, and the write/read controller 2701 writes packet 4 in a storage area corresponding to a connection number of 1 and sequential number of 4 in the received-packet memory 2704. At the same time as a write of packet 4, the write/read controller 2701 writes "1" in a storage area Str Flag corresponding to a connection number of 1 and sequential number of 4 in the store flag memory.

Packet 3 is input to the packet rearrangement unit 2562 in the time period T11, and the write/read controller 2701 writes packet 3 in a storage area corresponding to a connection number of 1 and sequential number of 3 in the received-packet memory 2704.

At the same time as a write of packet 3, the write/read controller 2701 writes 11311 in a storage area Str Flag corresponding to a connection number of 1 and a sequential number of 3 in the store flag memory.

Note that packets 1 and 2 are read out from the received-packet memory 2704 as follows before the time periods T10 and T11.

Read operation of a packet from the received-packet memory 2704 will be explained.

The write/read controller 2701 recognizes a connection used (:USE Conn 1) and the sequential number (:Seq. No.) of a packet to be read out next in the connection used, on the basis of readout data from the sequential memory 2703. The write/read controller 2701 reads out the Str Flag value of the store flag memory 2702 corresponding to the connection and the sequential number subjected to the next read, and checks whether the Str Flag value is 1 (:representing that the packet is stored in the received-packet memory 2704). When the Str Flag value is 1, the write/read controller 2701 generates a read address from the sequential number of the connection, and reads out the packet from the received-packet memory 2704.

The write/read controller 2701 accesses the sequential memory 2703 in the connection number order, and reads out the USE Conn value and Seq. No. value.

Since the USE Conn value and Seq. No. value of the sequential memory 2703 are 1 each in the time period T4, the write/read controller 2701 searches for an Str Flag value for Seq. No. 1 of Connection No. 1 in the store flag memory 2702.

As is apparent from the store flag memory in the time period T4 in FIG. 29, no packet having an Str Flag value of 0, a connection number (:USE Conn) of 1, and a sequential number (:Seq No.) of 1 subjected to the next read is written in the received-packet memory 2704. Thus, the write/read controller 2701 reads out the USE Conn value and Seq. No. value of the next connection in the sequential memory.

Since the USE Conn value and Seq. No. value of the sequential memory 2703 are 1 each in the time period T5, the write/read controller 2701 searches for the Str Flag value for Seq. No. 1 of Connection No. 1 in the store flag memory 2702.

As is apparent from the store flag memory in the time period T5 in FIG. 29, a packet having an Str Flag value of 1, a connection number (:USE Conn) of 1, and a sequential number (:Seq No.) of 1 subjected to the next read is written in the received-packet memory 2704. In the time period T6, the write/read controller 2701 generates a read address from the connection number and sequential number, reads out packet 1 having a connection number of 1 and sequential number of 1 from the received-packet memory 2704, outputs packet 1 to the terminal, and sets "0" in Str Flag for Seq. No. 1 of Connection No. 1 in the store flag memory 2702.

The write/read controller 2701 writes "2" as a sequential number subjected to the next read in Seq. No. of Conn No. 1 in the sequential memory 2703.

The write/read controller 2701 searches again for the Str Flag value for Seq. No. 2 of Connection No. 1 in the store flag memory 2702.

As is apparent from the store flag memory 2702 in the time period T6 in FIG. 29, the Str Flag value for a sequential number (:Seq. No.) of 2 corresponding to a connection number of 1 is 1. In the time period T7, the write/read controller 2701 generates a read address from the connection number and sequential number, reads out packet 2 having a connection number of 1 and sequential number of 2 from the received-packet memory 2704, outputs packet 2 to the terminal, and sets "0" in Str Flag for Seq. No. 2 of Connection No. 1 in the store flag memory 2702.

The write/read controller 2701 writes "3" as a sequential number subjected to the next read in Seq. No. of Conn No. 1 in the sequential memory 2703.

The write/read controller 2701 searches for the Str Flag value for Seq. No. 3 of Connection No. 1 in the store flag memory 2702.

As is apparent from the store flag memory 2702 in the time period T8 in FIG. 29, the Str Flag value for a sequential number (:Seq. No.) of 3 corresponding to a connection number of 1 is 0. No packet having a connection number of 1 and sequential number of 3 is stored in the received-packet memory 2704, and the write/read controller 2701 does not read out any packet from the received-packet memory 2704.

Packets 3 and 4 are also read out as follows under the same control.

In the time period T11, the Use Conn value and Seq. No. value of the sequential memory 2703 are 1 and 3, respectively (see the sequential memory in the time period T7 in FIG. 28. Since no packet is read out from the time period T7 to the time period T11, sequential memory information in the time period T11 is kept identical to sequential memory information in the time period T7.) As is apparent from the store flag memory 2702 in the time period T11 of FIG. 29, the Str Flag value for a connection number of 1 and sequential number of 3 is 1. Thus, in the time period T12, the write/read controller 2701 generates a read address from the connection number and sequential number, reads out packet 3 from the received-packet memory 2704, outputs packet 3 to the terminal, and sets "0" in Str Flag of the store flag memory.

The write/read controller 2701 writes "4" as a sequential number subjected to the next read in Seq. No. of Conn No. 1 in the sequential memory 2703 (see the sequential memory in the time period T12 in FIG. 28).

As is apparent from the store flag memory 2702 in the time period T12 in FIG. 29, the Str Flag value for a sequential number (:Seq. No.) corresponding to a connection number of 1 is 1. In the time period T13, the write/read controller 2701 generates a read address from the connection number and sequential number, reads out packet 4 from the received-packet memory 2704, and outputs packet 4 to the terminal.

In this manner, packets 1, 2, 3, and 4 output from the transmitting terminal in the time periods T1, T2, T3, and T4 are rearranged in the transmission order by the packet rearrangement unit of the node device which receives these packets. Packets 1, 2, 3, and 4 are output to the traffic setting unit 2582 in the time periods T6, T7, T12, and T13, respectively.

To connect the node device in this embodiment to an ATM (Asynchronous Transfer Mode) network, QoS (Quality of Service), which is being standardized by the ATM forum and ITU, must be guaranteed.

This QoS (:Quality of Service) includes CDV (:Cell Delay Variation), CLR (:Cell Loss Rate), CTD (:Cell Transmission Delay), and CER (:Cell Error Rate). A network system which does not guarantee the QoS cannot be connected to the ATM network to provide communication services guaranteed by the ATM network.

The seventh embodiment employs the following arrangement in order to especially guarantee CDV.

In the ATM network system, at the start of SVC (:Signaling Virtual Channel) communication, signaling is done to ensure the channel. That is, the relay communication device (node device) is informed of which type of data is transferred from the transmitting terminal. Each communication device checks an available channel for relaying transmitted information by the communication device.

Also in the seventh embodiment, each relay node device checks whether it can relay data transmitted from the transmitting terminal. This check is done by a communication controller (not shown) in each node device. As described above, control information such as traffic characteristics between node devices or a terminal and node device is communicated at the start of communication. Assume that, therefore, signaling for establishing SVC is completed, and the communication controller in the node device connected to the receiving terminal recognizes the traffic characteristics of a packet output from the transmitting terminal.

Operation of the traffic setting unit for setting a packet output from the rearrangement buffer so as to make traffic characteristics match the output traffic characteristics of the transmitting terminal, and outputting the set packet to the receiving terminal will be described.

Figure 33:
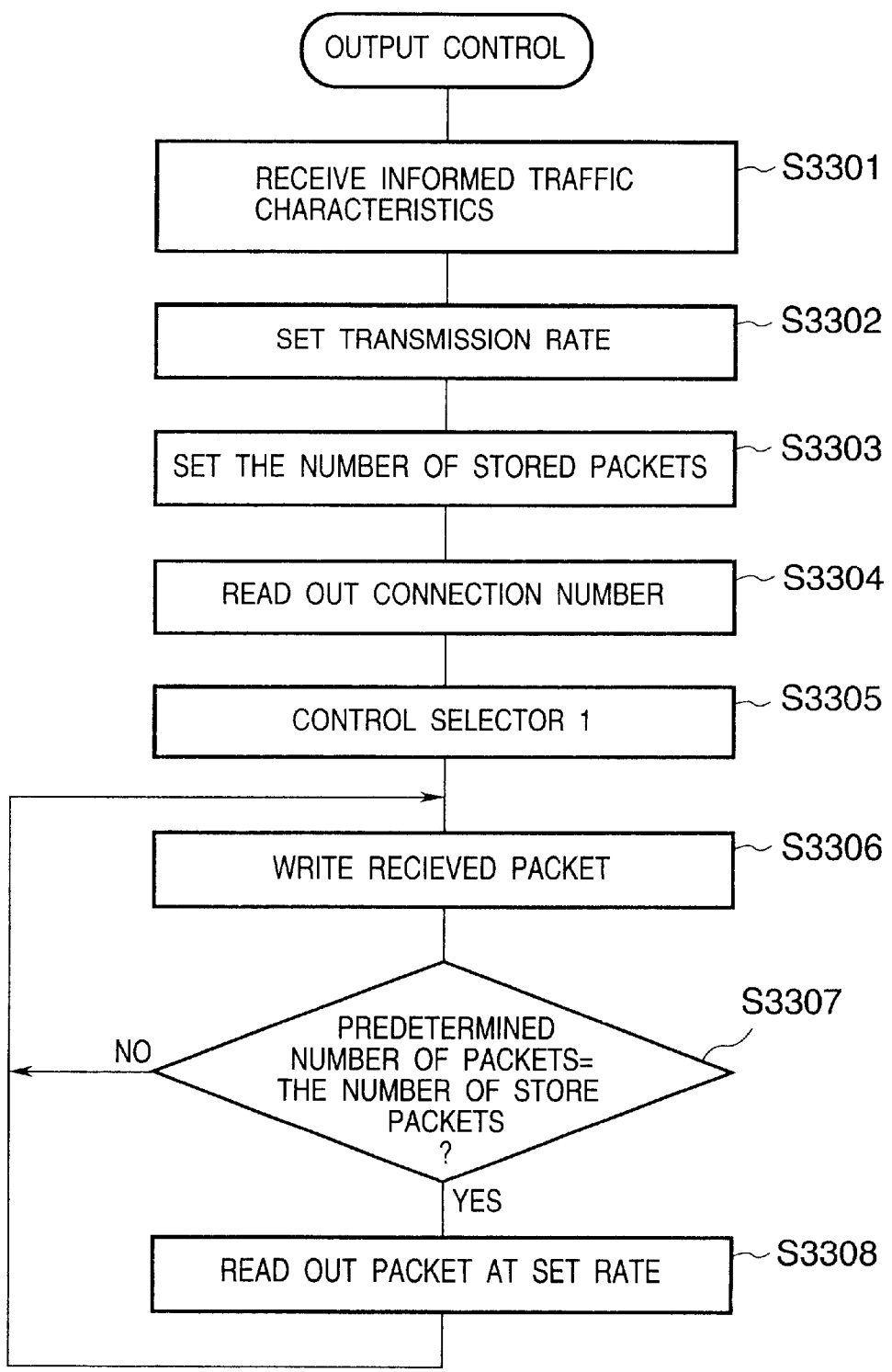
FIG. 33 is a flow chart showing control of the traffic setting unit used in the seventh embodiment of the present invention.

FIG. 33 is a flow chart showing control of the output controller 3001 in FIG. 30.

The communication controller of the node device 2603 informs the output controller 3001 of a predetermined traffic setting unit 2582 (traffic setting unit 2582 in this embodiment) of informed transmitting terminal traffic characteristics and the reception connection number of a packet. In this case, the reception connection number is 1. Note that the predetermined traffic setting unit is one connected to a destination terminal. For descriptive convenience, the traffic characteristics on the transmitting side are output at a constant transmission rate of 5 [Mbps]. The transmission rate between the node device and terminal is 25.6 [Mbps].

The output controller 3001 is informed from the communication controller of a reception connection number of 1, a transmission rate of 5 [Mbps] as the traffic characteristics on the transmitting side, and constant output (S3301).

The output controller 3001 sets the transmission rate in a transmission register (not shown) corresponding to each connection number in the output controller (in this embodiment, sets 5 [Mbps] in the transmission register of reception connection 1) (S3302).

The output controller 3001 determines the number of packets stored in the FIFO 3010 of reception connection 1 (FIFO 3010 corresponding to a connection number of 1) after receiving the first packet corresponding to a reception connection number of 1.

The output controller 3001 sets the determined number of packets in a buffering register (not shown) corresponding to a reception connection number of 1 in the output controller 3001 (S3303).

This is done to prevent the following problem. Burst packets are output from the packet rearrangement unit. Before no packet is output from the packet rearrangement unit, packets are read out from the FIFO at a predetermined read rate or read pattern set to make traffic characteristics identical to the traffic characteristics of a packet on the transmitting side. At this time, all the packets are read out from the FIFO without predetermined traffic characteristics. Note that some examples of the method of determining the number of packets stored in each FIFO after the start of reception will be described.

The first example is as follows.

As described above, QoS of the ATM network includes CTD (:Cell Transmission Delay), and the transmission delay time (:DT1) on the current network and the transmission delay time (:DT2) on an ATM network to be connected are first estimated. The time (:FT=CTD−DT3; this is the packet hold time of the FIFO) obtained by subtracting the sum (:DT3=DT11+DT2) of the estimated delay times from CTD is calculated. From FT, the number of packets is calculated. For example, if FT is a processing time of 50 packets (the packet processing time is a time required to read out one packet from the FIFO), the number of packets stored in the FIFO after the start of reception can be determined to 50 packets at maximum. The number of packets obtained in this manner is the maximum number, and can also be set as follows.

The second example is as follows.

The maximum transmission delay time (:T1) and minimum transmission delay time (:T2) between transmitting and receiving terminals are analyzed by simulation of this system to obtain the difference (:T3). The number (:the number of bits of transmission rate×T3/one packet) of packets output from the transmitting terminal in the time SDT is determined as the number of packets stored in the FIFO after the start of reception.

The third example is as follows. The number of packets stored in the FIFO after the start of reception is set equal to or less than the number (:number of storing packets) of packets which can be stored in a storage area corresponding one connection in the reception memory of the packet rearrangement unit. The number of packets stored in the FIFO after the start of reception is set equal to or less than the number of storing packets because the maximum number of burst packets read out from one connection is the number of storing packets.

A packet write/read in the traffic setting unit 2582 will be explained. After the output controller 3001 receives a packet output from the packet rearrangement unit 2562, the controller 3001 reads out the connection number from the header of the received packet (S3304), and controls selector 1 so as to output the received packet to a FIFO corresponding to the readout connection number (S3305). In this case, the connection number is 1, and a FIFO corresponding to a connection number of 1 is the FIFO 3010. The output controller 3001 writes the packet received from the packet rearrangement unit 2562 in the FIFO 3010 (S3306), and stops reading out a packet from the FIFO 3010 until a predetermined number of packets are written in the FIFO 3010 corresponding to a connection number of 1 after the first packet corresponding to a connection number of 1 is input to the traffic setting unit 2582. The output controller 3001 confirms that the predetermined number of packets are written in the FIFO 3010 (S3307), then outputs packets from the FIFO 3010 at a constant read rate of 5 [Mbps] set by the communication controller, and controls the selector (2) 3007 so as to output the readout packets to the terminal (S3308)

With this processing, even if packet output characteristics output from the packet rearrangement unit changes from packet output characteristics at the transmitting terminal, the traffic setting unit controls to match the packet traffic characteristics with the packet output characteristics at the transmitting terminal. Accordingly, the node device of the seventh embodiment can guarantee CDV (:Cell Delay Variation) defined in the ATM forum and ITU.

Eighth Embodiment

The eighth embodiment of the present invention will be described below.

Figure 34:
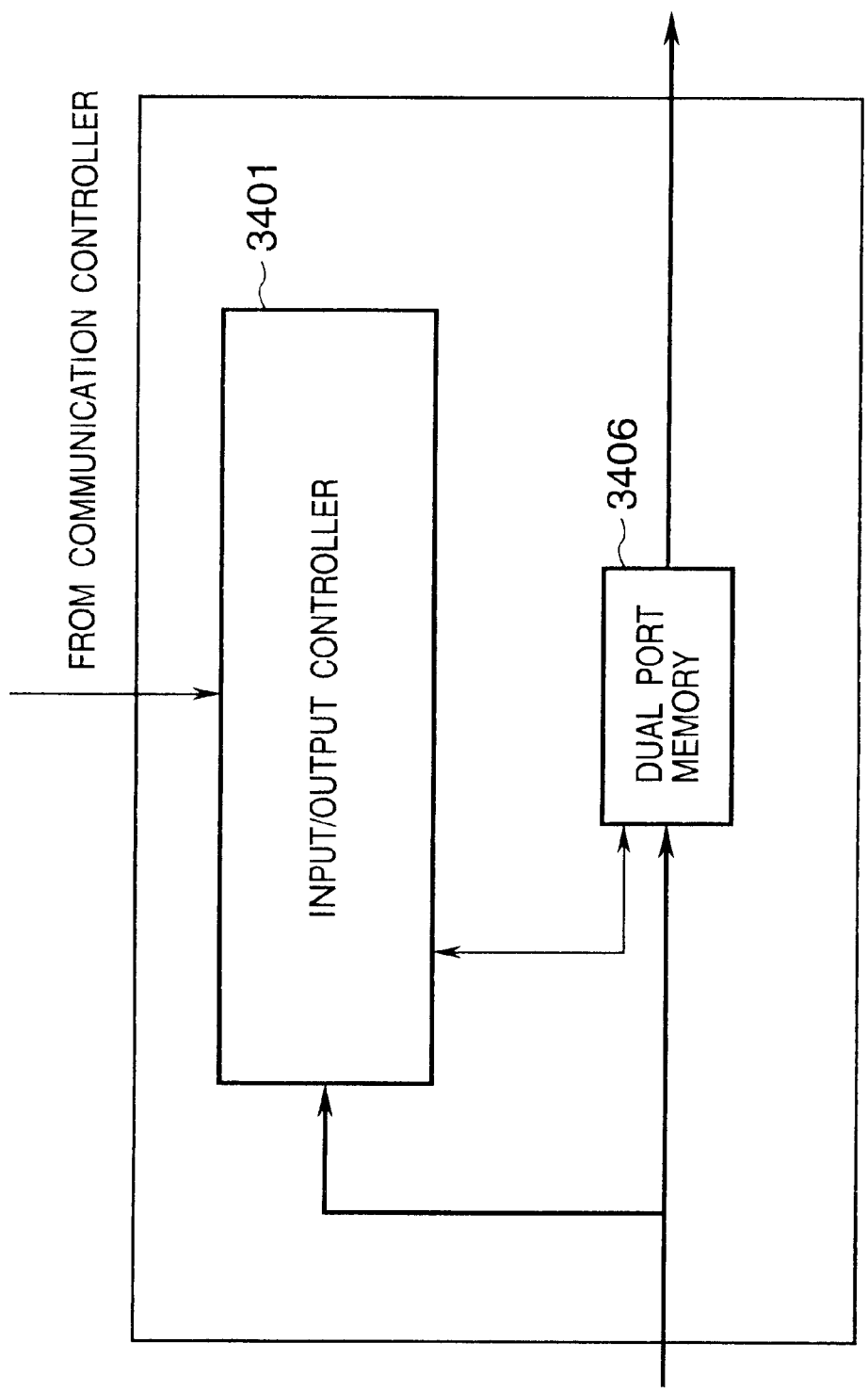
FIG. 34 is a block diagram showing the arrangement of a traffic setting unit used in the eighth embodiment of the present invention.

FIG. 34 is a block diagram showing the arrangement of a traffic setting unit in a node device according to the eighth embodiment. The remaining arrangement is the same as in FIG. 25, and a description thereof will be omitted. Reference numeral 3401 denotes an input/output controller for reading out the connection number described at the header of an input packet to write the packet in the storage area of a dual port memory 3406 corresponding to the connection number, and reading out a packet from each storage area of the dual port memory 3406 so as to output the packet to the receiving terminal with the same characteristics as the packet output characteristics at the transmitting terminal after a predetermined number of packets are stored in the storage area of the dual port memory 3406 corresponding to each connection after the start of communication at each connection. The dual port memory 3406 has a storage area corresponding to each connection.

FIG. 35 shows the contents of a store flag memory set in the input/output controller 3401. The store flag memory represents whether a packet is written at each write/read address of a storage area corresponding to each connection of the dual port memory 3406. For example, when the Store Flag value at Mem Adr=00H is 1, a packet is written at the address of the dual port memory 3406 corresponding to Mem Adr=00H. The memory address (:Mem Adr) of the store flag memory and the write/read address of a store area corresponding to each connection of the dual port memory 3406 have one-to-one correspondence, and the input/output controller 3401 holds one-to-one correspondence information.

Figure 36:
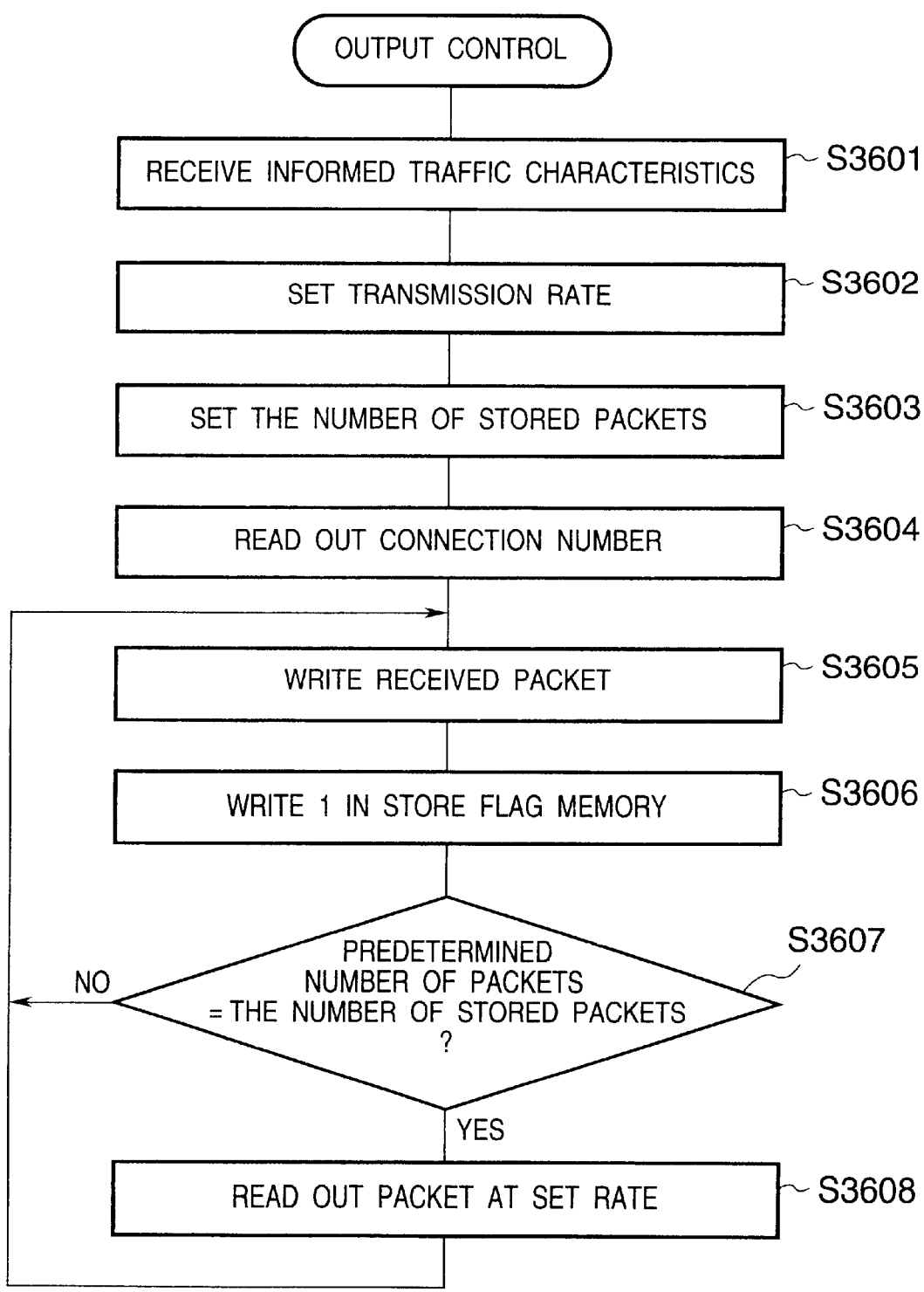
FIG. 36 is a flowchart showing control of the traffic setting unit used in the eighth embodiment of the present invention.

FIG. 36 is a flow chart showing control of the input/output controller 3401.

Control operation of the eighth embodiment will be explained with reference to FIG. 36. The eighth embodiment will exemplify only operation of the traffic setting unit in detail. In the eighth embodiment, assume that the communication controller in a node device connected to the receiving terminal recognizes the traffic characteristics of a packet output from the transmitting terminal by the same method as in the seventh embodiment.

The communication controller informs the input/output controller 3401 of a predetermined traffic setting unit of transmitting terminal traffic characteristics informed from the transmitting terminal and the reception connection number of a packet. Note that the predetermined traffic setting unit is one connected to a destination terminal. For descriptive convenience, the traffic characteristics on the transmitting side are output at a constant transmission rate of 5 [Mbps]. The transmission rate between the node device and terminal is 25.6 [Mbps].

In the eighth embodiment, the communication controller informs the input/output controller 3401 of a traffic setting unit 2582.

If the input/output controller 3401 is informed from the communication controller of the traffic characteristics and reception connection number (reception connection number of 1 in this embodiment) (S3601), the controller 3401 sets the transmission rate (sets 5 [Mbps] in this embodiment) in a transmission register (not shown) corresponding to each connection number in the input/output controller 3401 (S3602).

The input/output controller 3401 determines the number of packets stored in the storage area of the dual port memory 3406 corresponding to a reception connection number of 1 after receiving a packet corresponding to a reception connection number of 1. The input/output controller 3401 sets the number of packets in a buffering register (not shown) corresponding to a reception packet connection number of 1 in the input/output controller 3401 (S3603).

If the input/output controller 3401 receives a packet from a packet rearrangement unit 2562, the controller 3401 reads out the connection number from the header of the received packet (S3604), and writes the received packet in the storage area of the dual port memory 3406 corresponding to the readout connection number (S3605). The input/output controller 3401 writes "1" (:representing that the packet is written at the address) at a predetermined address of the store flag memory in the input/output controller 3401 corresponding to the packet-written address (S3606). Since the input/output controller 3401 recognizes one-to-one correspondence between the memory address (:Mem Adr) of the store flag memory and the write/read address of the dual port memory 3406, it can recognize from the Store Flag information of the store flag memory the write/read address of the dual port memory 3406 at which the packet is stored. In this case, assume that the extracted connection number is 1, and the address space of the store flag memory corresponding to the storage area of the dual port memory 3406 for a connection number of 1 is defined by 00H to FFH. The storage area of the store flag memory corresponding to another connection number is shown in FIG. 35.

The input/output controller 3401 stops reading out a packet until a predetermined number of packets are written in the storage area of the dual port memory 3406 corresponding to a connection number of 1 after the first packet corresponding to a connection number of 1 is input to the traffic setting unit.

The input/output controller 3401 reads out Store Flag values from 00H to FFH of the address space corresponding to a connection number of 1 in the store flag memory, and confirms that the predetermined number of packets are written in the storage area of the dual port memory 3406 (S3607). Then, the input/output controller 3401 reads out and outputs, to the terminal, packets from the storage area (addresses 00H to FFH) of the dual port memory 3406 at a constant read rate of 5 [Mbps] set by the communication controller in S3602 (S3608).

In this manner, even the eighth embodiment can output a packet to the receiving terminal with the same traffic characteristics as packet output characteristics at the transmitting terminal.

As described above, according to the seventh and eighth embodiments, when a packet is to be output from a packet-receiving node device to the receiving terminal, output of the packet to the receiving terminal can be controlled to make traffic characteristics equal to packet output characteristics at the transmitting terminal. Therefore, the seventh and eighth embodiments can guarantee CDV (:Cell Delay Variation) defined in the ATM forum and ITU, and allow connection to another ATM network system.

As has been described above, according to the present invention, even if the order of packets changes during packet transmission in a network of performing communication while changing the communication channel for communicating a packet, the packets can be rearranged in the packet transmission order and transmitted to a destination terminal.

At this time, output of the packets to the receiving terminal can be controlled to make traffic characteristics match packet output characteristics at the transmitting terminal.

As many apparently widely different embodiments of the present invention can be made without departing from the spirit and scope thereof, it is to be understood that the invention is not limited to the specific embodiments thereof except as defined in the appended claims.

What is claimed is:

1. A node device connectable to terminal devices, comprising:
   plural separation means, corresponding to each of a plurality of communication channels, for determining a destination of each of packets received via the plurality of communication channels and for separating the received packets into packets to be transmitted to a destination terminal device of the terminal devices and packets to be output to a neighboring node device in accordance with the determination;

management means for managing the packets separated as packets to be transmitted to the destination terminal device on the basis of connection information and order information representing a transmission order of the packets transmitted from a source terminal device;

channel change means for sequentially changing a communication channel used for transmission of the packets to be output to the neighboring node device, in accordance with a predetermined pattern and for outputting the packets via the changed communication channel; and transmission means for rearranging the packets to be transmitted to the destination terminal device in the transmission order transmitted from the source terminal device, every connection, on the basis of the management by said management means, to transmit the rearranged packets to the destination terminal device, wherein the packets to be output to the neighboring node device are output in the predetermined pattern without regard to the connection information and order information by said channel change means, and the packets to be transmitted to the destination terminal device are rearranged in the transmission order and transmitted by said transmission means.

2. The node device according to claim 1, further comprising:

buffer means for temporarily storing the packets to be output to the neighboring node device, wherein said channel change means has a plurality of input terminals for inputting packets read out from said buffer means and a plurality of output terminals for outputting packets to the plurality of communication channels, and changes a connection relationship between the pluralities of input and output terminals in accordance with the predetermined pattern.

3. The node device according to claim 2, wherein the predetermined pattern is a pattern so as not to simultaneously connect at least two input terminals to the same output terminal.

4. The node device according to claim 1, wherein the received packets contain the connection information and the order information, and said management means manages the packets to the destination terminal device on the basis of the connection information and the order information contained in the received packets.

5. The node device according to claim 4, wherein the destination terminal device can perform communication while simultaneously establishing connections with a plurality of terminal devices, and the order information is added to a packet every connection.

6. The node device according to claim 5, wherein connection information corresponding to the connection is also added to the packet.

7. The node device according to claim 6, wherein said management means further comprises:

first storage means for storing a received packet in correspondence with the connection information;

second storage means for storing storage packet information based on the order information of the packet stored in said first storage means in correspondence with connection information of the packet stored in said first storage means; and third storage means for storing read information representing an order of reading out packets from said first storage means in correspondence with storage information representing whether a packet corresponding to the connection information is stored in said first storage means, and the connection information.

8. The node device according to claim 7, wherein said transmission means determines based on the storage information whether said first storage means corresponding to predetermined connection information is used, and when said first storage means is determined to be used, reads out the packet from said first storage means in accordance with the storage packet information and the read information.

9. The node device according to claim 7, wherein said first storage means stores a packet in an address area generated based on the connection information and the order information.

10. The node device according to claim 7, wherein each of said first, second, and third storage means includes a plurality of storage means.

11. The node device according to claim 7, wherein said transmission means includes at least a plurality of digital signal processors respectively corresponding to the plurality of connections, and a microprocessor unit for transmitting the plurality of packets to the destination terminal device.

12. The node device according to claim 11, wherein each of said digital signal processors informs said microprocessor unit of information for reading out the received packet from said first storage means on the basis of the information stored in said second and third storage means.

13. The node device according to claim 10, wherein said microprocessor unit determines a connection order of reading out the received packets from the plurality of connections on the basis of the information informed from said digital signal processor.

14. The node device according to claim 1, wherein said transmission means transmits a plurality of packets to the destination terminal device on the basis of traffic characteristics used to transmit the plurality of packets from the transmitting terminal device.

15. The node device according to claim 14, wherein said transmission means transmits the plurality of packets to the destination terminal device with the same traffic characteristics as traffic characteristics of the plurality of packets transmitted by the transmitting terminal device.

16. The node device according to claim 1, further comprising:

setting means for setting traffic characteristics of the received packets; and storage means for storing the plurality of packets separated by said separation means, wherein said transmission means transmits the plurality of packets stored in said storage means to the destination terminal device connected to said node device, on the basis of the traffic characteristics set by said setting means.

17. The node device according to claim 16, wherein said transmission means further comprises read means for, when a predetermined number of packets are stored in said storage means, reading out the packets stored in said storage means, and said transmission means transmits to the destination terminal device the packets read out by said read means.

* * * * *

UNITED STATES PATENT AND TRADEMARK OFFICE
CERTIFICATE OF CORRECTION

PATENT NO. : 6,744,762 B1
DATED : June 1, 2004
INVENTOR(S) : Hojo

It is certified that error appears in the above-identified patent and that said Letters Patent is hereby corrected as shown below:

Column 20,
Line 40, "Seq. No." should read -- =Seq. No. --; and
Line 44, "leach" should read -- 1 each --.

Column 28,
Line 19, "QUT 1" should read -- OUT 1 --.

Column 32,
Line 54, "11311" should read -- "3" --.

Column 40,
Line 30, "claim 10," should read -- claim 12, --; and
Line 60, "means," should read -- means; --.

Signed and Sealed this

Ninth Day of November, 2004

JON W. DUDAS
*Director of the United States Patent and Trademark Office*